(12) United States Patent
Hashimoto

(10) Patent No.: US 9,367,444 B2
(45) Date of Patent: Jun. 14, 2016

(54) NON-VOLATILE MEMORY DEVICE, CONTROL METHOD FOR INFORMATION PROCESSING DEVICE, AND INFORMATION PROCESSING DEVICE

(71) Applicant: Kabushiki Kaisha Toshiba, Tokyo (JP)

(72) Inventor: Daisuke Hashimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 138 days.

(21) Appl. No.: 13/789,149

(22) Filed: Mar. 7, 2013

(65) Prior Publication Data

US 2014/0006689 A1 Jan. 2, 2014

(30) Foreign Application Priority Data

Mar. 16, 2012 (JP) ................................. 2012-060740

(51) Int. Cl.
*G06F 12/02* (2006.01)
*G06F 21/79* (2013.01)

(52) U.S. Cl.
CPC ............ *G06F 12/0246* (2013.01); *G06F 21/79* (2013.01); *G06F 2212/1052* (2013.01); *G06F 2212/7205* (2013.01); *G06F 2221/2143* (2013.01)

(58) Field of Classification Search
CPC ............... G06F 12/0246; G06F 2212/7201; G06F 2212/7205; G06F 12/02; G06F 2212/7209; G06F 12/00; G06F 2212/1052; G06F 2212/2022; G06F 12/1009; G06F 12/0891; G06F 21/00; G06F 3/0679; G06F 2212/683; G06F 21/79; G06F 2221/2143
See application file for complete search history.

(56) References Cited

U.S. PATENT DOCUMENTS

| 8,122,193 | B2 | 2/2012 | Song et al. |
| 8,230,159 | B2 | 7/2012 | Stenfort |
| 8,381,018 | B2 * | 2/2013 | Lee et al. .................. 714/6.1 |
| 2005/0182892 | A1 * | 8/2005 | Nakanishi .......... G06F 11/1435 711/103 |
| 2006/0026340 | A1 | 2/2006 | Ito et al. |
| 2007/0113029 | A1 | 5/2007 | Bennett et al. |
| 2007/0300008 | A1 * | 12/2007 | Rogers et al. .............. 711/103 |
| 2008/0104361 | A1 * | 5/2008 | Ippongi ..................... 711/206 |

(Continued)

FOREIGN PATENT DOCUMENTS

| JP | 2003-058417 | 2/2003 |
| JP | 2004-240660 | 8/2004 |

(Continued)

OTHER PUBLICATIONS

Robin Harris, Mac fail: SSD security, Feb. 21, 2011, http://www.zdnet.com/blog/storage/mac-fail-ssd-security/1293.

(Continued)

*Primary Examiner* — Hashem Farrokh
(74) *Attorney, Agent, or Firm* — Patterson & Sheridan, LLP

(57) ABSTRACT

A storage device for a host device includes a non-volatile semiconductor memory and a control section configured to execute a delete process in response to a command from the host device to delete data stored at locations in the non-volatile semiconductor memory corresponding to a selected logical address included in the command. The delete process includes determining a selected mapping and at least one prior mapping of the selected logical address to physical addresses of the non-volatile semiconductor memory, and erasing or overwriting the data stored at the physical addresses.

16 Claims, 42 Drawing Sheets

(56) References Cited

U.S. PATENT DOCUMENTS

| | | | |
|---|---|---|---|
| 2008/0263305 | A1 | 10/2008 | Shu et al. |
| 2010/0217927 | A1* | 8/2010 | Song .................... G06F 3/0616 711/103 |
| 2010/0241819 | A1 | 9/2010 | Yoshii et al. |
| 2010/0281080 | A1 | 11/2010 | Rajaram et al. |
| 2010/0296201 | A1 | 11/2010 | Kashima |
| 2011/0047356 | A2* | 2/2011 | Flynn et al. .................... 712/220 |
| 2011/0238895 | A1* | 9/2011 | Honda .......................... 711/103 |
| 2012/0144097 | A1 | 6/2012 | Hashimoto |
| 2012/0221776 | A1 | 8/2012 | Yoshihashi et al. |
| 2012/0239853 | A1* | 9/2012 | Moshayedi .................. 711/103 |
| 2012/0246388 | A1 | 9/2012 | Hashimoto |
| 2012/0246393 | A1 | 9/2012 | Hashimoto |
| 2012/0254514 | A1 | 10/2012 | Nishikubo |
| 2012/0260025 | A1 | 10/2012 | Hida et al. |
| 2013/0124785 | A1 | 5/2013 | Xiong et al. |

FOREIGN PATENT DOCUMENTS

| | | |
|---|---|---|
| JP | 2005-092678 | 4/2005 |
| JP | 2007-280330 A | 10/2007 |
| JP | 2008-102819 A | 5/2008 |
| JP | 2008-198208 A | 8/2008 |
| JP | 2009-288503 | 12/2009 |
| JP | 2010-204703 A | 9/2010 |
| JP | 2011-064554 | 3/2011 |
| JP | 2011-128998 | 6/2011 |
| JP | 2011-192239 A | 9/2011 |
| WO | 2011-074712 | 6/2011 |

OTHER PUBLICATIONS

C. Stevens, "ATA/ATAPI Command Set—2 (ACS-2)" T13/2015-D, Revision 6, Feb. 22, 2011, pp. 50, pp. 98-99, pp. 249-250. http://www.t13.org/Documents/UploadedDocuments/docs2011/d2015r6-ATAATAPI_Command_Set_-_ACS-2.pdf.

M. Evans, "SCSI Block Commands—3 (SBB-3)" T10/BSR INCITS 514, Revision 35, Dec. 7, 2012, pp. 20-23, pp. 27-34, pp. 162-164. http://www.t10.org.

A. Huffman, "NVM Express" Revision 1.2, Oct. 11, 2012, pp. 114-117. http://www.nvmexpress.org.

"Solid State Disk Secure Erase" 2010 Flash Memory Summit (FMS2010) Santa Clara, CA, Aug. 2010. pp. 1-21. http://cseweb.ucsd.edu/users/m3wei/assets/pdf/FMS-2010-Secure-Erase.pdf.

R. Harris "Mac Fail: SSD Security" Feb. 21, 2011. http://www.zdnet.com/blog/storage/mac-fail-ssd-security/1293.

Japanese Office Action dated Jul. 1, 2014 in counterpart Japanese Patent Application 2012-060740 with English Translation.

Swanson et al., "SAFE: Fast, Verifiable Sanitization for SSDs", University of California San Diego Engineering Technical Report cs2011-0963, Oct. 13, 2010, pp. 1-5.

Swanson et al., "Destroying Flash Memory-Based Storage Devices", University of California San Diego Engineering Technical Report cs2011-0968, Jul. 8, 2011, pp. 1-5.

Wei, et al., "Reliably Erasing Data From Flash-Based Solid State Drives," Department of Computer Science and Engineering, University of California, San Diego, 9th USENIX Conference on File and Storage Technologies, Feb. 2011, pp. 105-117. http://www.usenix.org/events/fast11/tech/full_papers/Wei.pdf.

* cited by examiner

FIG. 10

CONTROL INFORMATION 31

FREE BLOCK TABLE: 50

| BLOCK ID | NUMBER OF TIMES DELETED | COFF |
|---|---|---|
| ... | ... | ... |
| ... | ... | ... |
| ... | ... | ... |
| ... | ... | ... |

ACTIVE BLOCK TABLE: 51

| BLOCK ID | NUMBER OF TIMES DELETED | COFF |
|---|---|---|
| ... | ... | ... |
| ... | ... | ... |
| ... | ... | ... |
| ... | ... | ... |

TRACK TABLE: 52

| CLUSTER ADDRESS | BLOCK ID | INVALID FLAG |
|---|---|---|
| ... | ... | ... |
| ... | ... | ... |
| ... | ... | ... |
| ... | ... | ... |

CLUSTER TABLE: 53

| CLUSTER ADDRESS | BLOCK ID | ADDRESS WITHIN THE BLOCK | INVALID FLAG |
|---|---|---|---|
| ... | ... | ... | ... |
| ... | ... | ... | ... |
| ... | ... | ... | ... |
| ... | ... | ... | ... |

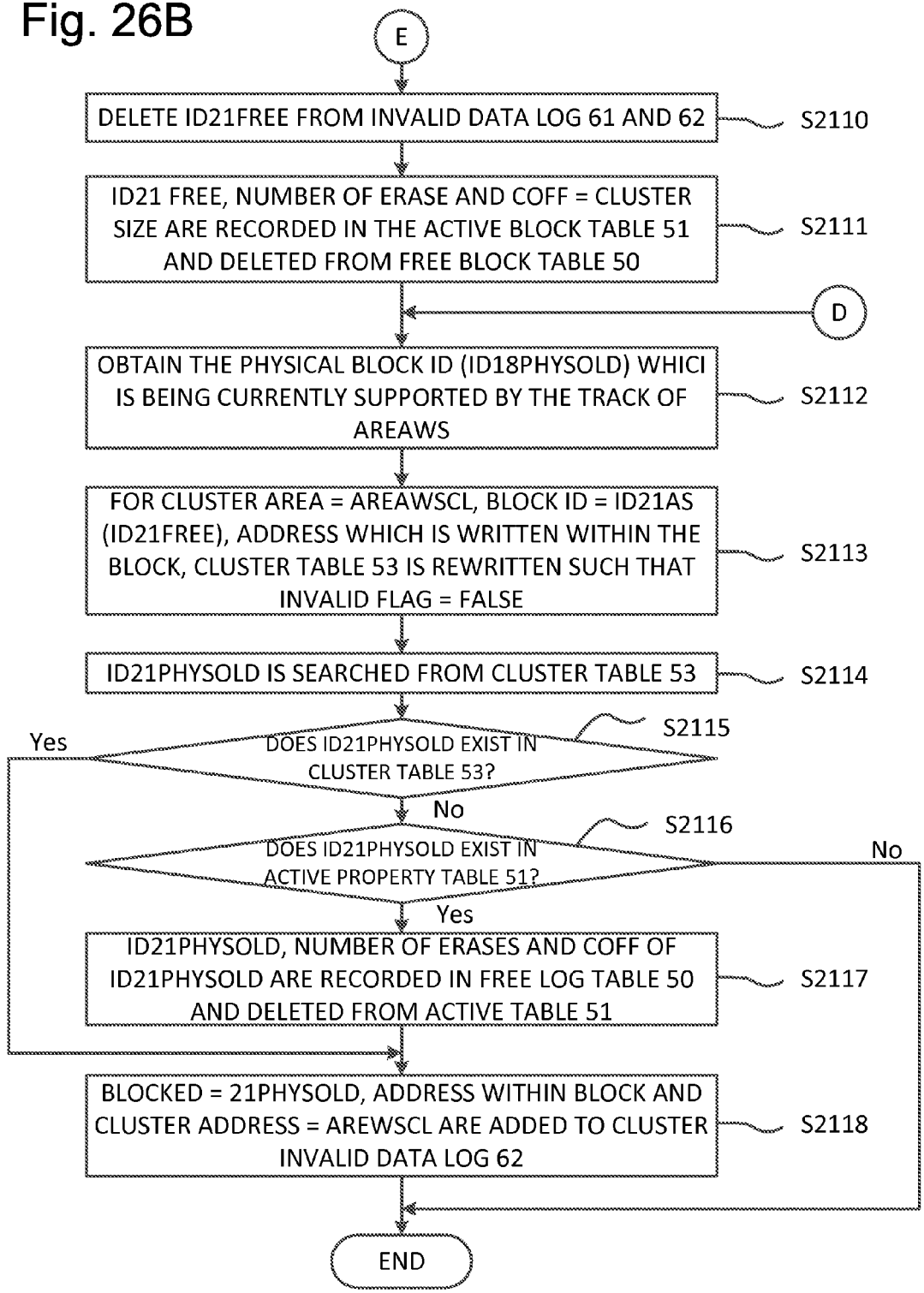

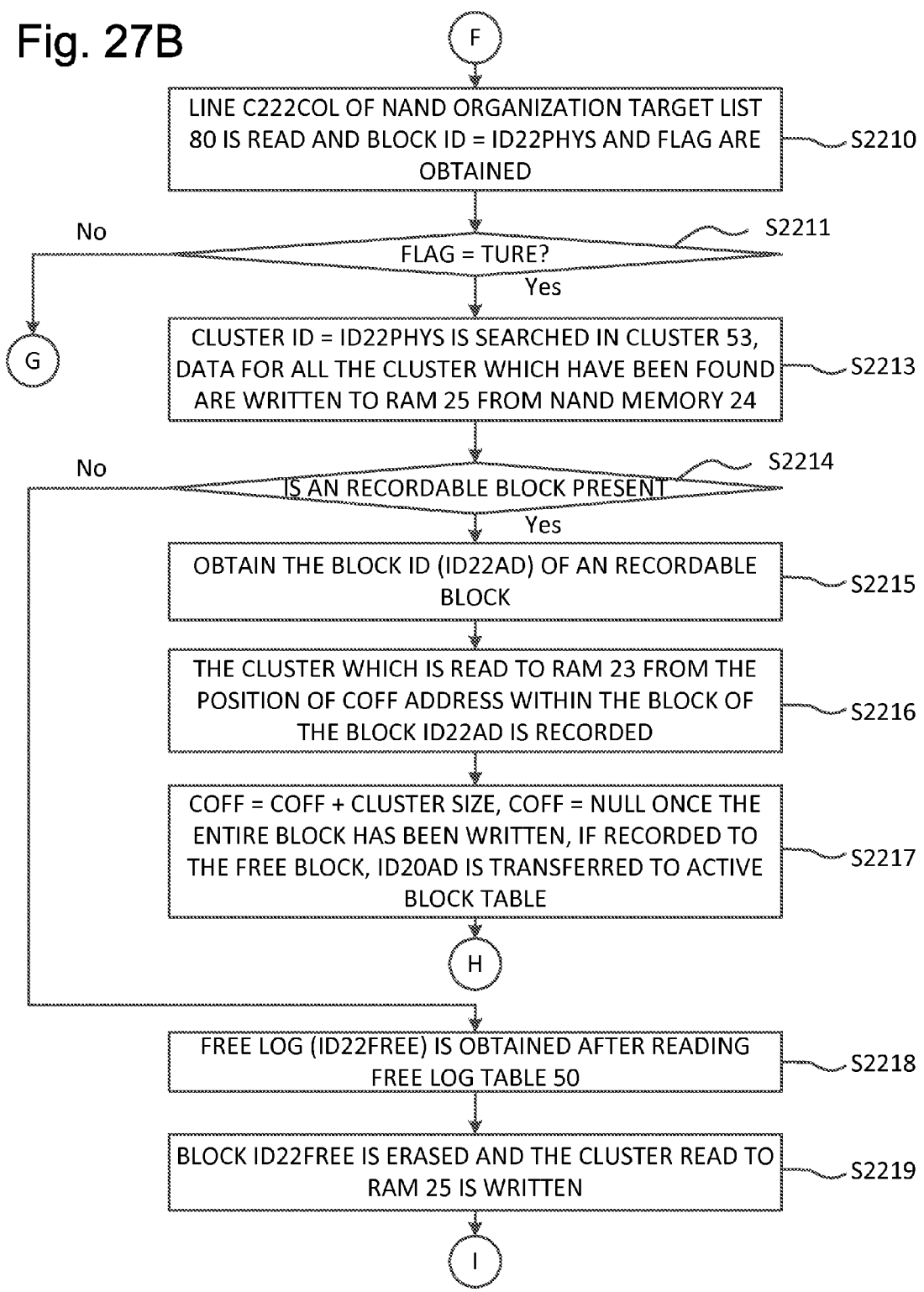

FIG. 39

| BLOCK ID | ADDRESS WITHIN THE BLOCK | CLUSTER ADDRESS |
|---|---|---|
| ... | ... | $A5_{CL}$ |
| ... | ... | $A5_{CL}$ |
| ... | ... | $A5_{CL}$ |
| ... | ... | $A5_{CL}$ |

NON-VOLATILE MEMORY DEVICE, CONTROL METHOD FOR INFORMATION PROCESSING DEVICE, AND INFORMATION PROCESSING DEVICE

CROSS-REFERENCE TO RELATED APPLICATION

This application is based upon and claims the benefit of priority from Japanese Patent Application No. 2012-060740, filed Mar. 16, 2012; the entire contents of which are incorporated herein by reference.

FIELD

Embodiments described herein relate to a non-volatile memory device, an information processing device, and a control method thereof.

BACKGROUND

When deleting data in a non-volatile memory device by an operating system (OS) of a host device, there is method of updating only data management information on the OS (updating only metadata of OS file system) without actually erasing the data in the non-volatile memory device. In such a method, when an HDD (Hard Disk Drive) is employed as the non-volatile memory device, the deletion process is not necessarily performed in the non-volatile memory device every time the data is deleted by the OS. The absence of the deletion process leads to improved performance of the operation of the external storage device.

However, according to this method, the deleted data on the OS is recognized as valid data still existing on the non-volatile memory device.

To solve this problem, in recent years, a command protocol in which the OS notifies the non-volatile memory device of memory areas unnecessary for the OS as a deletion notification has been developed. Such data can be then deleted in the non-volatile memory device as well as in the OS file system. However, the data in the memory area in the non-volatile memory device notified by the deletion notification is not necessarily erased by processing the deletion notification and may remain in the non-volatile memory in the non-volatile memory device. Therefore, even if the data is deleted by the user, the data may be restored by breaking down the non-volatile memory device and then analyzing the non-volatile memory therein if the user data has not been encrypted or the encrypted user data has weak cipher strength. As a result, the deleted user data may be stolen by malicious users. In other words, such deletion process is not secure.

DESCRIPTION OF THE DRAWINGS

FIG. 10 shows control information of the SSD.

FIG. 26A and FIG. 26B are flow charts that show a procedure of cluster writing to the cluster control area.

FIG. 27A, FIG. 27B and FIG. 27C are flow charts that show a procedure of performing NAND organization.

FIG. 39 shows a temporary list of items to be eliminated.

DETAILED DESCRIPTION

Embodiments provide a non-volatile memory device, an information processing device, and a control method thereof, according to which erased data cannot be deciphered.

In general, embodiments of the non-volatile memory device, the information processing device, and the control method thereof are explained in detail with reference to the accompanying drawing. Note that, the present disclosure is not limited to these embodiments.

A storage device for a host device includes a non-volatile semiconductor memory and a control section configured to execute a delete process in response to a command from the host device to delete data stored at locations in the non-volatile semiconductor memory corresponding to a logical address included in the command. The delete process includes determining a current mapping and at least one prior mapping of the logical address to physical addresses of the non-volatile semiconductor memory, and erasing or overwriting the data stored at the physical addresses of the non-volatile semiconductor memory to which the logical address has been mapped.

First Embodiment

Figure 1:
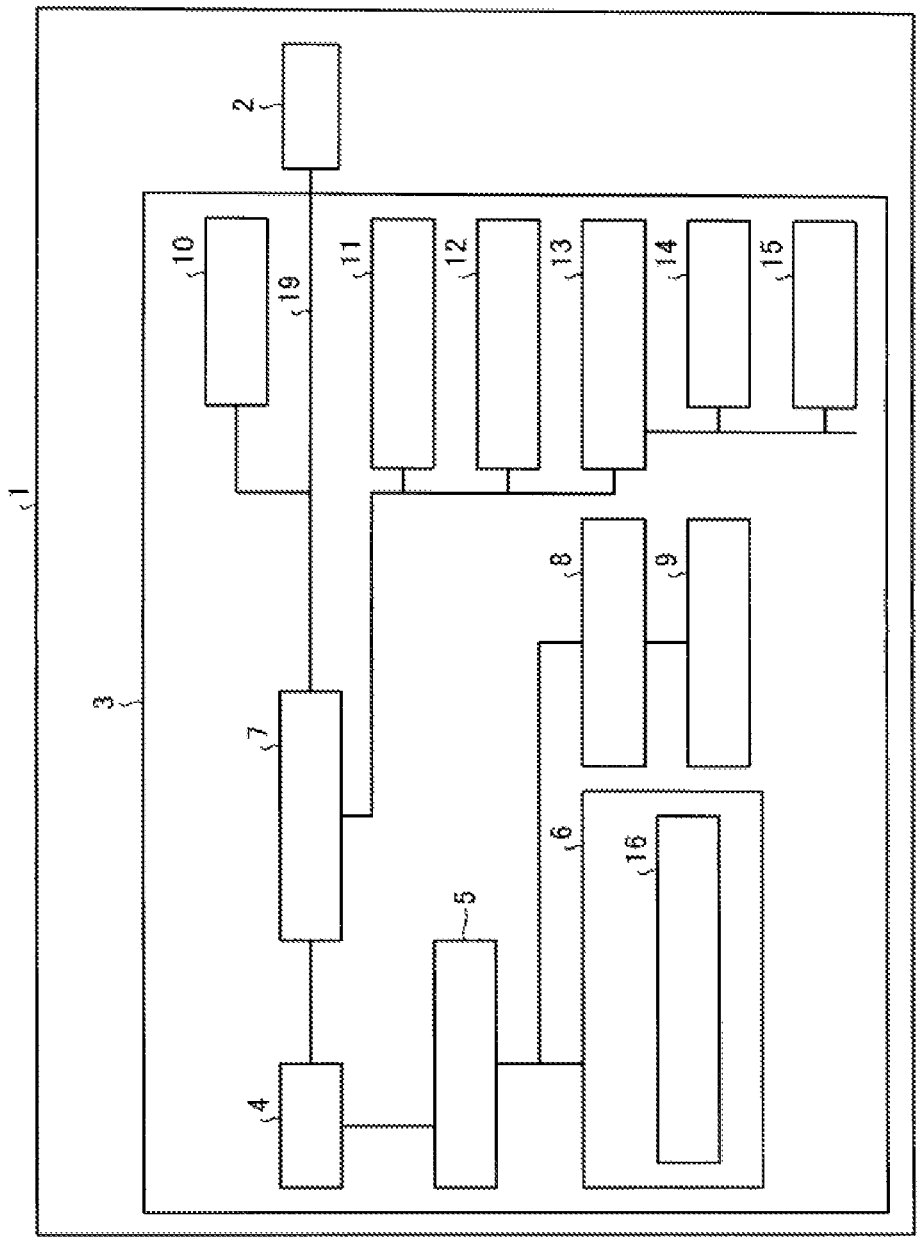
FIG. 1 shows a computer system as an example of an information processing device.

At first, the overall configuration of the information processing device is described in which an SSD (Solid State Drive) 2 is used as a non-volatile memory device. FIG. 1 shows the configuration of a computer system 1 as an example of the information processing device. The computer system 1 is configured by SSD 2 acting as a non-volatile memory device, a host device 3 (hereafter, simply referred as host) and a memory interface 19, connecting SSD 2 and host 3. SSD 2 is connected to the interface 19 through host 3. In the embodiment of the present disclosure, SATA (Serial Advanced Technology Attachment) interface is used as the interface 19; however, other interfaces like PCI (Peripheral Component Interconnect) Express, USB (Universal Serial Bus) and the like can also be used. The CPU (also referred to herein as "control circuit") is a central processing unit in host 3 and various calculations and controls in host 3 are carried out by CPU 4. The CPU 4 controls the optical drive 10, SSD 2 and DVD-ROM through the south bridge 7 interface. The CPU 4 also controls the main memory 6 through the north bridge 5 interface. The main memory 6, for example is configured by DRAM.

The user controls host 3 with input devices such as keyboard 14 and mouse 15. The signals from the keyboard 14 and mouse 15 are processed in the CPU 4 through USB (Universal Serial Bus) controller 13 and the south bridge 7. The CPU 4 sends the image data, text data and the like to display (display device) 9 through the north bridge 5 and display controller 8. The user can view the image data, text data from the host 3 file through display 9.

The CPU 4 executes the BIOS (Basic Input/Output System) stored in ROM 11. The BIOS is a program designed for controlling the hardware. In addition, the CPU 4 controls the LAN (Local Area Network) controller 12 through the south bridge interface 7.

The main memory 6 acts as working memory for the CPU 4 and includes the memory area for storing the OS (Operating System). The OS 16, as it is generally known, is a program for controlling the host 3. Wherein, it controls the I/O devices of the host 3, the disk, memory and controls the software as well, so that the hardware of the host 3 can be used. OS 16 is stored in the NAND type flash memory 24 of the SSD 2 when the host 3 is switched on; however, it is loaded from the NAND type flash memory 24 to the DRAM 6 at start-up time for the start program of the host 3.

Figure 2:
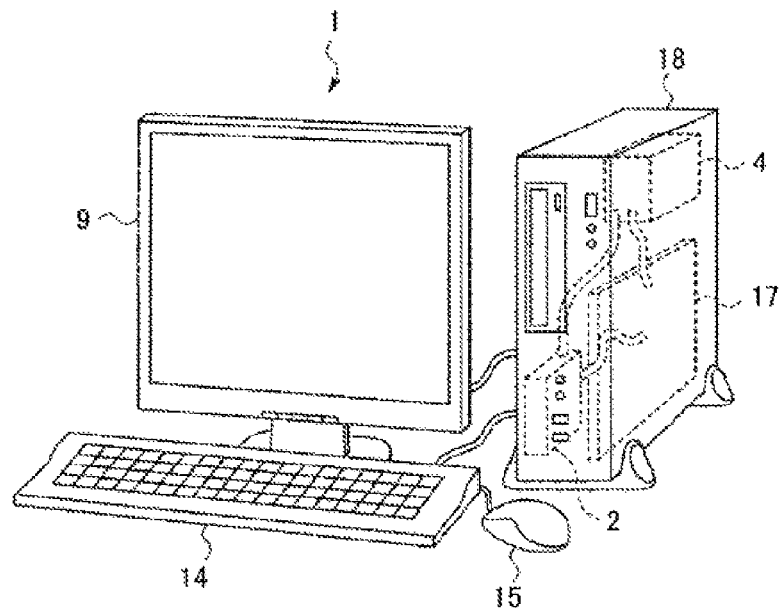
FIG. 2 shows an external configuration of a first type of the computer system.

Next, the example of the configuration of the computer system 1 is described in detail. The computer system 1, for example, can be used as a desktop computer or a notebook type portable computer. FIG. 2 is a schematic drawing of the desktop computer used as a computer system 1.

The desktop computer 1 includes a computer 18, a display 9, a keyboard 14 and a mouse 15. The computer 18 also contains all the important hardware including a motherboard 17, the SSD 2, and the power supply 4. The SSD 2 is electrically connected to the motherboard 17 through a SATA cable. The SATA cable is connected to the CPU 4 mounted on the mother board 17 through a south bridge interface 7 mounted on the same mother board 17. The power supply 4 generates various supply voltages used in the desktop computer 1 and supplies power to the motherboard 17 and SSD 2 through a power supply cable.

Figure 3:
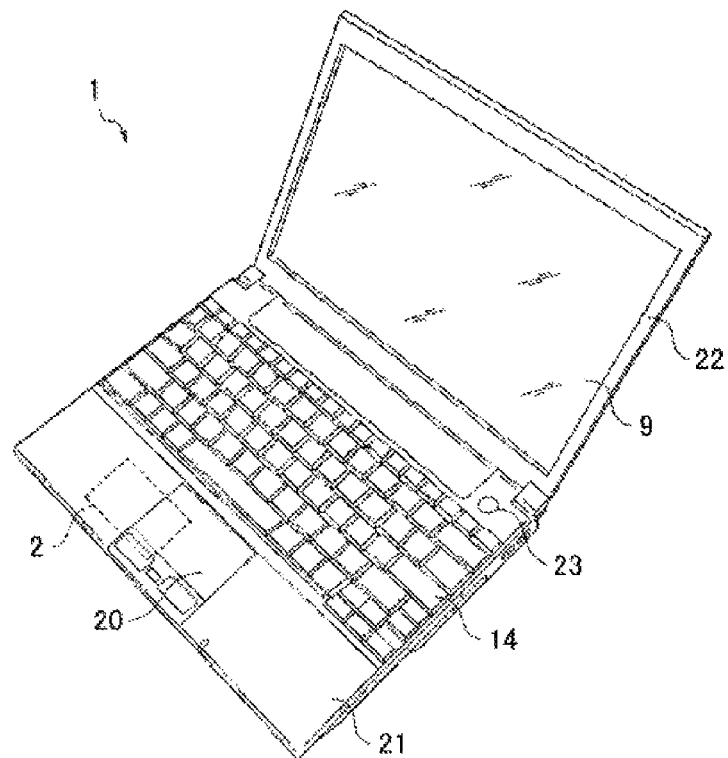
FIG. 3 shows an external configuration of a second type of the computer system.

FIG. 3 is a schematic drawing of a portable computer used as a computer system 1. The portable computer 1 is configured with a computer 21 and a display unit 22. The display unit 22, includes a built-in display device 9 configured as an LCD (Liquid Crystal Display). The display unit 22 is freely mounted between the open position, exposing the top surface of computer 21 and the close position covering the top surface of the same (computer 21). The computer 21 includes a thin box shaped chassis, wherein a power switch 23, a keyboard 14, a touchpad 20 are arranged on its top surface. Further, computer 21 also includes an SSD 2, motherboard, a power supply device similar to the desktop computer.

Note that, the imaging devices like the still camera or video camera can be used as the information processing devices applied in this embodiment, in addition to the computer system 1, further the game consoles, car navigation system and the like can also be used.

Figure 4:
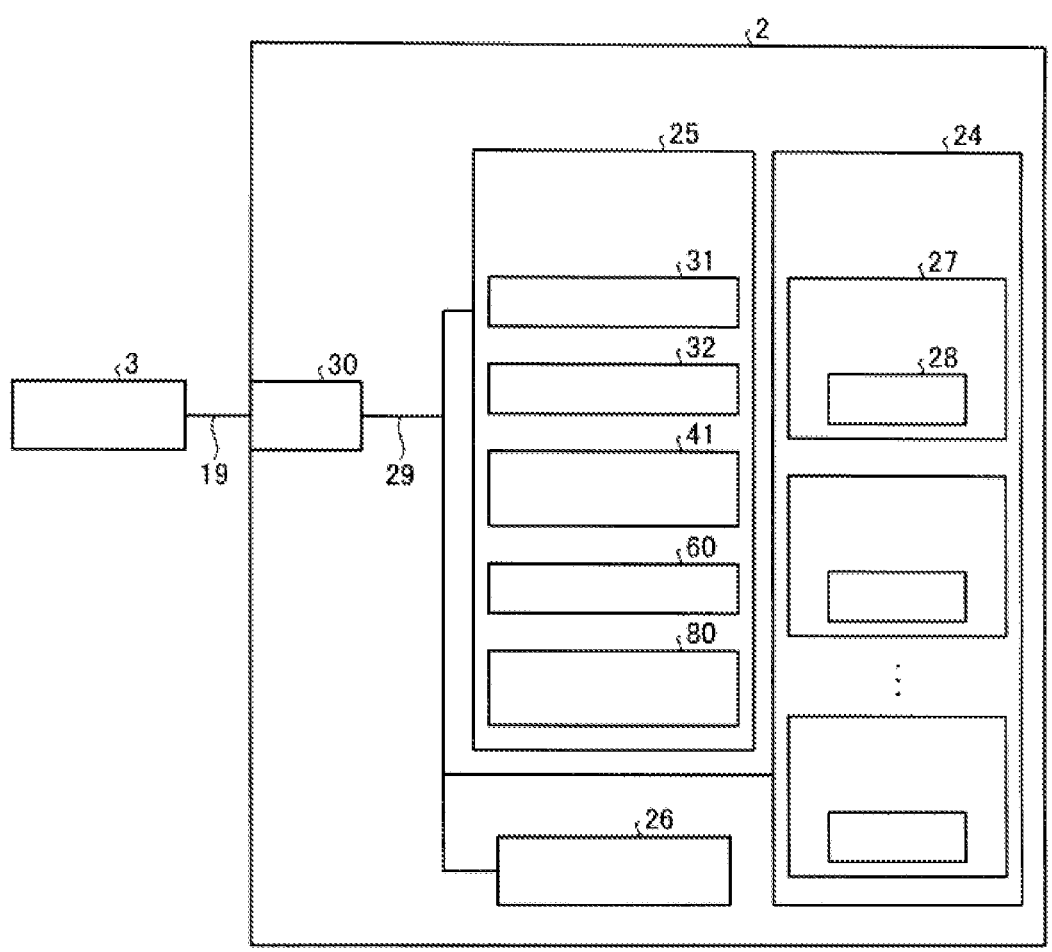
FIG. 4 is a block diagram of an SSD.

FIG. 4 shows a block diagram for the SSD 2 used as a non-volatile memory device. The SSD 2 includes a NAND type flash memory 24 (hereafter referred to as the NAND memory) used as a non-volatile semiconductor memory, the IFC (interface controller) 30 which carries out the sending and receiving of signals for host 3 through SATA interface 19, non-volatile semiconductor memory, RAM (Random Access Memory) 25 including cache memory (CM) 32 for functioning as an intermediate buffer between IFC 30 and NAND memory 24, and SSD controller (SSDC) 26 for managing and controlling the NAND memory 24 and RAM 25, and for controlling the IFC 30 and bus 29.

DRAM (Dynamic Random Access Memory), SRAM (Static Random Access Memory), FeRAM (Ferroelectric Random Access Memory), MRAM (Magnetoresistive Random Access Memory), ReRAM (Resistance Random Access Memory), and PRAM (Phase Change Random Access Memory) can be adopted as the RAM 25.

The RAM 25 includes cache memory (CM) 32 functioning as a cache for data transfer between the host 3 and the NAND memory 24. RAM 25 also acts as memory for storing the control information 31 and the working area. The control information 31 (control table) stored in the RAM 25 is read from a control table area in the NAND memory 24 by SSDC 26 when the SSDC 26 and the NAND memory 24 are powered on, and is stored in the NAND memory 24 at periodic intervals or at the time of power discontinuation. Further, the delete notification command buffer 41, the invalid data log 60, and the NAND GC (garbage collection) target list 80 are stored in the RAM 25. The details will be described later.

The SSDC 26 implements various functions using the processor which executes the system program (firmware) stored in the NAND memory 24, and various hardware circuits, and executes the data transfer control between host 3—NAND memory 24 for the various commands like write requests, cache flash request, read request, updates and controls various control information 31 stored in RAM 25 and the NAND memory 24.

The host 3 inputs the LBA (Logical Block Addressing) as a logical address through a SATA interface 19 while executing the read requests or the write requests with respect to the SSD 10. The LBA is a logical address with a serial number starting from 0 with respect to the sector (size: for example, 512 B).

The IFC 30 includes functions such as transmitting a read command, a write command, other commands from the host 3 to the SSDC 26 and transmitting a command response from the SSDC 26 to the host 3.

[Configuration of the NAND]

The NAND memory 24 comprises one or more individual NAND memory chips 27. The NAND memory 24 stores the user data specified by the host 3 and stores the control information controlled in the RAM 25 for the backup. The NAND memory 24 includes a memory cell array wherein the multiple memory cells are arranged in the form of a matrix. The memory cell transistor configuring the memory cell array is a MOSFET (Metal Oxide Semiconductor Field Effect Transistor) having a stacked gate structure formed on a semiconductor substrate.

The stacked gate structure includes a charge accumulating layer (floating gate electrode) formed on the semiconductor substrate with a gate insulating film interposed, and a control gate electrode formed on the floating gate electrode with an inter-gate insulating film interposed. The memory cell transistor has the threshold voltage changed according to the number of electrons accumulated in the floating gate electrode, and stores the data according to the difference in the threshold voltage. In the present embodiment, a case in which 2 bits per cell are written into the individual memory cell with a four-level storage method that uses the upper page and the lower page, is described, but the essence of the present invention is not changed even in a case in which 1 bit per cell is written into the individual memory cell with a two-level storage method that uses a single page or 3 bits per cell are written into the individual memory cell with an eight-level storage method that uses the upper page, the middle page, and the lower page. The memory cell transistor is not limited to a structure having a floating gate electrode, and may be a structure in which the threshold voltage can be adjusted by trapping the electrons at the nitride interface serving as the charge accumulating layer such as MONOS (Metal-Oxide-Nitride-Oxide-Silicon). The MONOS type memory cell transistor may be similarly configured to store one bit or may be configured to store multiple bits. Furthermore, a semiconductor storage medium in which the memory cell is arranged three-dimensionally as described in U.S. Patent Application Publication No. 2010 0172189 and U.S. Patent Application Publication No. 2010 0254191 may be adopted as the NAND memory 24.

Figure 5:
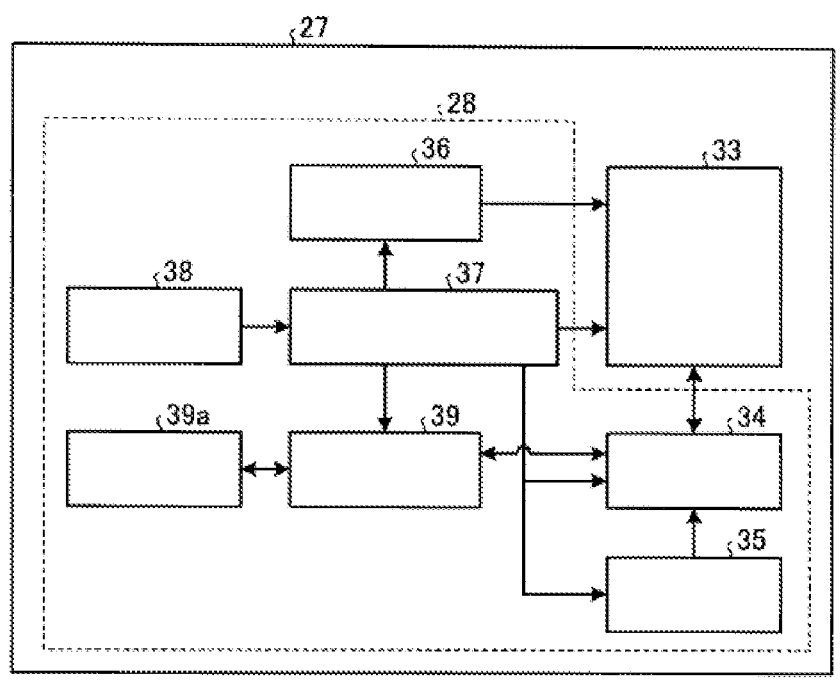
FIG. 5 is a block diagram of a NAND memory chip.

FIG. 5 indicates the structure of the NAND memory chip 27. The NAND memory chip 27 includes a memory cell array 33 wherein, the memory cells for storing the data are arranged in the form of a matrix. The memory cell array 33 includes a plurality of bit lines, a plurality of word lines, and a common source line, where the memory cell in which data is electrically rewritable is arranged in a matrix form at the intersection of the bit line and the word line.

A bit line control circuit 34 for controlling the bit line and a word line control circuit 36 for controlling the word line voltage are connected to the memory cell array 33. The bit line control circuit 34 reads the data of the memory cells in the memory cell array 33 through a bit line, in contrast, it also writes to the memory cells in the memory cell array 33 through a bit line by applying the write control voltage to the memory cells.

A column decoder 35, a data I/O buffer 39 and a data I/O terminal 39a are connected to the bit line control circuit 34. The data of the memory cells which are read from the memory cell array 33 is output to the bus 29 from the data I/O terminal 39a through the bit line control circuit 34 and the data I/O buffer 39. The write data input from the bus 29 to the data input/output terminal 39a is input to the bit line control circuit 34 by the column decoder 35 through the data input/output buffer 39, and then written to the specified memory cells.

Further, the memory cell array 33, bit line control circuit 34, a column decoder 35, a data I/O buffer 39 and a word line control circuit 36 are connected to the control circuit 37. The control circuit 37 generates a control signal and a control voltage for controlling the memory cell array 33, the bit line control circuit 34, the column decoder 35, the data I/O buffer 39 and the word line control circuit 36 in accordance with the control signals input in the control signal input terminal 38. The circuit portion other than the memory cell array 33 of the NAND memory chip 27 is termed as NANDC 28.

Figure 6:
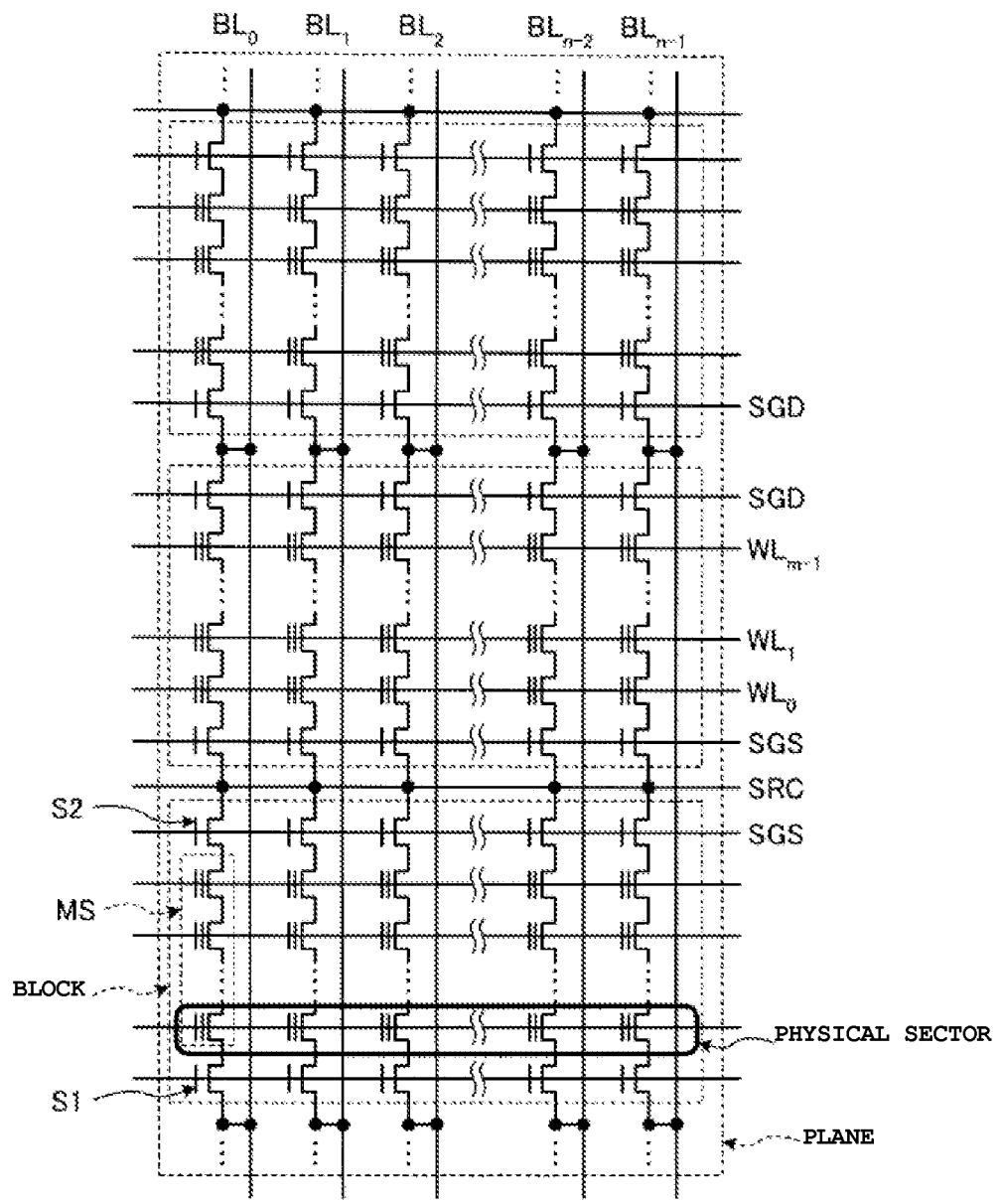
FIG. 6 is a connection diagram of one plane of the NAND memory chip.

FIG. 6 illustrates a configuration of the memory cell array 33 illustrated in FIG. 5. The memory cell array 33 is a NAND cell type memory cell array and is configured to include a plurality of NAND cells. One NAND cell is configured by a memory string MS including memory cells connected in series, and selection gates S1, S2 connected to both ends thereof. The selection gate S1 is connected to the bit line BL, and the selection gate S2 is connected to the source line SRC. The control gate of the memory cell MC arranged in the same row is commonly connected to the word lines WL0 to $WL_{m-1}$. The first selection gate S1 is commonly connected to the select line SGD, and the second selection gate S2 is commonly connected to the select line SGS.

The memory cell array 33 includes one or a plurality of planes, and the plane includes a plurality of blocks. Each block is configured by a plurality of NAND cells, and the data is erased in units of blocks.

The plurality of memory cells connected to one word line configure one physical sector. The data is written and read out for every physical sector (physical sector is irrelevant to the logical sector of the LBA to be described later). Data of one page is stored in one physical sector in the case of the 1 bit/cell write method (two level cell), and data of three pages is stored in one physical sector in the case of the 3 bits/cell write method (eight level cell).

At the time of read operation, the program verify operation, and the program operation, one word line is selected and one physical sector is selected according to the physical address received from the SSDC 25. The switching of the page in the physical sector is carried out by the physical address.

Figure 7:
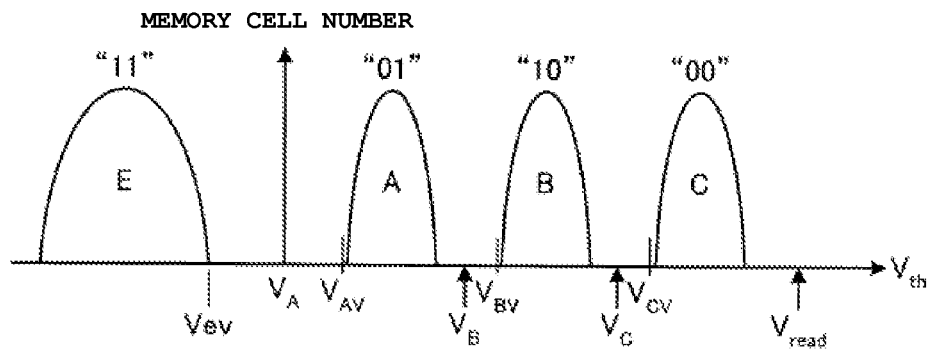
FIG. 7 shows a voltage threshold distribution in a four-level data memory.

The four level NAND memory of 2 bit/cell is configured such that the threshold voltage in one memory cell has four levels. FIG. 4 illustrates the relationship between the four level data (data "11", "01", "10", "00") of two bits stored in the memory cell of the four level NAND cell flash memory and the threshold voltage distribution of the memory cell. In FIG. 7, $V_{A1}$ is the voltage applied to the selected word line when reading out two level data with respect to the physical sector in which only the lower page is written and the upper page is not yet written, and $V_{A1V}$ indicates the verify voltage (verify level) applied to verify whether or not the write is completed when carrying out write to the A1.

$V_{A2}$, $V_{B2}$, $V_{C2}$ are voltages applied on the selected word line when reading out four level data with respect to the physical sector in which the lower page and the upper page are written, and $V_{A2V}$, $V_{B2V}$, $V_{C2V}$ indicate the verify level applied to verify whether or not the write is completed when carrying out write to each threshold voltage distribution. Vread1, Vread2 indicate read voltages applied to the non-selected memory cell in the NAND cell to conduct the relevant non-selected memory cell regardless of the held data when carrying out readout of the data. Furthermore, Vev1, Vev2 indicate erase verify levels applied to the memory cell to verify whether or not the erasure is completed when erasing the data of the memory cell, and have a negative level. The magnitude is determined in view of the influence of the interference of the adjacent memory cell. The magnitude relationship of each voltage is, $$Vev1 < V_{A1} < V_{A1v} < Vread1$$

$$Vev2 < V_{A2} < V_{A2V} < V_{B2} < V_{B2V} < V_{C2} < V_{C2V} < Vread2.$$

The erase verify levels Vev1, Vev2, Vev3 take negative levels, as described above, but the voltage actually applied to the control gate of the memory cell MC in the erase verify operation is not a negative level, and is zero or a positive level. That is, in the actual erase verify operation, a positive voltage is applied on the back gate of the memory cell MC, and a voltage having a level of zero or a positive level smaller than the back gate voltage is applied on the control gate of the memory cell MC. In other words, the erase verify levels Vev1, Vev2, Vev3 are voltages that equivalently have a negative level.

The threshold voltage distribution ER of the memory cell after the block erasure has an upper limit level of a negative level, and is assigned with data "11". The memory cell of the data "01", "10", and "00" in a state the lower page and upper page are written each has a positive threshold voltage distribution A2, B2, C2 (lower limit level of A2, B2, C2 is also a positive level), where the threshold voltage distribution A2 of data "01" has the lowest voltage level, the threshold level voltage distribution C2 of data "00" has the highest voltage level, and the voltage levels of various types of threshold voltage distributions have a relationship of A2<B2<C2. The memory cell of data "10" in a state the lower page is written and the upper page is not written has a positive threshold voltage distribution A1 (lower limit level of A1 is also a positive level). The threshold level voltage distribution illustrated in FIG. 4 is merely an example, and the present invention is not to be limited thereby. For instance, the threshold level voltage distributions A2, B2, C2 are all explained to be positive threshold voltage distributions in FIG. 4, but a case in which the threshold voltage distribution A2 is a distribution of negative voltage and the threshold voltage distributions B2, C2 are distributions of positive voltages is also encompassed within the scope of the invention. Even if the threshold voltage distributions ER1, ER2 are positive levels, the present invention is not to be limited thereby. In the present embodiment, the correspondence relationship of the data of ER2, A2, B2, C2 is described as "11", "01", "10", "00", but may be other correspondence relationships such as "11", "01", "00", "10".

The two bit data of one memory cell includes the lower page data and the upper page data, where the lower page data and the upper page data are written to the memory cell through different write operations, that is, two write operations. Notating the data as "*@", * represents the upper page data and @ represents the lower page data.

Figure 8:
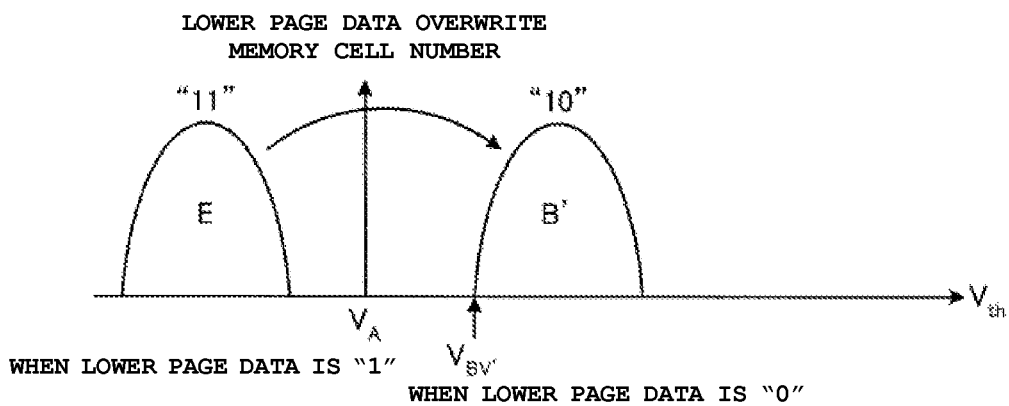
FIG. 8 shows the voltage threshold distribution when writing a lower page data.

At first, the writing of the lower page data is described by referring to FIG. 8. All the memory cells are assumed to have the threshold voltage distribution E in the erase state, and store the data "11". As shown in FIG. 8, when the lower page data writing is carried out, the threshold voltage distribution E of the memory cell is divided into two threshold voltage distribution (E, B') corresponding to the values of the upper page data ("1", or "0"). In other words, when the value of the lower page data is "1", the threshold voltage distribution E of the erase state is maintained.

On the other hand, when the value of the lower page data is "0", a high electrical field is applied to the tunnel oxide film of the memory cell, the electrons are injected to the floating gate electrode, the threshold voltage Vth of the memory cell is increased only up to the predetermined amount. To be more precise, the verify potential $V_{BV'}$ is set, and the write operation is repeated until the threshold voltage reaches the verify potential $V_{VB'}$. As a result, the memory cell changes to the write state (data "10"). Note that, the threshold voltage distribution B' of the data "10" shows a wider distribution as compared to data "11" due to the effect of the write operation on the neighboring cells.

Figure 9:
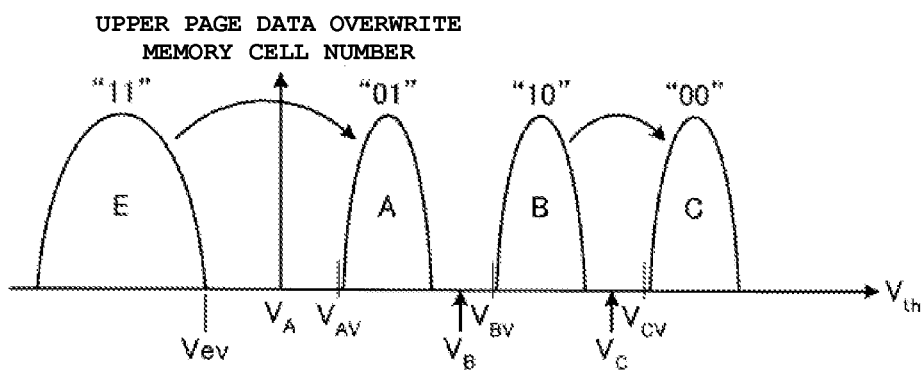
FIG. 9 shows the voltage threshold distribution when writing an upper page data.

Next, the writing of the upper page data is described by referring to FIG. 9. The writing of the upper page data is carried out based on the write data (upper page data) input from the bus 29 and the lower page data which is already written to the memory cell.

In other words, as shown in FIG. 9, when the value of the upper page data is "1", the application of high electric field to the tunnel oxide film of the memory cell is avoided and the increase in the threshold potential Vth of the memory cell is prevented. As a result, the memory cell of data "11" (threshold voltage distribution E of erase state) maintains the data "11", and the memory cell of the data "10" (threshold voltage distribution B') maintains the data "10". It is desirable to adjust the lower limit level of the threshold voltage distribution using the positive verify level $V_{BV}$ greater than the verify level $V_{BV'}$ described earlier and accordingly the threshold voltage distribution B is formed narrowing the width of the threshold voltage distribution.

On the other hand, when the value of the upper page data is "0", a high electrical field is applied to the tunnel oxide film of the memory cell, the electrons are injected to the floating gate electrode and the threshold voltage Vth of the memory cell is increased only up to the predetermined amount. As a result, the memory cell of data "11" (threshold voltage distribution E of erase state) changes to data "01" of the threshold voltage distribution A and the memory cell of the data "10" changes to the data "00" of the threshold voltage distribution C. At that time, the lower limit for the threshold voltage A and C is adjusted using verify level $V_{AV}$ and $V_{CV}$.

In the erase operation, the erase verify potential Vev is set, and the erase operation is repeated until the threshold voltage of smaller than or equal to the verify level Vev. As a result, the memory cell changes to the erase state (data "11").

One example of the data write method in the typical four level storage method (2 bit/cell storage method) is as described above. Even in the multiple bit storage methods for 3 or more bits, since the threshold voltage distribution is divided into 8 types of operations corresponding to the upper page data in the operation described above, basically the operation remains the same.

[SSD Operation Explanation]

The SSD operation is described by using FIG. 4. When the IFC 30 receives a command from the host 3 via the interface 19, the IFC 30 sends the command to the SSDC 26. The SSDC 26 processes the command received. For example, the LBA is included in the command as a logical address. The SSDC 26 converts the LBA to the physical address by referring to the control information 31. The pages in the NAND memory chip are identified by entering a part of the physical address bits to the control signal input terminal 38 of the NAND memory chip (refer FIG. 5).

FIG. 10 shows the configuration of the control information 31 used by the SSD 2. The control information 31, as described earlier, is stored in the non-volatile NAND memory 24. The control information 31 stored in the NAND memory 24 is read out into the RAM 25 at the start of the SSD 2. The control information 31 in the RAM 25 is copied into the NAND memory 24 at periodic intervals or at the time of power down operation. When RAM 25 is a non-volatile RAM like the MRAM, FeRAM and the like, the control information is stored only in the RAM 25, and the control information is not stored in the NAND memory 24 in this case.

As shown in FIG. 10, the control information includes a free block table 50, an active block table 51, a track table 52 (logical-to-physical conversion table of track units) and a cluster table 53 (logical-to-physical conversion table of cluster units).

Figure 11:
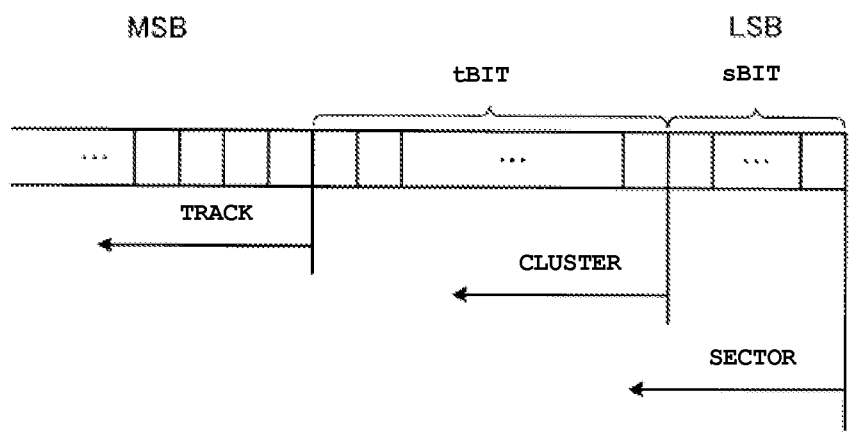
FIG. 11 shows the relationship between the control unit of the SSD and an LBA.

The LBA, as shown in FIG. 11, a logical address in which serial numbers from zero are attached to logical sectors (size: e.g., 512 B). In the present embodiment, as a management unit of the LBA of the SSD 10, a cluster address formed of a bit string equal to or higher in order than a low-order (s+1)th bit of LBA and a track address formed of a bit string equal to or higher in order than a low-order (s+t+1)th bit of LBA are defined.

In other words, the logical sector is a minimum access unit from the host 3. The cluster is a control unit for controlling 'small data' in the internal parts of the SSD, wherein, 2 or more natural numbers for the sector size are defined to become the cluster size. Further, the track is a control unit for controlling 'large data' in the internal parts of the SSD, wherein 2 or more natural numbers for the cluster size is defined to become the track size. Therefore, a track address is the quotient when dividing LBA by a track size and an intra-track address is the remainder when dividing LBA by a track size, and a cluster address is the quotient when dividing LBA by a cluster size and an intra-cluster address is the remainder when dividing LBA by a cluster size.

In the present embodiment, the size of a track is equal to the size of data recordable in one physical block (when a redundant bit in ECC processing performed in the SSDC 26 is included in a physical block, this is excluded from the size) and the size of a cluster is equal to the size of data recordable in one physical page (when a redundant bit in ECC processing performed in the SSDC 26 is included in a physical page, this is excluded from the size).

Note that, it is desirable to keep the management unit size of the LBA to a multiple of control units of size 2 or more natural numbers in order to minimize the data size of the control information and to achieve high performance of the SSD. However, even if it is controlled by a single control unit or directly controlled by the logical sector, it does not affect the essence of the present disclosure.

The physical address includes the physical block ID and its address. The NAND memory chip and block are specified by the physical block ID specification.

The free block table (FB table) 50 manages the deallocated block (free block: FB) ID which can be newly allocated for writing while writing to the NAND memory 24. The valid data is not stored in the free block. The free block includes a complete free block and the recordable blocks. The complete free block means the free block on which the erase operation needs to be carried out for reuse. After the erase operation, the data can be written from the page positioned at the start of the block. The recordable blocks can be used again without executing the erase operation for the unwritten left over pages, and the data can be written to the remaining unwritten pages. The free block table 50 tracks the number of erase operations for each block ID and the recordable address COFF in the block. The recordable address COFF in the block indicates the beginning address for the page that can be added in the block, wherein when COFF=NULL, the blocks are termed as complete free blocks that cannot be added, and when COFF=valid value, the blocks are termed as recordable blocks. The available space is less when COFF value is high.

The active block table (AB table) 51 manages the active blocks (AB) ID in which valid data is already written. Further, it manages the number of erase operations (erase count) for each block ID and the recordable address COFF in the blocks. When COFF=valid value, even in the case of active block, it can be added from the recordable address COFF in the block.

The track table 52 tracks the correspondence relation between the track address and block ID which stores the track data corresponding to the track address. It also tracks the invalid flag for each track address.

The cluster table 53 tracks the correspondence relation between the cluster address, the block ID which stores the cluster data corresponding to the cluster address and the address in the block which stores the cluster data corresponding to the cluster address. The cluster table 53 also tracks the invalid flag for each cluster address.

The block (active block) registered in the active block table 51 stores the valid data for the SSDC 26. The free block table 50 lists and tracks the physical block ID which is not associated to the logical address (LBA). The block (free block) which is registered in the free block table 50 does not stores valid data.

[Forward Address Conversion]

Figure 12:
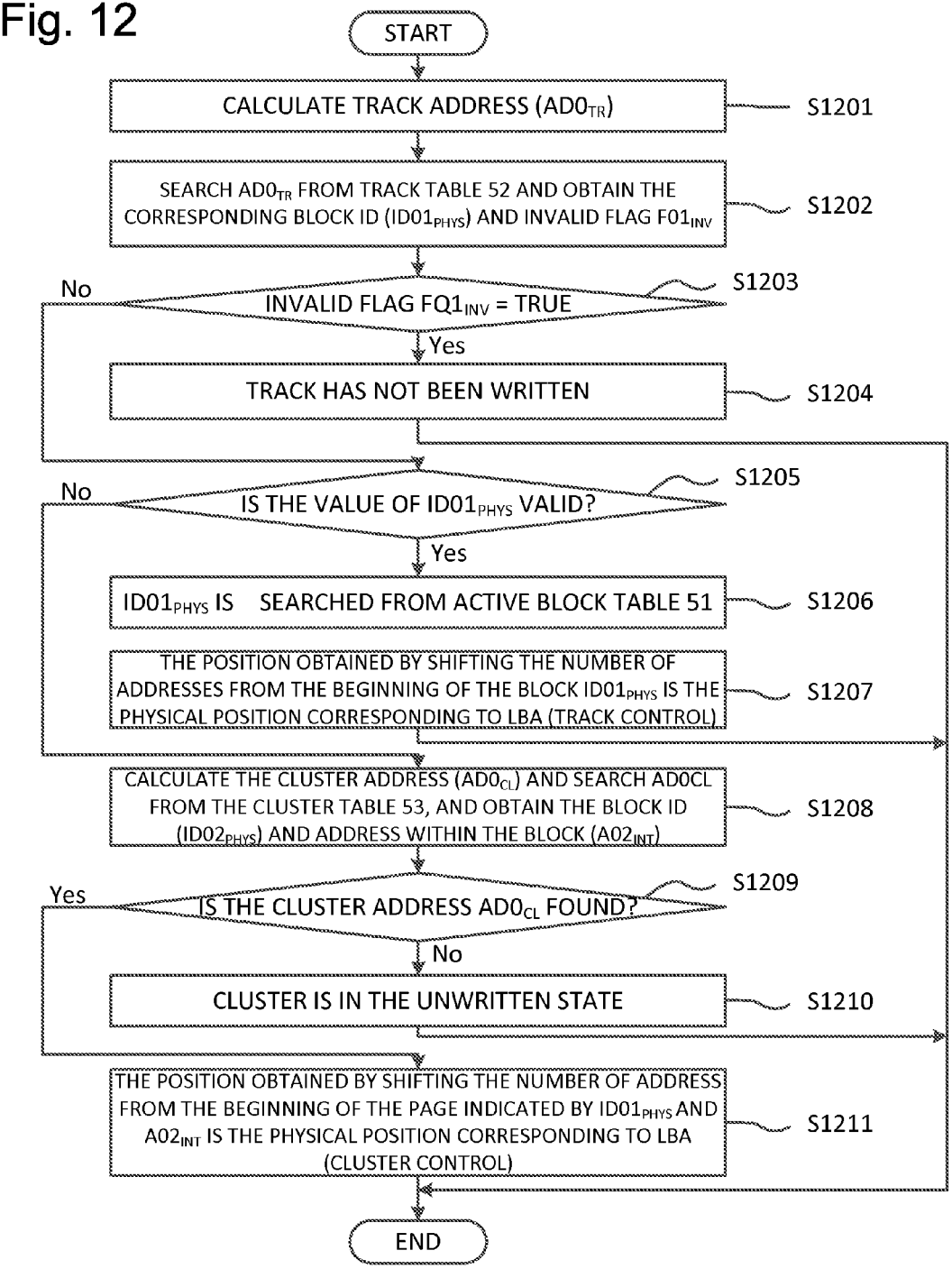
FIG. 12 is flow chart that shows a procedure to specify a physical address from the LBA.

Next, the procedure (address forward procedure) for identifying the physical address from the LBA in the SSD 2 is described using FIG. 12. The procedure given below is executed by the SSDC 26. The host 3 sends the command including the LBA (starting LBA) and the logical sector length for the write and read commands to be executed in the SSDC 26 to the SSD 2. When the LBA (starting LBA) and the logical sector length are specified, the LBA and the logical sector specifies an LBA area AREAinit which is a continuous LBA area from the LBA to the terminal address=(specified LBA+logical sector length−1).

The SSDC 26 divides the AREAinit into the track units. A procedure shown in FIG. 12 is carried out for the LBA area AREAsub of the track units which are the components obtained after the breakdown. At first, the SSDC 26 calculates the track address AD0TR from starting the LBA of the AREAsub (Step S1201). The SSDC 26 searches the track address AD0TR from the track table 52 and obtains an invalid flag F01inv of the block ID (ID01phys) and the track AD0TR corresponding to the AD0TR (Step S1202). When the invalid flag F01inv is true, and there is no particular physical address corresponding to the AD0TR, it is termed as 'track AD0TR is in unwritten state' (Step S1204). When the invalid flag F01inv is false, it determines whether or not the block ID (ID01 phys) is a valid value (Step S1205). When the block ID (=ID01 phys) is a valid value, ID01 phys is retrieved from the active block table 51 (Step S1206), the memory cell position and the upper/lower bits corresponding to the specified LBA are specified using the position which shifts the track address from the top position of the ID01 phys and the physical position is specified (Step S1207). In this case, The SSDC 26 does not need the cluster table 53 to specify the physical address of the data corresponding to the LBA area AREAsub of the track unit. The LBA area is termed as 'managed in a track unit' or 'controlled by track'.

In Step 1205, when the block ID (ID01 phys) is an invalid value, the SSDC 26 further divides the LBA area AREAsub of the track units and in the procedure given below is executed for the LBA area AREAsubsub of cluster units which are the components obtained after the breakdown. The SSDC 26 calculates the cluster address $AD0_{CL}$ from the beginning LBA of the AREAsubsub, retrieves $AD0_{CL}$ from the cluster table 53 and obtains the corresponding block ID (ID02phys) and the corresponding address $A02_{int}$ in the block (Step S1208). When the cluster address $AD0_{CL}$ are not found in the cluster table 53 (Step S1209: No), it is considered as the 'cluster $AD0_{CL}$ is in unwritten state' and the cluster $AD0_{CL}$ does not have a physical address (Step S1210). When the cluster address $AD0_{CL}$ are found (Step S1209: Yes), the position of clusters in the address which have shifted from the starting position of the page specified in the block ID (ID02phys) and address $A02_{int}$ in the block becomes the physical position corresponding to the LBA area AREAsubsub of the cluster units (Step S1211). The SSDC 26 cannot identify the physical address of the data corresponding to the AREAsubsub area without the cluster table 53. The LBA area is termed as 'managed in a cluster unit' or 'controlled by cluster'.

[Invalid Data Log]

Figures 13, 14:
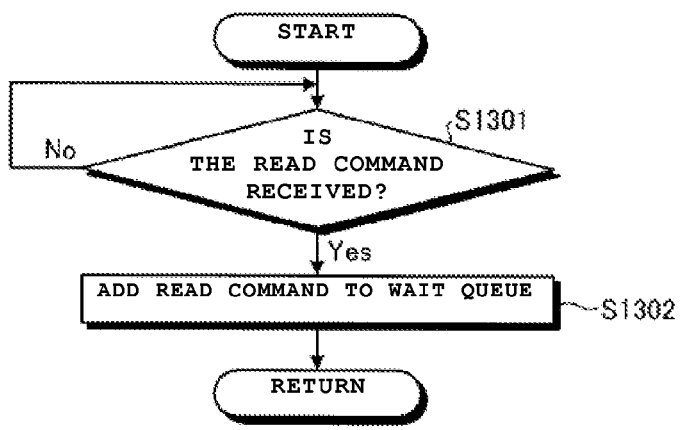
FIG. 13 shows an invalid data log.
FIG. 14 is flowchart that shows an example of the reading operation of the SSD.

FIG. 13 shows the details of an invalid data log 60 (an invalid data table 60) stored in the RAM 25. The invalid data log 60 contains physical addresses which are not associated with the LBA area in the track table 52 and the cluster table 53, and the data associated with which are not erased from the NAND memory 24. In other words, prior mappings of logical addresses to old physical addresses having invalid data are stored in the invalid data log 60. Such invalid data, for example, is the data stored in the free block; further, it includes the data for which the invalid flag is true for the track table 52 and the data not included in the cluster table 53 regardless of the cluster control. By tracking the invalid data through the invalid data log 60, the host 3 can arbitrarily erase the data and improve the user security level.

The invalid data log 60 includes a track unit invalid data log 61 for tracking the invalid data log of the track units and a cluster unit invalid data log 62 of the cluster units. The correspondence between the block ID of the invalid data and the track address is tracked in the track unit invalid data log 61. The correspondence between the block ID of the invalid data and the address within the block, and the correspondence with the organization completion (organized) flag are tracked in the cluster unit invalid data log 62.

The invalid data log 60 should preferably track all invalid data to achieve the data erase easily. On the other hand, to improve the overall processing performance of the SSD 2, the LBA area of the data which does not need to employ a secure deletion process, may be notified by the host 3 and such notified LBA area may be removed from the invalid data log 60, thus, enabling the reduction in data log size. The SSDC 26 copies the invalid data log 60 into the NAND memory 24 periodically. The SSDC 26 may store a major part of the invalid data log 60 in the NAND memory 24 and may store only a part of the invalid data log 60 in RAM 25.

[Read Operation]

Figure 15:
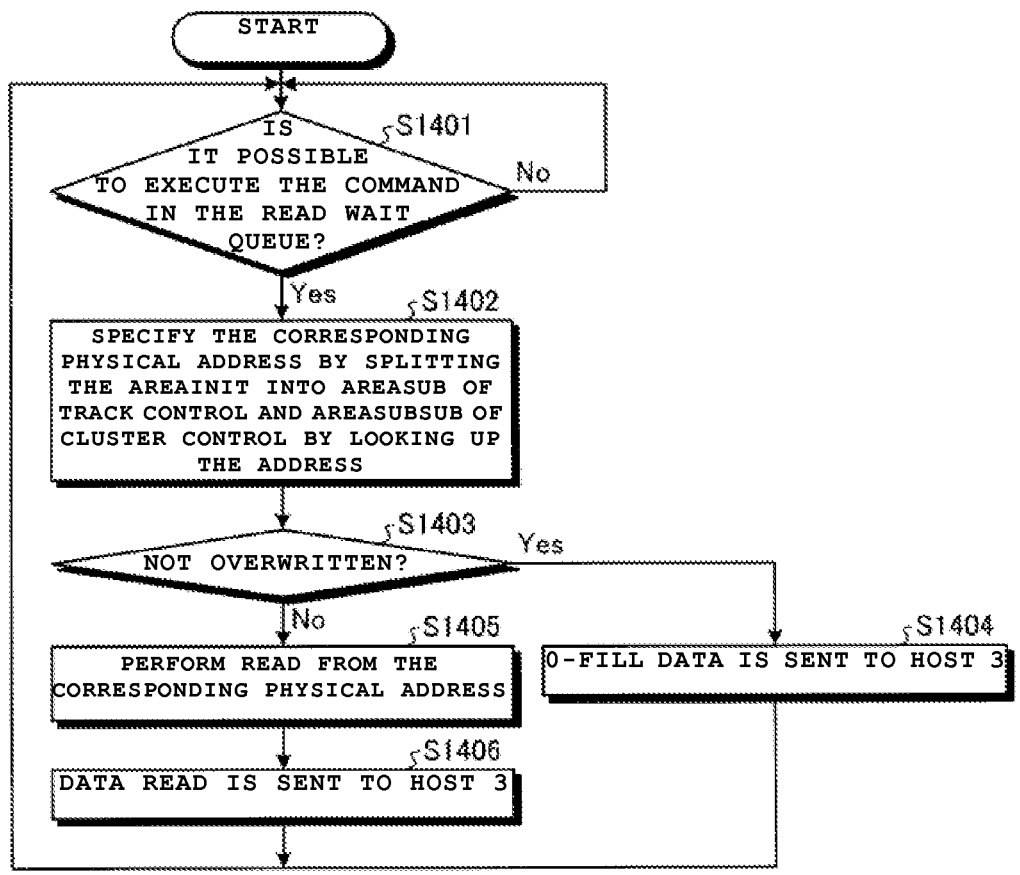
FIG. 15 is a flow chart that shows steps of a reading operation of the SSD.

Next, the read operation in the SSD 2 is described by using FIG. 14 and FIG. 15. As shown in FIG. 14, when the SSD 2 receives a read command from the host 3 (Step S1301), the SSDC 26 adds the read command queue to a read command queue buffer in the RAM 25 (Step S1302) and transmits a reception response notifying of reception of the read commands to the host 3. In some embodiments, the SSD 2 might not send any response to host 3. The read command queue includes an LBA and a logical sector length included in the read command. The LBA area AREAinit specified by the queue begins at the specified LBA and is continuous until the terminal LBA (specified LBA+logical sector length−1).

As shown in FIG. 15, the SSDC 26 periodically monitors the read command buffer. When a read command can be executed (Step S1401: Yes), the AREAinit is divided into AREAsub of track control and partial area of AREAsubsub of cluster control using the address forward procedure described earlier, and the physical address corresponding to these is identified (Step S1402). The read operation described below is carried out in each of these partial areas. The SSDC 26 determines whether the partial area specified by the physical address is an unwritten area (Step S1403), and when the area is unwritten, the read operation is not carried out for the NAND memory 24, for example, 0-fill data filled with 0's is considered as the read data and sent to the host 3 (Step S1404). For the partial areas which have been written, the SSDC 26 reads from the NAND memory 24 for the physical address of the partial area (Step S1405) and sends the read data to the host 3 through the IFC 30 (Step S1406). Note that, the data read from the NAND memory 24 can be written once to the RAM 25 and the data written to the RAM 25 can be sent to the host 3.

[Write Operation]

Figure 16:
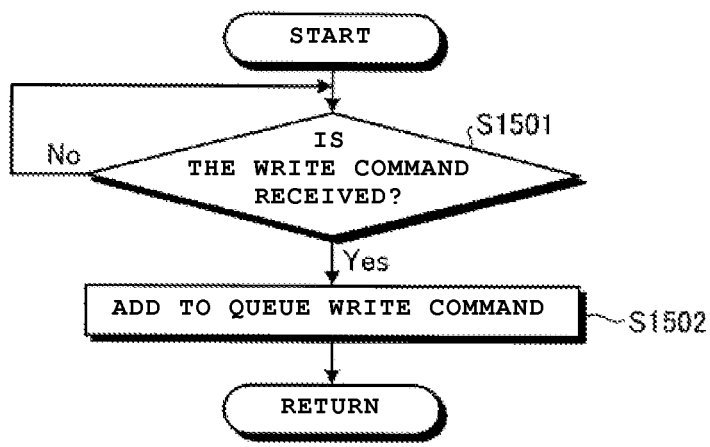
FIG. 16 is a flow chart that shows additional steps of the writing operation of the SSD.
Figure 17:
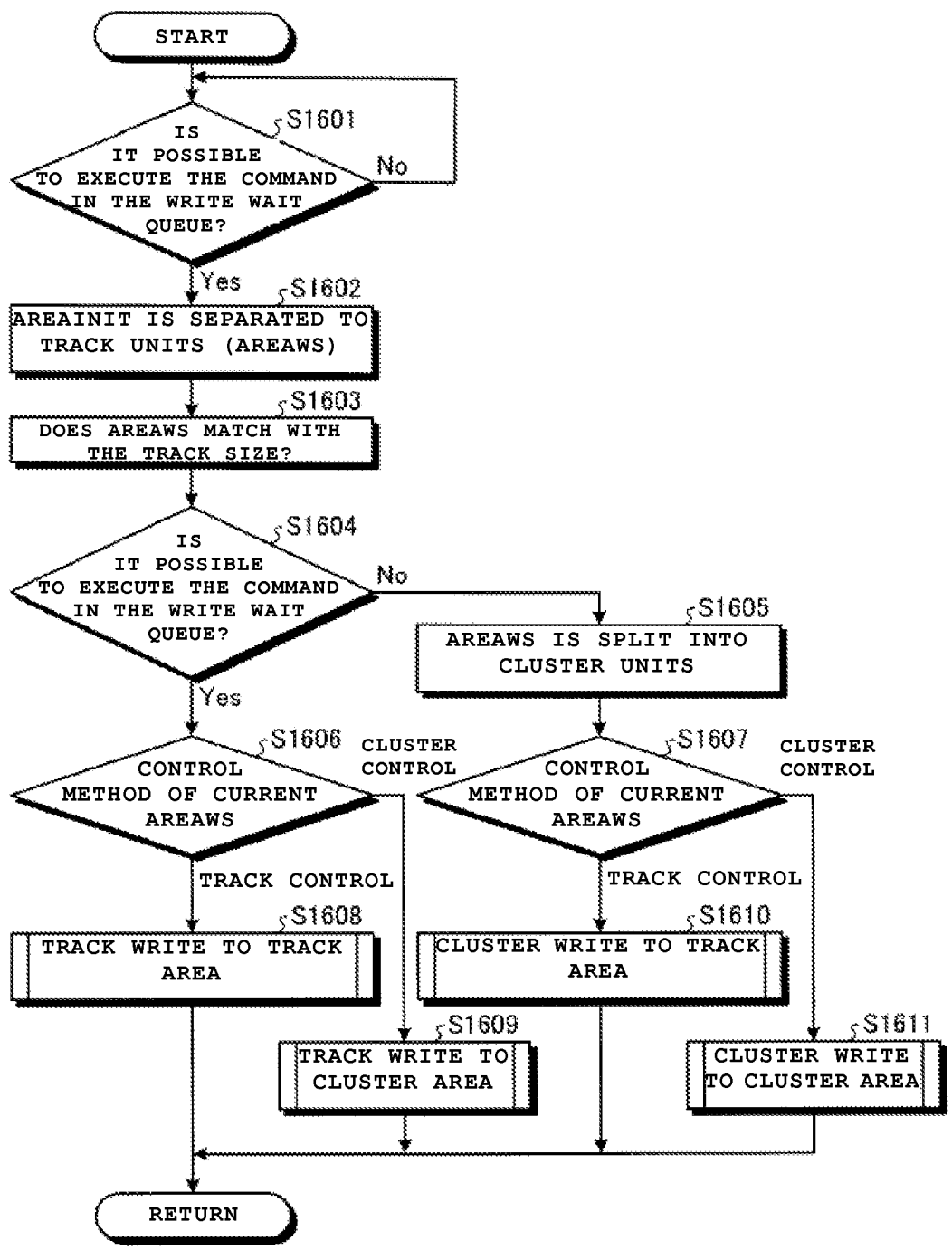
FIG. 17 is a flow chart that shows steps of the writing operation of the SSD.

Next, the write operation in the SSD 2 is described by using FIG. 16 and FIG. 17. As shown in FIG. 16, when the SSD 2 receives the write commands from the host 3 (Step S1501), the SSDC 26 adds these write commands to the write command queue buffer in the RAM 25 (Step S1502) and transmits a reception response notifying of reception of the write commands to the host 3. In some embodiments, the SSD 2 may not send a response to the host 3. The write command queue includes an LBA and a logical sector length included in the write command. The LBA area AREAinit specified by the queue begins at the specified LBA and is continuous until the terminal LBA (specified LBA+logical sector length−1).

Figure 18:
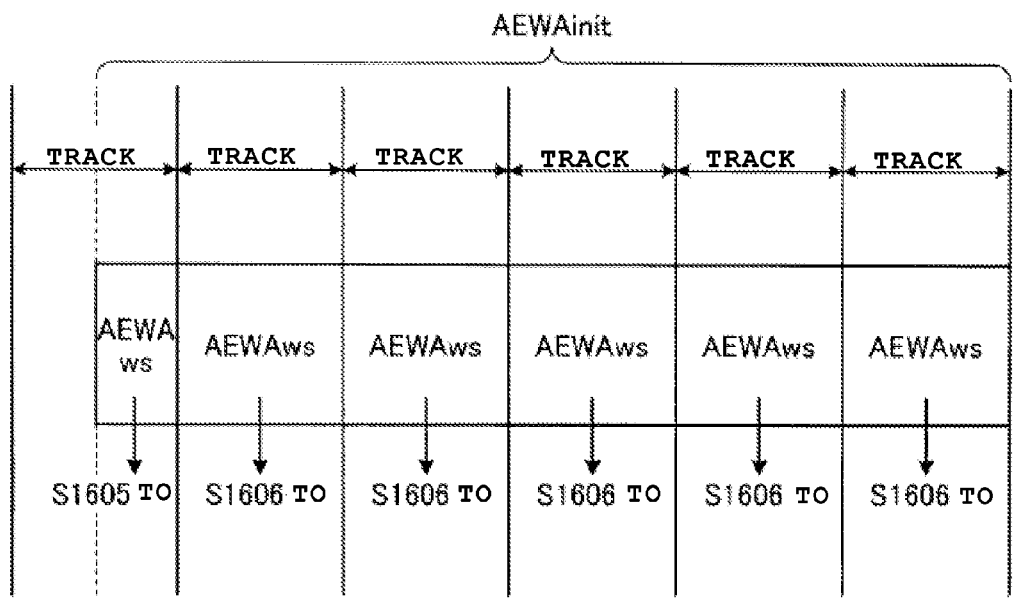
FIG. 18 is a flow chart that shows additional steps of the writing operation of the SSD.

As shown in FIG. 17, the SSDC 26 periodically monitors the write command queue. When a write command can be executed, (Step S1601: Yes), the SSDC 26 notifies the host 3 of ready status for data transfer and the host 3 send data to be written to the SSD 2. In some embodiments, this notification might not be sent. SSDC 26, as shown in FIG. 18, separates LBA area, AREAinit specified by the write command into track units AREAws (Step S1602). Hereafter, the steps after Step S1603 are carried out respectively for each AREAws.

The SSDC 26 carries out the address forward conversion for the track unit AREAws (Step S1603). The SSDC 26 determines whether the track unit AREAws matches with the track size (Step S1604), and when it matches with the track size, the procedure is moved to Step S1605 if the track size is less in Step S1606. As shown in FIG. 18, the track unit AREAws moves the track units with less size to Step S1605. The remaining parts are moved to Step S1606.

In case of Step S1605, the LBA area of AREAws is separated into cluster unit AREAwscl (Step S1605). When the cluster size is less, the cluster unit AREAwscl (when the number of sectors is less than the cluster size) obtains the physical address of the cluster belonging to the cluster unit AREAwscl using the cluster table 53, reads the entire data included in the cluster from the NAND memory 24 to the RAM 25, rewrites the AREAwscl data received from the host 3 on the RAM 25 for the data read from the NAND memory 24. This data is considered as the cluster unit AREAwscl data. In this way, even when the cluster size of the cluster unit AREAwscl is less, the data size can be matched with the cluster size.

Further, based on the forward conversion results of Step S1603, in Steps S1606 and S1607, it is determined whether the track unit AREAws carries out the current track control or the cluster control, and then divided into track control AREAsub and cluster control AREAsubsub. As a result, the procedure moves to either of these steps such as the Step S1608 which carries out the track writing for the track controlled LBA area (hereafter, referred to as the track control area). Step S1609 carries out the track writing for the cluster controlled LBA area (hereafter referred to as the cluster control area), S1610 carries out the cluster writing for the track control area and S1611 carries out the cluster writing for the cluster control area.

[S1608: Writing the Track to the Track Control Area]

Figure 19:
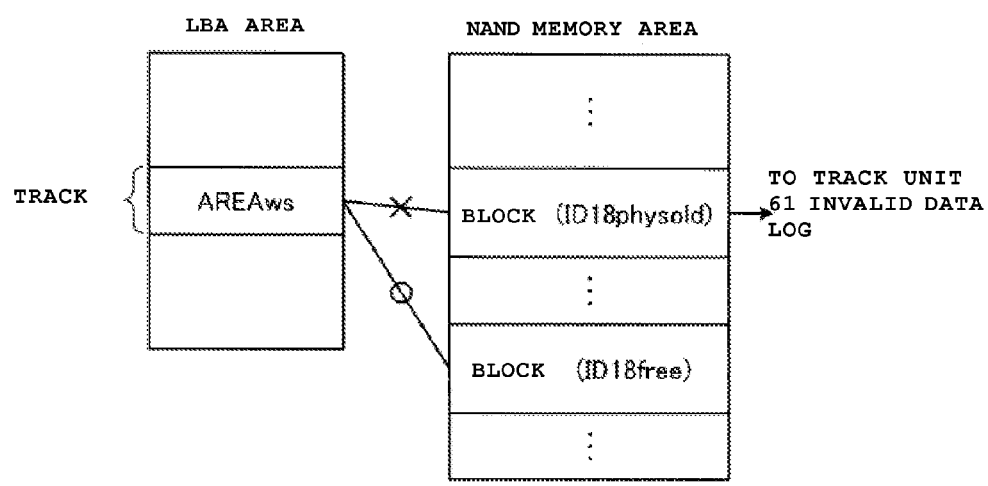
FIG. 19 is a conceptual diagram that depicts track writing to a track control area.

FIG. 19 indicates the outline in case of writing the track to the track control area. The track is controlled by first writing the track with track address AREAws in the block (block ID=ID18physold). The track AREAws is updated and new track data is written. The SSDC 26 obtains a free block (block ID=ID18free) and after writing the new track data to the free block, considers this block to be an active block. A block with an old track data written on it (block ID=ID18physold) is considered to be the free block and the block ID=ID18physold and track address AREAws are added to the track unit invalid data log 61.

Figure 20:
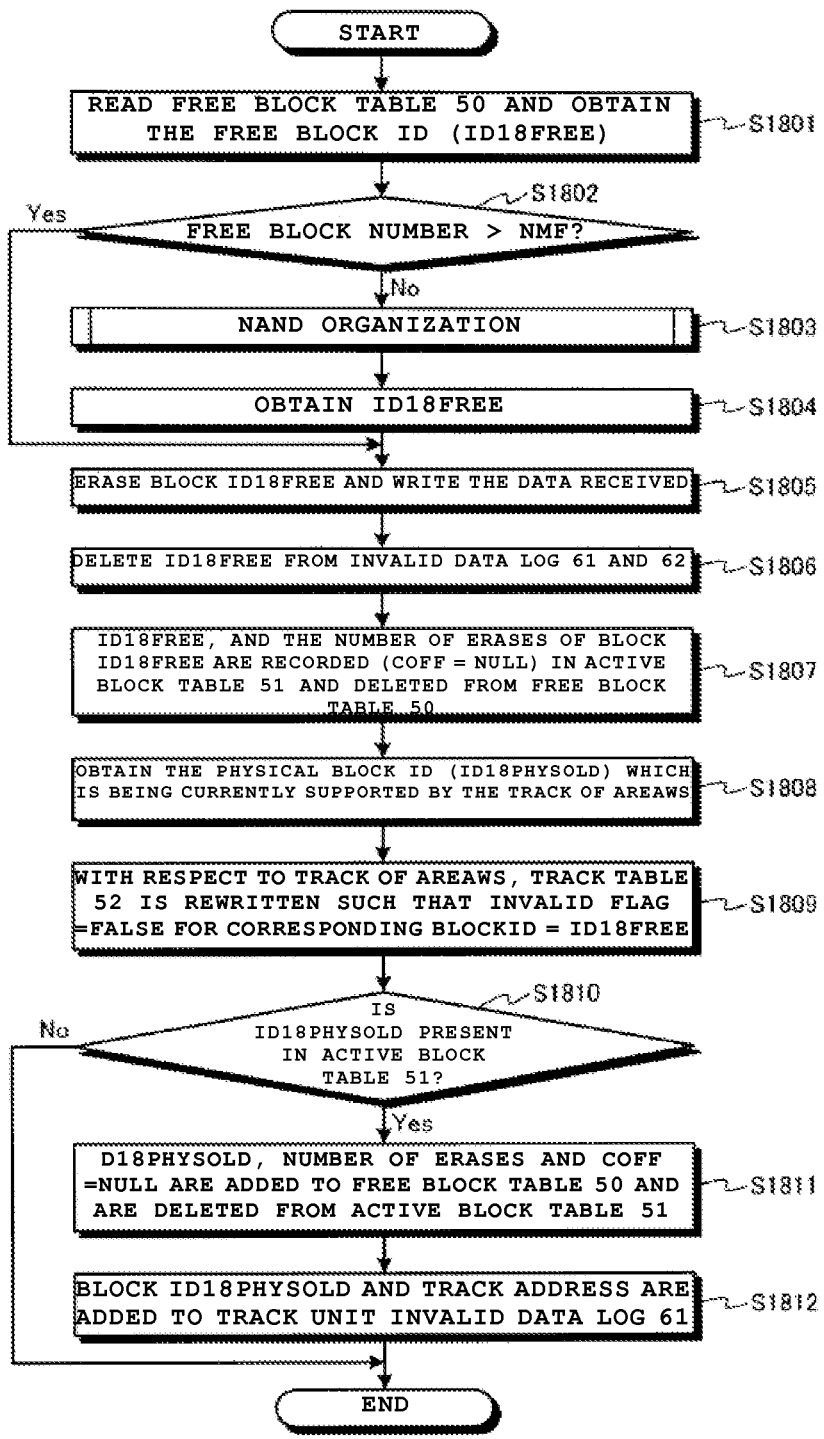
FIG. 20 is a flow chart that shows a procedure of track writing to the track control area.

FIG. 20 indicates a detailed procedure of writing the track to the track control area. The SSDC 26 reads the free block table 50 and obtains the block ID (ID18free) of the free block (Step S1801). If the count of free block is less than or equal to NMF, a criteria of free block count, a NAND described later is organized (Step S1803) and then the block ID (ID18free) of free block is obtained (Step S1804). To reduce the number of erases of NAND memory, it is preferable to retain the free block by allocating it by giving priority to the block with COFF=NULL and less number of erases of the free block table 50. If the block with COFF=NULL does not exist, it is preferable to retain the free block by allocating it by giving priority to the block starting with large COFF value. In addition, the criteria NMF for the free block count is preferably greater than or equal to the free block count necessary for collecting garbage data in the NAND described later. At the time of occurrence of bad block, SSD 2 become inoperative and to prevent this, it is more desirable to set the criteria by keeping a certain degree of margin.

The SSDC 26 erases the free block of obtained block ID (ID18free) and writes the track data received from the host 3 to the erased free block (=ID18free) (Step S1805). The SSDC 26 searches the block ID (=ID18free) in the track unit invalid data log 61 and the cluster unit invalid data log 62 and deletes all entries of block ID (=ID18free) from the track unit invalid data log 61 and the cluster unit invalid data log 62 (Step S1806). The SSDC 26 adds the block ID (ID18free), the number of erases and COFF=NULL to the active block table 51 and further deletes the entry of block ID (ID18free) from the free block table 50 (Step S1807).

The SSDC 26 obtains the block ID (ID18physold) which the track of the track unit AREAws is currently handling, from the track table 52 (Step S1808). Furthermore, the SSDC 26 rewrites the physical block ID of the track unit AREAws of the track table 52 to the ID18free and considers invalid flag as false (Step S1809). The SSDC 26 searches the block ID (ID18physold) in the active block table 51 (Step S1810). If it exists, the SSDC 26 deletes the entry of block ID (ID18physold) from the active block table 51 and then adds the block ID (ID18physold), number of erases and COFF=NULL to the free block table 50 (Step S1811). Furthermore, the SSDC 26 adds the block ID=ID18physold and track address AREAws to the track unit invalid data log 61 (Step S1812).

[S1609: Writing the Track to the Cluster Control Area]

Figure 21:
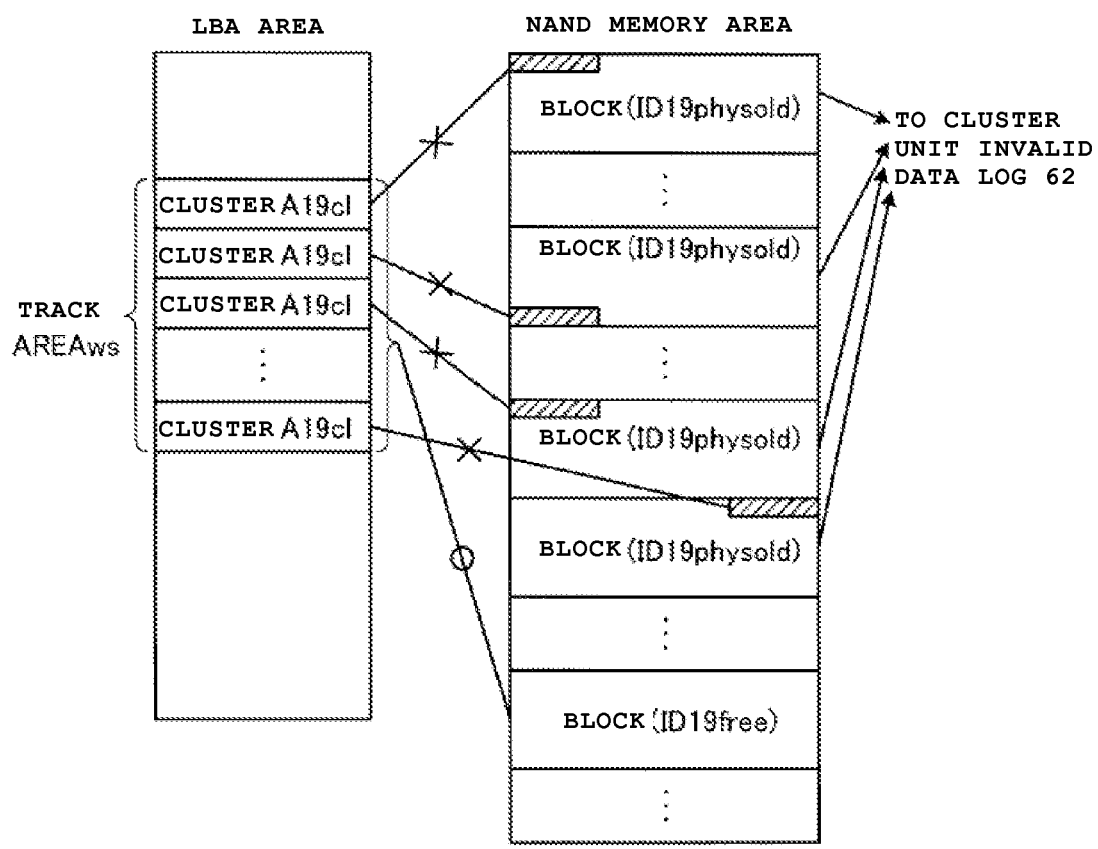
FIG. 21 is a conceptual diagram that depicts track writing to a cluster control area.

FIG. 21 indicates the outline in case of writing the track to the cluster control area.

All clusters (cluster address=A19CL) in the track AREAws are first recollected in multiples of blocks (block ID=ID19physold) and then controlled. The track AREAws is updated and new track data is written. The SSDC 26 obtains the free block (block ID=ID19free) and after writing new track data to the free block considers this block to be the active block. The control table is rewritten in such a way so that the old cluster data (cluster address=A19CL) becomes invalid and new track data (track address=AREAws) becomes valid. The SSDC 26 adds the block ID=ID19physold and cluster address A19CL to the cluster unit invalid data log 62.

Figure 22A:
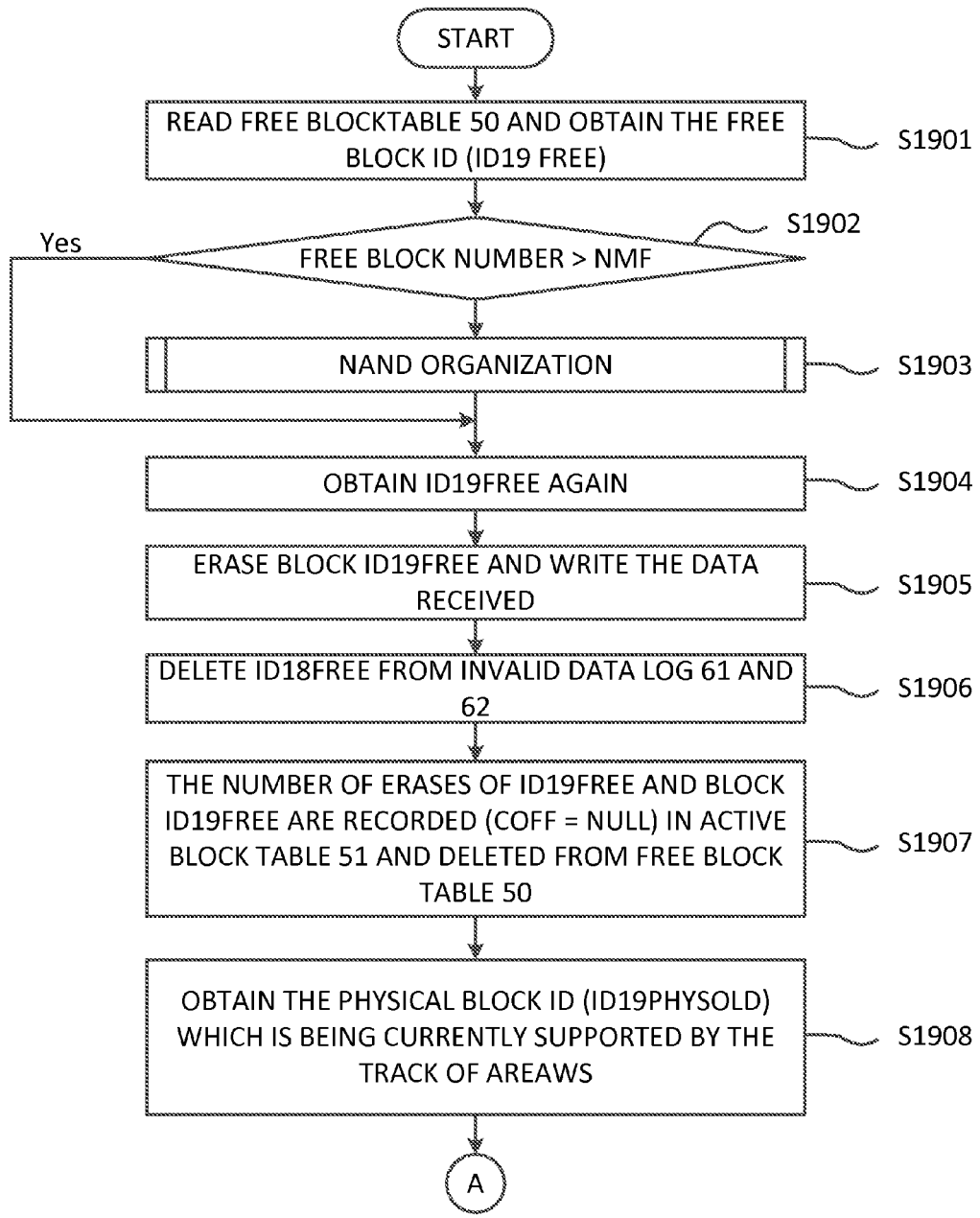
FIG. 22A and FIG. 22B are flowcharts that show a procedure of track writing to the cluster control area.
Figure 22B:
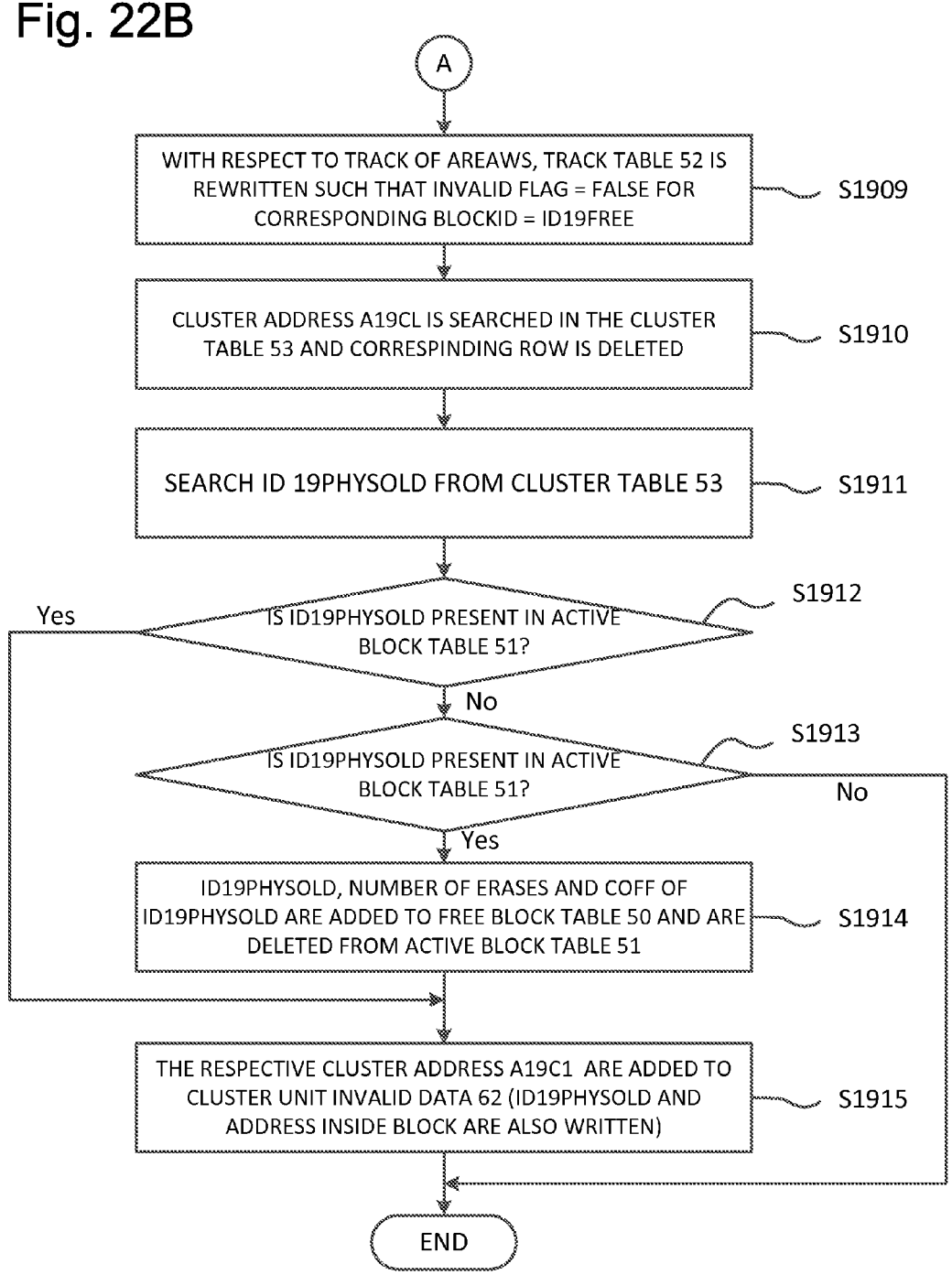

FIG. 22A and FIG. 22B indicate the detailed procedure of writing the track to the cluster control area. The SSDC 26 reads the free block table 50 and obtains the block ID (ID19free) of the free block (Step S1901). If the count of free block is less than or equal to NMF the criteria of free block count, the NAND described later is organized (Step S1903) and then the block ID (ID19free) of free block is obtained (Step S1904). To reduce the number of erases of NAND memory, it is preferable to retain the free block by allocating it by giving priority to the block with COFF=NULL and less number of erases of the free block table 50. If the block with COFF=NULL does not exist, it is preferable to retain the free block by allocating it by giving priority to the block starting with large COFF value.

The SSDC 26 erases the free block of obtained block ID (ID19free) and writes the track data received from the host 3 to the erased free block ID (ID19free) (Step S1905). The SSDC 26 searches the block ID (ID19free) in the track unit invalid data log 61 and the cluster unit invalid data log 62 and deletes all entries of block ID (ID19free) from the track unit invalid data log 61 and the cluster unit invalid data log (Step S1906). The SSDC 26 adds the block ID (ID19free), the number of erases and COFF=NULL to the active block table 51 and further deletes the entry of block ID (ID19free) from the free block table 50 (Step S1907).

The SSDC 26 obtains all cluster addresses A19cl and corresponding physical block ID (ID19physold) of all clusters present in the track unit AREAws on the basis of the cluster table 53 (Step S1908). The SSDC 26 rewrites the physical block ID corresponding to the track unit AREAws in the track table 52 to the ID19free and writes invalid flag=false (Step S1909). The SSDC 26 retrieves all cluster addresses A19cl from the cluster table and deletes all corresponding rows (Step S1910).

The SSDC 26 searches the block ID (ID19physold) in the cluster table 53 (Step S1911). If the block ID (ID19physold) exists in the cluster table 53 (Step S1912: Yes), the SSDC 26 adds the block ID=ID19physold, an address in the block, cluster address A19cl and organized block=false to the cluster unit invalid data log 62 (Step S1915). In addition, if the block ID (ID19physold) does not exist in the cluster table 53 (Step S1912: No), the SSDC 26 searches the block ID (ID19physold) in the active block table 51 (Step S1913). If it does not exist, the SSDC 26 finishes the process. If the block ID (ID19physold) exists in the active block table 51 in the Step S1913, the SSDC 26 adds the block ID (ID19physold), the erase count and the address COFF of the block ID (ID19physold) to the free block table 50, deletes the entry of the block ID (ID19physold) from the active block table 51 (Step S1914) and processes Step S1915.

[S1610: Writing the Cluster to the Track Control Area]

Figure 23:
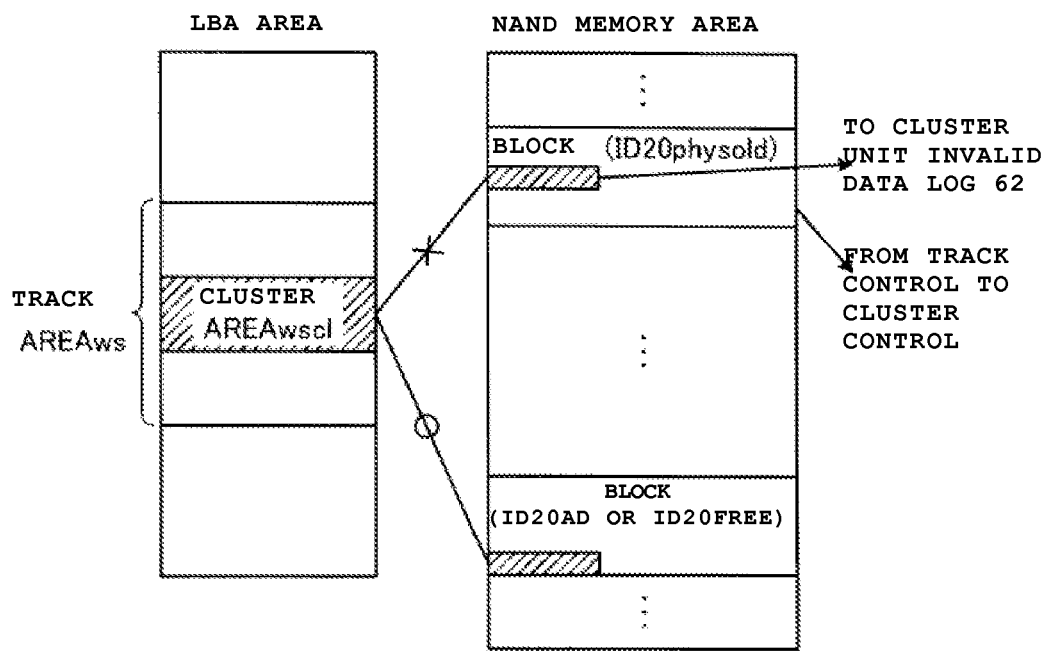
FIG. 23 is a conceptual diagram that depicts cluster writing to the track control area.

FIG. 23 indicates the outline in case of writing the cluster to the track control area. The data of the track corresponding to track address AREAws is written to the block with block ID=ID20physold and is managed in a track unit. When cluster (cluster address=AREAwscl) in the track AREAws is overwritten with new cluster data, the SSDC 26 obtains the free block (block ID=ID20free) or a recordable block (block ID=ID20ad) and writes the new cluster data to the obtained block. The SSDC 26 manages all valid cluster data in the block (block ID=ID20physold) wherein the block data (track address=AREAws) has been written in a cluster unit instead of a track unit. The SSDC 26 adds the block ID=ID 20physold, block inside address (address offset) and cluster address (AREAwscl) to the cluster unit invalid data log 62.

Figure 24A:
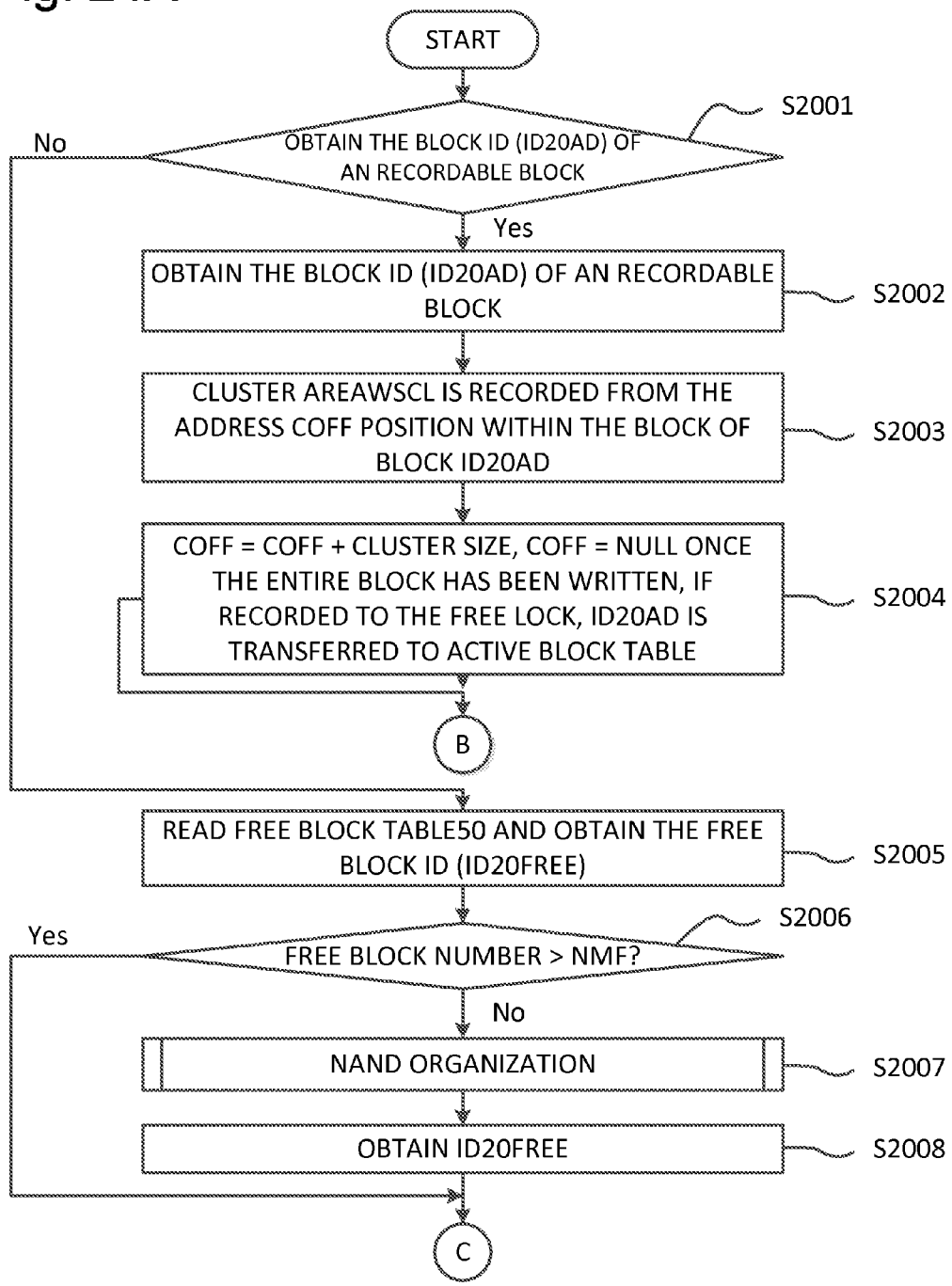
FIG. 24A and FIG. 24B are flowcharts that show a procedure of cluster writing to the track control area.
Figure 24B:
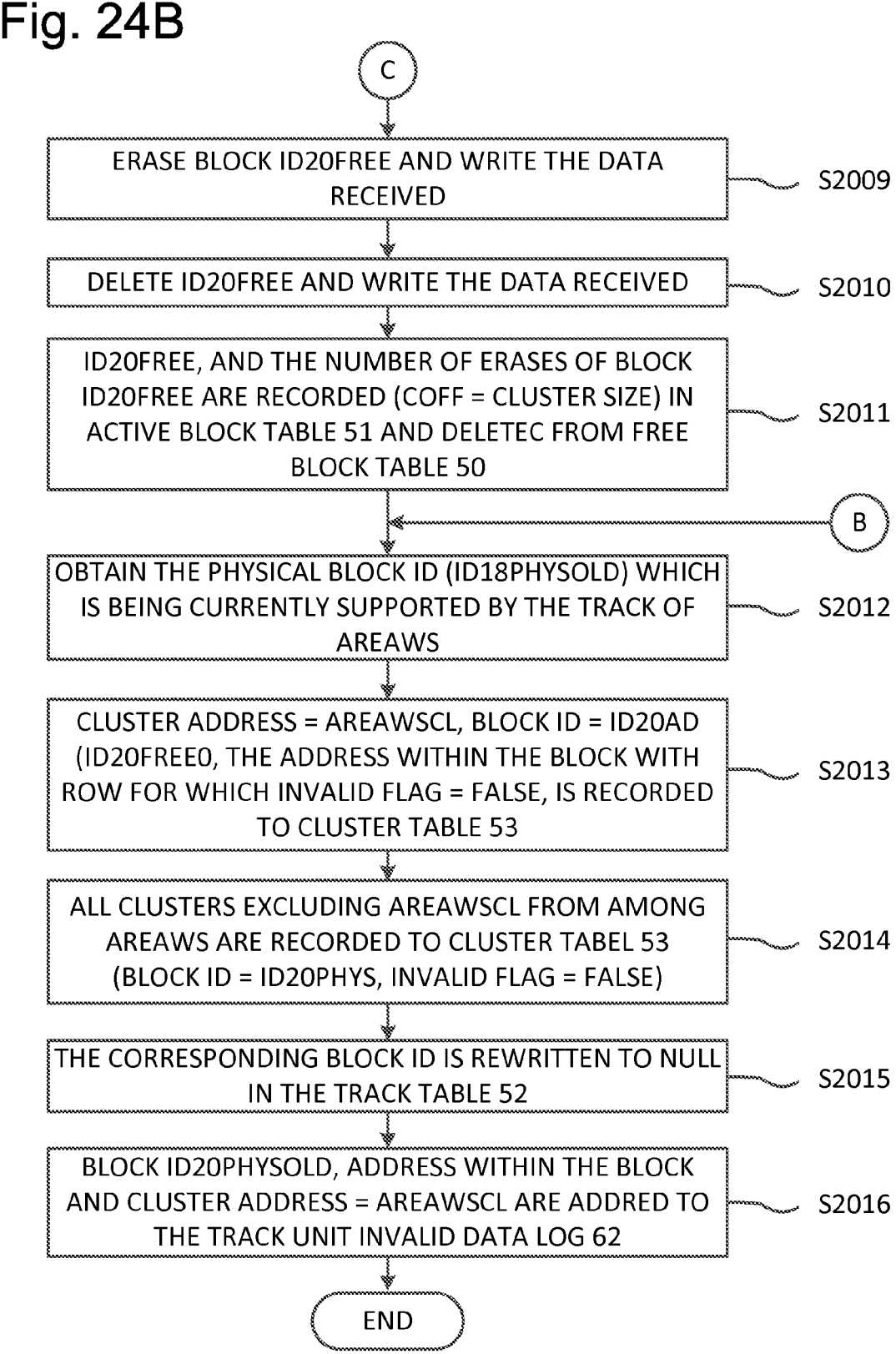

FIG. 24A and FIG. 24B indicate the procedure of writing the cluster to the cluster control area. The SSDC 26 retrieves the blocks with address COFF recorded in the block is not NULL from the active block table 51 and free block table 50. In other words, it retrieves the recordable block (Step S2001). If recordable block exists, the SSDC 26 obtains the block ID=ID20ad of the recordable block (Step S2002) and uses the address COFF corresponding to block ID (ID20ad) as an address offset which is the starting position in the block for programming the cluster data corresponding to the cluster unit AREAwscl (Step S2003). If the recorded block is the free block, the SSDC 26 adds the entry of block ID=ID20ad to the active block table 51 and deletes the same from the free block table 50. The SSDC 26 increments only the cluster size with the address COFF recorded in the block in the active block table 51. If the block size overrun by the address COFF recorded in the block, (when all cells of block ID (ID20ad) are written and no further recording is possible), the SSDC 26 rewrites the active block table 51 by considering the COFF of block ID (ID20ad) as NULL (Step S2004). Then, the procedure moves to the Step S2012. Note that, from the point of view of reduction in the number of erases of NAND memory, it is preferable to first look up in the active block and then the free block to find the recordable blocks.

According to the Step S2001, if the recordable block does not exist, the SSDC 26 reads the free block table 50 and obtains the block ID (ID20free) of the free block (Step S2005). If the count of free block is less than or equal to NMF the criteria of free block count (Step S2006), the NAND described later is organized (Step S2007) and then the block ID (ID20free) of the free block is obtained (Step S2008). To reduce the number of erases of NAND memory, it is preferable to retain the free block by allocating it by giving priority to the block with COFF=NULL of the free block table 50. If the block with COFF=NULL does not exist, it is preferable to retain the free block by allocating it by giving priority to the block starting with large COFF value.

The SSDC 26 erases the block of obtained block ID (ID20free) and writes the cluster data received from the host 3 to the erased block (Step S2009). The SSDC 26 searches the block ID (ID20free) in the track unit invalid data log 61 and the cluster unit invalid data log 62 and deletes all entries of the block ID (ID20free) (Step S2010). In addition, the SSDC 26 adds the block ID (ID20free), the number of erases and COFF=written cluster size to the active block table 51 and further deletes the entry of block ID (ID20free) from the free block table 50 (Step S2011).

The SSDC 26 obtains the block ID (ID20physold) which the track of the track unit AREAws is handling currently, from the track table 52 (Step S2013). The SSDC 26 adds the entries wherein, cluster address=AREAwscl, block ID=ID20ad or ID20free, address in the block=actually written address in the block and invalid flag=false to the cluster table 53 (Step S2013). In addition, the SSDC 26 adds all the clusters from the clusters included in the track specified by the track unit AREAws to the cluster table 53 excluding the clusters specified by the cluster unit AREAwscl. At that time, block ID=ID20physold and invalid flag=false (Step S2014). The SSDC 26 rewrites the block ID corresponding to the cluster specified by the track unit AREAws to NULL in the track table 52 (Step S2015). All data attributed to the track unit AREAws is shifted from the track control area to the cluster control area through the Steps S2013 to S2015.

The SSDC 26 adds all entries of the block ID=ID20physold, address in the block and the cluster address (AREAwscl) to the cluster unit invalid data log 62 (Step S2016).

[S1611: Writing the Cluster to the Cluster Control Area]

Figure 25:
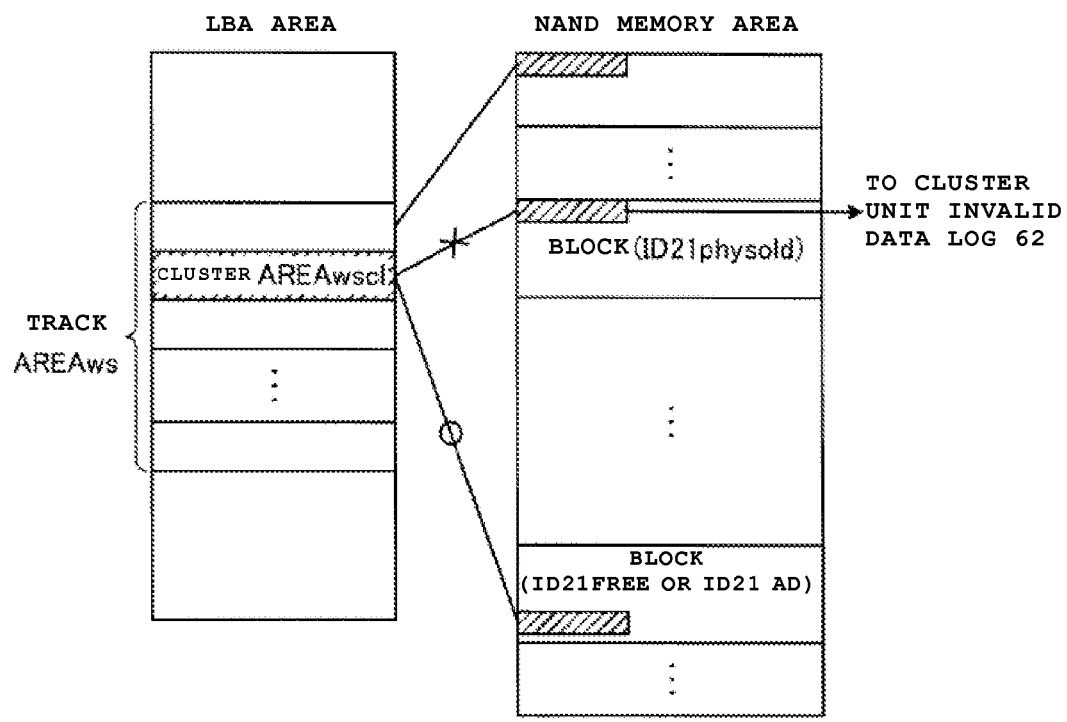
FIG. 25 is a conceptual diagram that depicts cluster writing to the cluster control area.

FIG. 25 indicates the outline in case of writing the cluster to the cluster control area. Data of all clusters in the track AREAws are stored in plural blocks and is managed in cluster unit. The cluster AREAwscl in the track AREAws is first written to the block (Block ID=ID21physold). The cluster AREAwscl is updated and new cluster data is written. The SSDC 26 obtains the free block (block ID=ID21free) or the recordable block (block ID=ID21ad) and writes the new cluster data to the obtained block. The SSDC 26 updates the control table in such a way so that the old cluster data in the block (Block ID=ID18physold) becomes invalid and the new cluster data within the block (Block ID=ID21free or ID21ad) becomes valid. The block ID=ID21physold and cluster address AREAwscl are added to the cluster unit invalid data log 62.

Figure 26A:
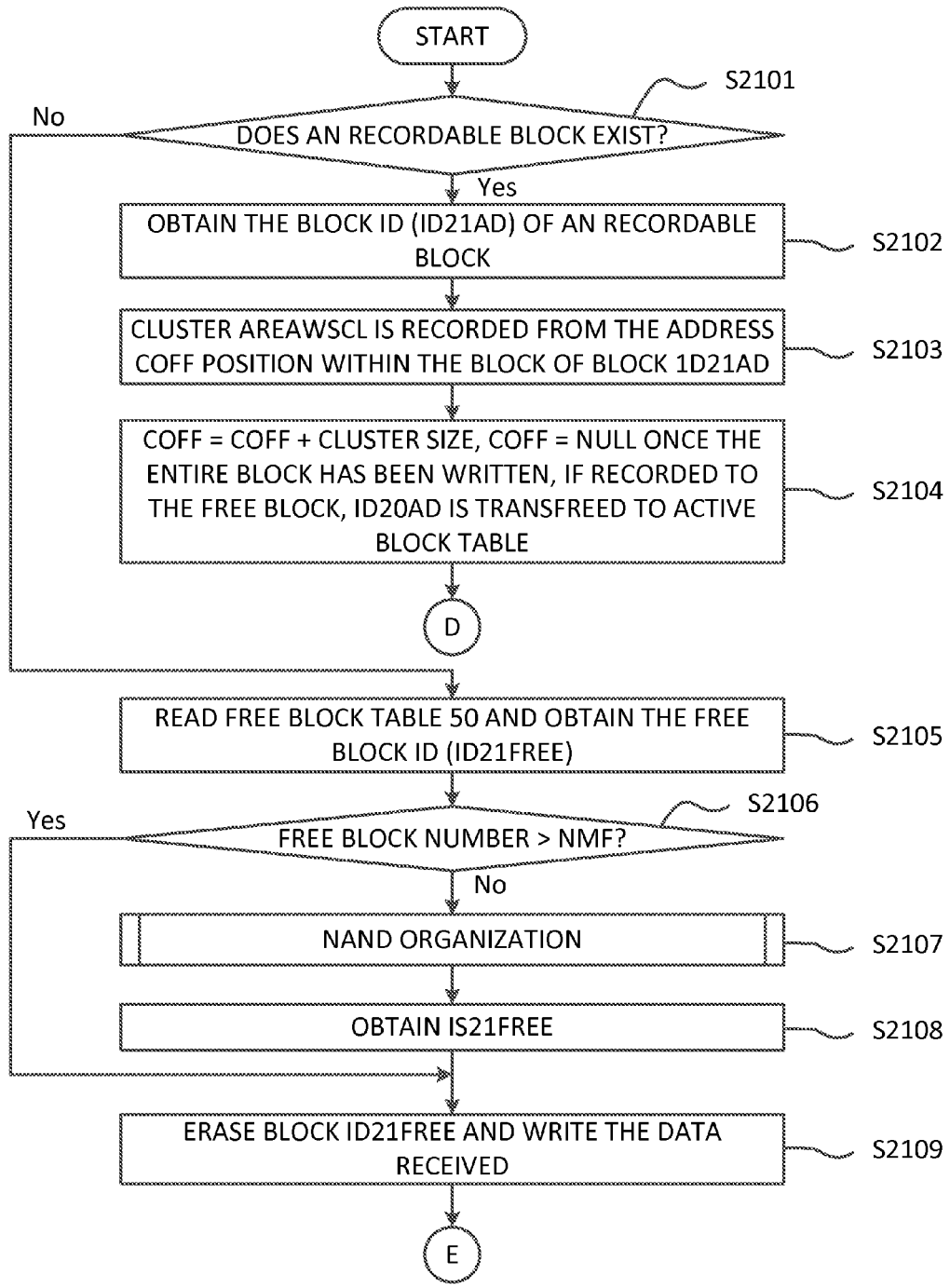

FIG. 26A and FIG. 26B indicate the procedure of writing the cluster to the track control area. The SSDC 26 retrieves the recordable blocks with the address COFF added in the block is not NULL, from the active block table 51 and free block table (Step S2101). If recordable block exists, the SSDC 26 obtains the block ID=ID21ad of the recordable block (Step S2102) and considers the address in the block of block ID (=ID 21ad)=COFF as the starting position for recording and records the cluster data corresponding to the cluster unit AREAwscl from the address in the block=COFF (Step S2103). If the added block is the free block, the SSDC 26 adds the entry of block ID=ID20ad to the active block table 51 and deletes the same from the free block table 50. The SSDC 26 increments only the cluster size with the address COFF recorded in the block in the active block table 51. If the block size is overrun by the address COFF recorded in the block, (when all cells of block ID (ID21ad) are written and no further recording is possible), the SSDC 26 rewrites the active block table 51 by considering the COFF of block ID (ID21ad) as NULL (Step S2104). Note that, from the point of view of reduction in the number of erases of NAND memory, it is preferable to first look up in the active block and then the free block to find the recordable blocks.

According to the Step S2101, if the recordable block does not exist, the SSDC 26 reads the free block table 50 and obtains the block ID (ID21free) of the free block (Step S2105). If the count of free block is less than or equal to NMF the criteria of free block count (Step S2106), the NAND described later is organized (Step S2107) and then the block ID (ID21free) of the free block is obtained (Step S2108). To reduce the number of erases of NAND memory, it is preferable to retain the free block by allocating it by giving priority to the block with COFF=NULL of the free block table 50. If the block with COFF=NULL does not exist, it is preferable to retain the free block by allocating it by giving priority to the block starting with large COFF value.

The SSDC 26 erases the block of obtained block ID (=ID21free) and writes the cluster data received from the host 3 to the erased free block (Step S2109). The SSDC 26 searches the block ID (=ID21free) in the track unit invalid data log 61 and the cluster unit invalid data log 62 and deletes all entries of block ID (=ID21free) from the track unit invalid data log 61 and the cluster unit invalid data log 62 (Step S2110). In addition, the SSDC 26 adds the block ID (ID21free), the number of erases and COFF=written cluster size to the active block table 51 and further deletes the entry of block ID (ID21free) from the free block table 50 (Step S2111).

The SSDC 26 obtains the block ID (ID21physold) which the cluster of the cluster unit AREAwscl is handling currently, from the cluster table 53 (Step S2112). The SSDC 26 rewrites the cluster table 53 in such a way so that the cluster address=cluster unit AREAwscl, block ID=ID21ad or ID21free, address in the block=actually written address in the block and invalid flag=false for the cluster address AREAwscl (Step S2113). Note that, according to the Step S2113, the entries are added when the cluster address=AREAwscl does not exist in the cluster table.

The SSDC 26 searches the block ID=ID21physold in the cluster table 53 (Step S2114). If the block ID=ID21physold exist in the cluster table 53 (Step S2115: yes), block ID=ID21physold, the address in the block wherein, the cluster data specified by the cluster unit AREAwscl is written, cluster address=AREAwscl, organized flag=false are added to the cluster unit invalid data log 62 (Step S2118). In addition, the SSDC 26 finishes the process, when the block ID (ID21physold) does not exist in the cluster table 53 (Step S2115: No) and when the block ID=ID21physold does not exist in the active block table 51 after retrieving it from the active block table 51 (Step S2116). In addition, the SSDC 26 adds the block ID=ID21physold, the number of erases and entries wherein, and the COFF which is COFF of ID 21physold to the free block table 50 and deletes the entries of block ID=ID21physold from the active block table 51 when the block ID=ID21physold does not exist in the active block table 51 (Step S2117). After that, it executes the procedure of Step S2118.

[NAND Organization (NAND GC)]

The SSD 2 is configured to keep the entire LBA capacity less than the capacity of NAND memory 24. As a result, the free blocks are not exhausted as long as the writing operation is continued in the track unit. On the other hand, if writing operation in cluster units are processed repeatedly, the page of NAND memory wherein the cluster data has been written become invalid and the free block capacity (NAND memory capacity-invalid data-control information) is exhausted because such invalid data is accumulated as garbage. If NAND garbage collection (NAND GC) is processed, the SSDC 26 can obtain new free blocks by reducing the invalid data.

Figure 27A:
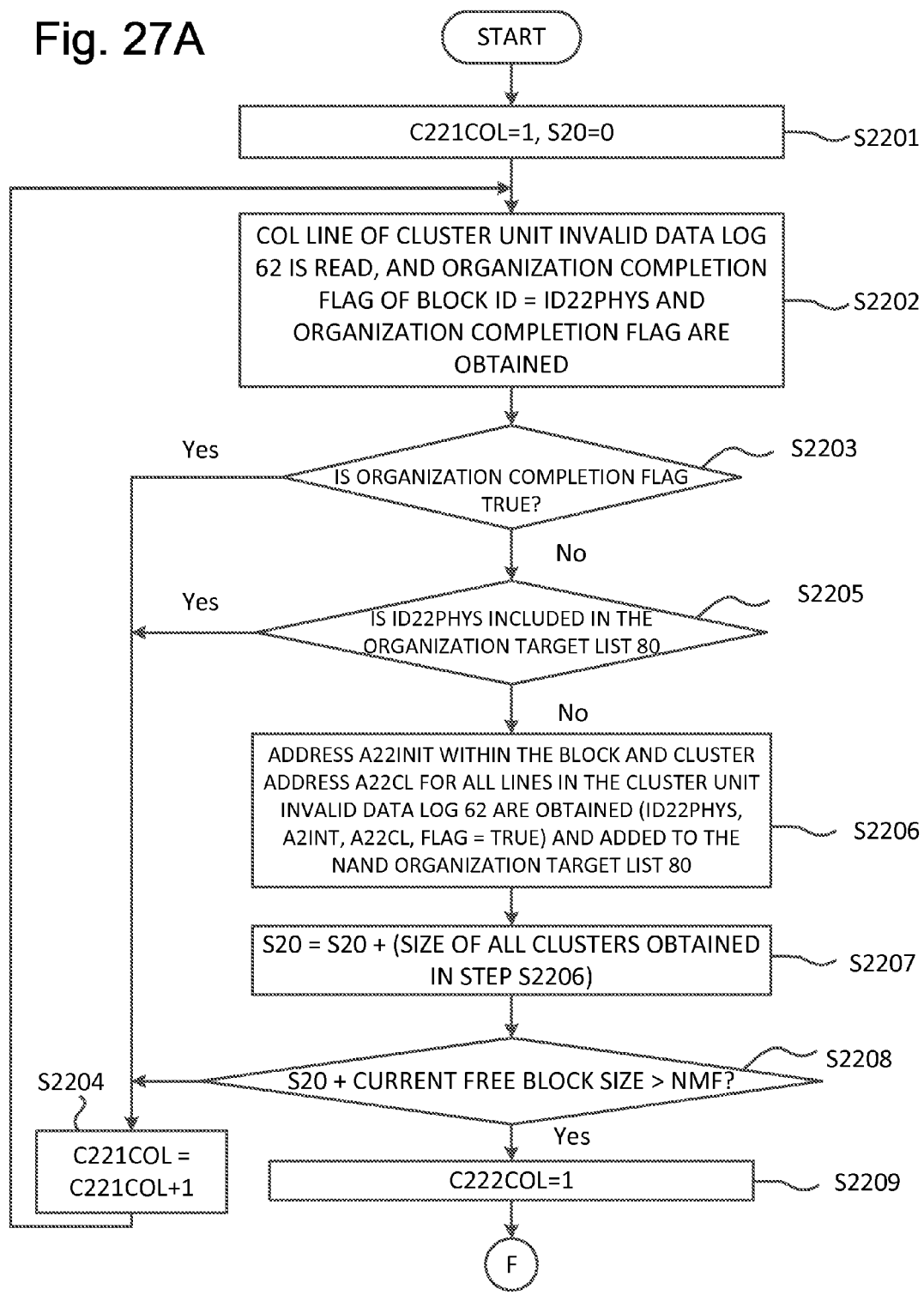
Figure 27C:
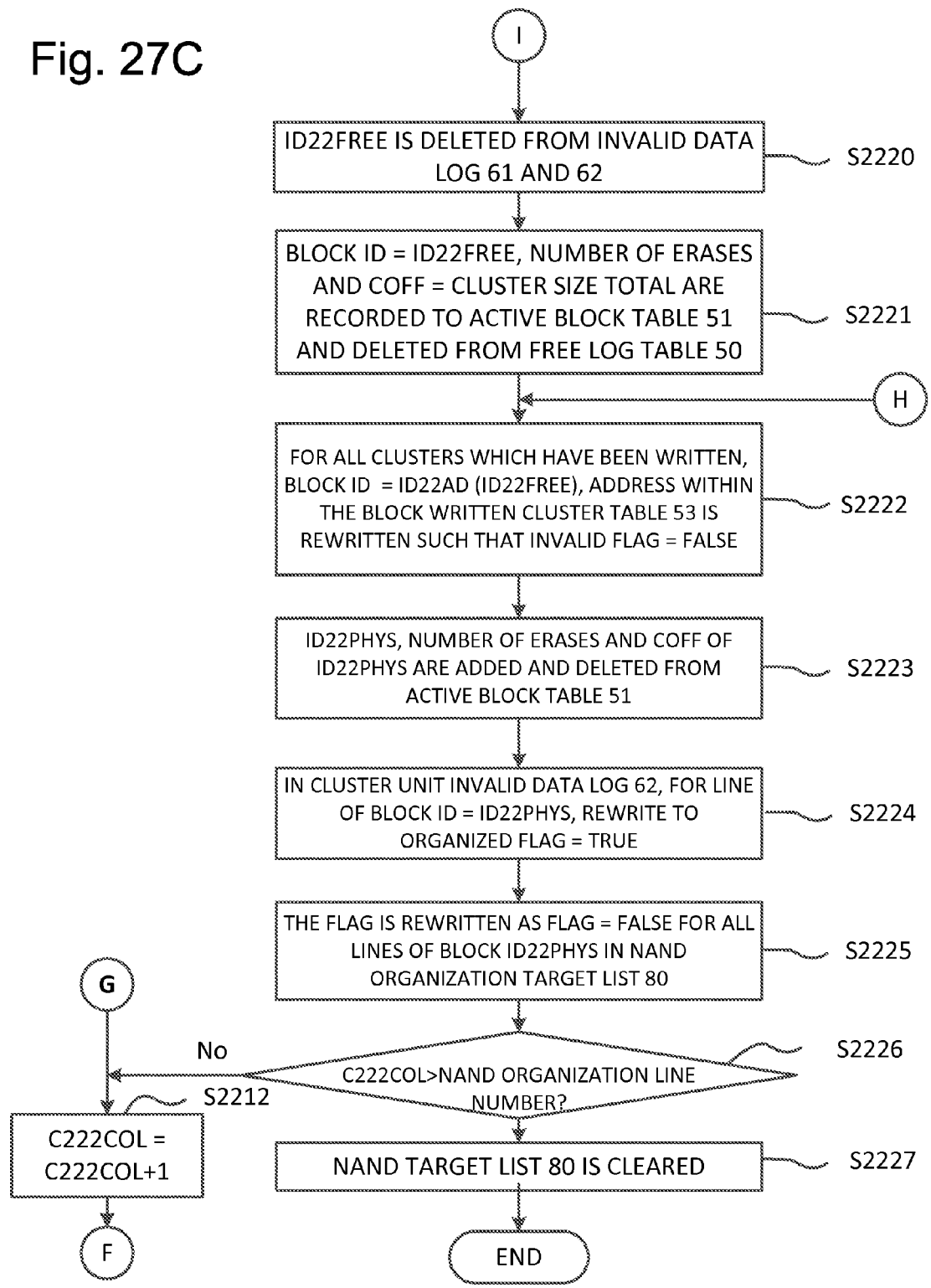

FIG. 27A, FIG. 27B and FIG. 27C indicate a flow chart for NAND GC. The SSDC 26 reads the cluster unit invalid data log 62 and collects the cluster unit invalid data in such a way that the total size of the collected cluster unit invalid data and the total size of current free block become more than the criteria NMF for collecting garbage data in the NAND memory (NAND GC, organizing NAND) (Steps S2201 to S2208). Note that, if the total size of the collected cluster unit invalid data+the current block size is greater than the criteria NMF, the sufficient amount of blocks can be stored by organizing the NAND but, it is preferable (total size+current block size>NMF+margin) to increase the speed by decreasing the frequency of occurrences of NAND GC.

Figure 28:
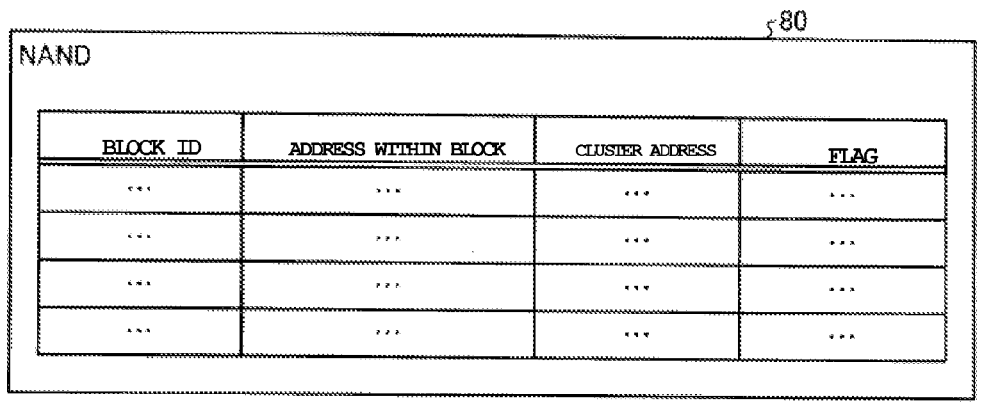
FIG. 28 shows a target list for NAND organization.

At the time of collecting invalid data, all valid/invalid clusters included in the block attributed to the collected invalid data are added to the NAND GC target list 80. The NAND GC target list 80 controls the blocks targeted for NAND GC as shown in FIG. 28 and registers the information (block ID, address in the block, invalid cluster address and uncollected flag) related to the invalid cluster collected from the cluster unit invalid data log 62.

Specifically, the SSDC 26 initiates the variable C22col used for updating the rows of the cluster unit. Invalid data log 62 and the variable S20 is used to calculate the total size of the collected cluster unit invalid data (Step S2201). The SSDC 26 then reads the C22col row of the cluster unit invalid data log 62, obtains the block ID (ID22phys) and the organized flag (Step S2202) and obtains (Step S2203) the block ID (ID22phys) and the organized flag of the next row by considering the variable C22col as +1 (Step S2204), when the organized flag is true. If the organized flag is true, the SSDC 26 determines whether the block ID (ID22phys) is registered in the NAND GC target list 80 (Step S2205) and if registered, considers the variable C22col as +1 (Step S2204) and obtains the block ID (ID22phys) and organized flag of the next row (Step S2202). If the block ID (ID22phys) has not been registered in the NAND GC target list 80. The SSDC 26 collects the information of all rows wherein the block ID=ID22phys from the cluster unit invalid data log 62 and registers the collected information i.e. the block ID (ID22phys), address A22int in the block, cluster address A22cl and uncollected flag (unorganized flag)=true into the NAND GC target list 80 (Step S2206). Next, the SSDC 26 calculates the size of all invalid clusters collected in the Step S2206 and adds to the total size S20 calculated earlier (Step S2207). Next, the SSDC 26 determines whether the total size S20 of the calculated invalid cluster+total of the current free block size is more than the criteria NMF for NAND GC (Step S2208) and if determined to be Yes, considers the variable C22col to be +1 (Step S2204) and repeats the process of collecting the invalid clusters.

If the result of determination of the process carried out in Step S2208 is Yes, the SSDC 26 initializes the variable C222col used to update the rows of the NAND GC target list 80 (Step S2209). Then reads the rows of the NAND GC target list 80 wherein the variable C222col has been initialized. Obtains the block ID (ID22phys) and uncollected flag (Step S2210) and obtains the information of next row (Step S2211) by considering the variable C222col as +1 (Step S2212) when the uncollected flag is not true (Step S2211). If the organized flag is true, the SSDC 26 retrieves the block ID (ID22phys) from the cluster table 53 and reads all valid clusters included in the block from NAND memory 24 to RAM 25 (Step S2213) and then adds the read data to the recordable block (Steps S2214 to S2217) or writes to the free block (Steps S2218 to S2221). The procedure for writing to the recordable block is similar to that of Steps S2002 to S2004 shown in FIG. 24A or the Steps S2102 to S2104 shown in FIG. 26A. In addition, the procedure for writing to the free block is similar to that of Steps S2008 to S2011 shown in FIG. 24A and FIG. 24B or the Steps S2108 to S2111 shown in FIG. 26A and FIG. 26B. The description related to the duplication is omitted.

The SSDC 26 rewrites the cluster table 53 in such a way so that, all written clusters correspond to the respective physical addresses for writing (Step S2222). In other words, the SSDC 26 rewrites the cluster table 53 in such a way so that the block ID=ID22ad or ID22free, address in the block=address actually written in the block and invalid flag=false for all written clusters. The SSDC 26 adds the block (ID22phys) targeted for NAND GC to the free block table 50 and further deletes the same from the active block table 51 (Step S2223). The SSDC 26 rewrites the cluster unit invalid data log 62 in such a way so that the organized flag for the clusters wherein NAND has been organized becomes true (Step S2224). The SSDC 26 rewrites uncollected flag=false for the block wherein NAND has been organized in the NAND GC target list 80 (Step S2225). When organization of the NAND is completed after finishing the process till the last row of the NAND GC target list 80 (Step S2226), the SSDC 26 clears (erases) the NAND GC target list (Step S2227).

[Deletion Notification]

Next, deletion notification is described. The deletion notification is a command sent by the host 3 to the non-volatile memory device 2 when the data used by OS 16 of the host 3 is deleted. As an example of the deletion notification, for example, the Data Set Management Command (common name (TRIM) command) described in the INCITS ATA/ATAPI Command Set-2 (ACS-2) is given (Refer to the document 1). It is a method wherein, LBA region which is specified in an LBA Range Entry is handled as a free region after notifying that the data in the area has been deleted. Due to the notification of deletion, the SSD 2 can get additional free blocks. Note that, the function of trim command may be executed not only by using the Data Set management Command but also by using other commands such as the vendor unique commands.

The process of notifying deletion with respect to the LBA region does not necessarily delete the data stored in the non-volatile memory. For example, the process of deletion notification is executed by updating the control information 31 to invalidate the user data without erasing the user data itself. Such a process of deletion notification is hereafter called as a deletion process A. Though the user deletes the data; it may be analyzed by analyzing the internal nonvolatile memory 24 after analyzing SSD 2 (Document 4). The present embodiment makes it difficult to analyze the corresponding data in the corresponding process of deletion notification. As a result, the present embodiment prevents the deleted user data in the SSD2 from being stolen by malicious users. Such a process of deletion notification is hereafter called as a deletion process B. The deletion process B requires more time than the deletion process A and causes reliability degradation of NAND memory 24 because it causes many operations of NAND memory 24. Due to this, it is preferable that SSD 2 enables not only the deletion process B but also the deletion process A.

Figure 29:
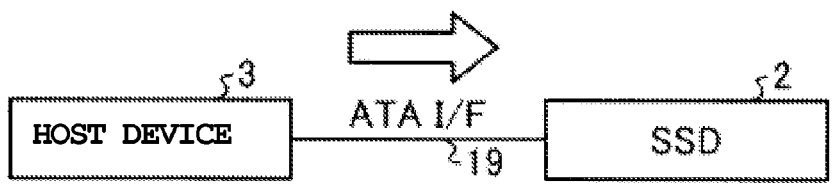
FIG. 29 shows an example of a command from a host for selecting a deletion process.

According to the present embodiment, it is considered that SSD 2 may be able to select the deletion process A or deletion process B according to the command from the host 3. In the present embodiment, the value of input Feature register value is used as a subcommand ID to distinguish the deletion process A and B. As shown in FIG. 29, when a bit 0 of input Feature register is 1 and a bit 1 of the same is 0 according to the Data Set Management Command of ACS-2 (bit 1: 0=1), the deletion process A is processed for the corresponding LBA Range Entry. When bit 0 is 1 and bit 1 is 1 (bit 1: 0=3), the deletion process B is processed for the corresponding LBA Range Entry. The register allocation of the deletion process A and B may be carried out by using other parameters. Different command may be used for each of the deletion process A and B.

Figure 30:
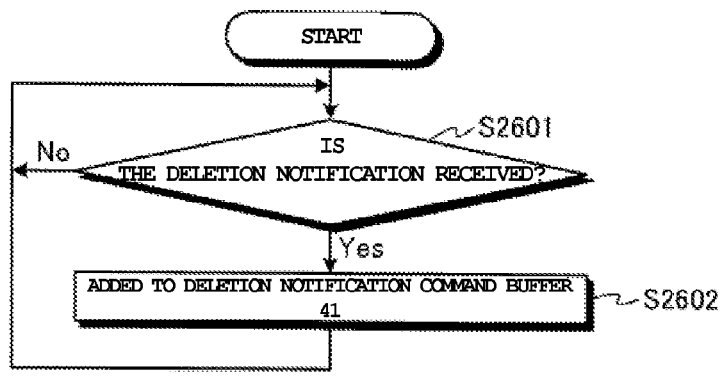
FIG. 30 is a flow chart that shows steps of the SSD carried out when a notice of deletion is received.
Figure 31:
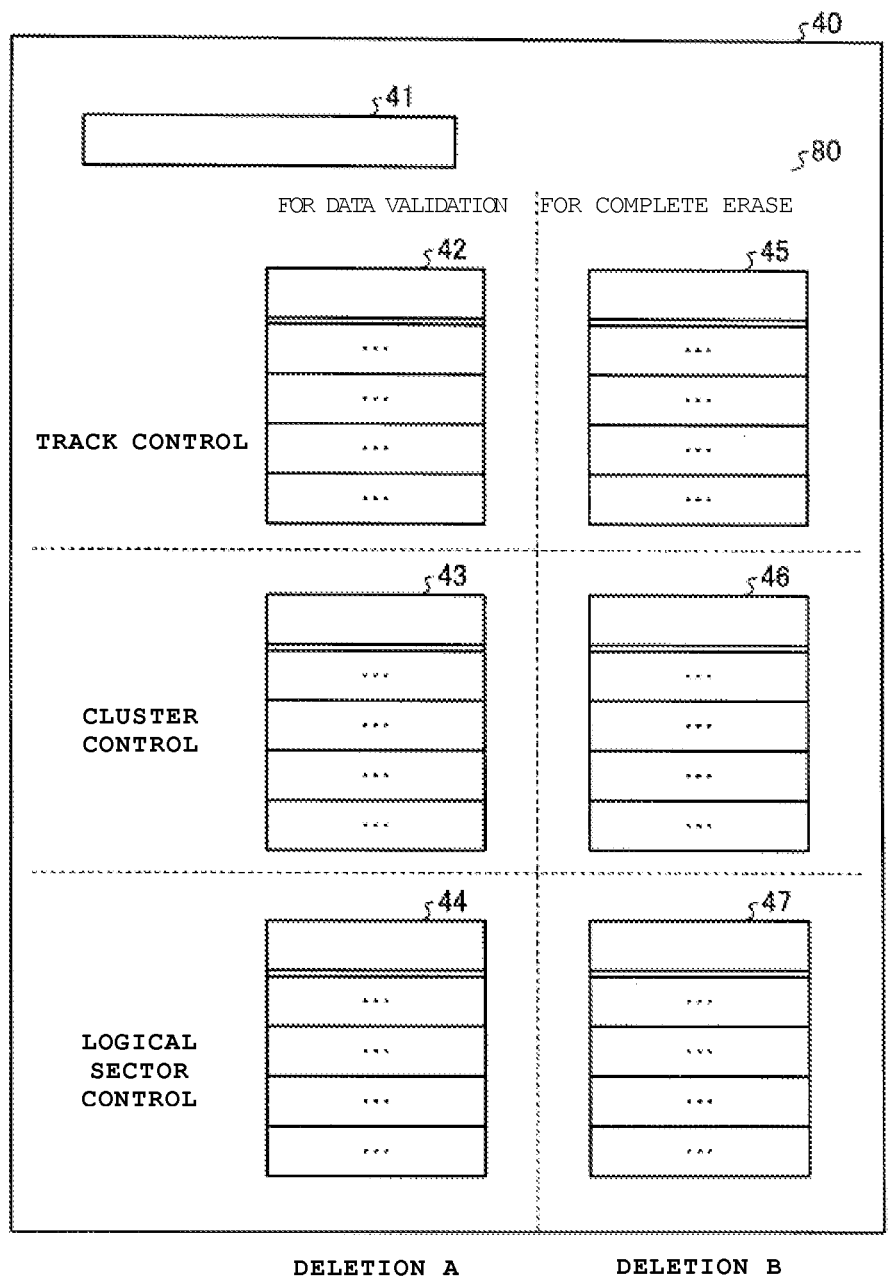
FIG. 31 shows a deletion notification buffer.

FIG. 30 indicates an operation procedure at the time of receiving the deletion notification command. When the SSD 2 receives the deletion notification from the host 3 (Step S2601), the SSDC 26 adds the command queue of deletion notification to the deletion notification command buffer 41 of the deletion notification buffer 40 indicated in FIG. 31. The SSDC 26 transmits a reception response notifying of reception of the deletion notification to the host 3.

On the other hand, the SSDC 26 monitors the deletion notification command buffer 41 and organizes it when certain conditions are fulfilled. The conditions are as follows.

Figure 32:
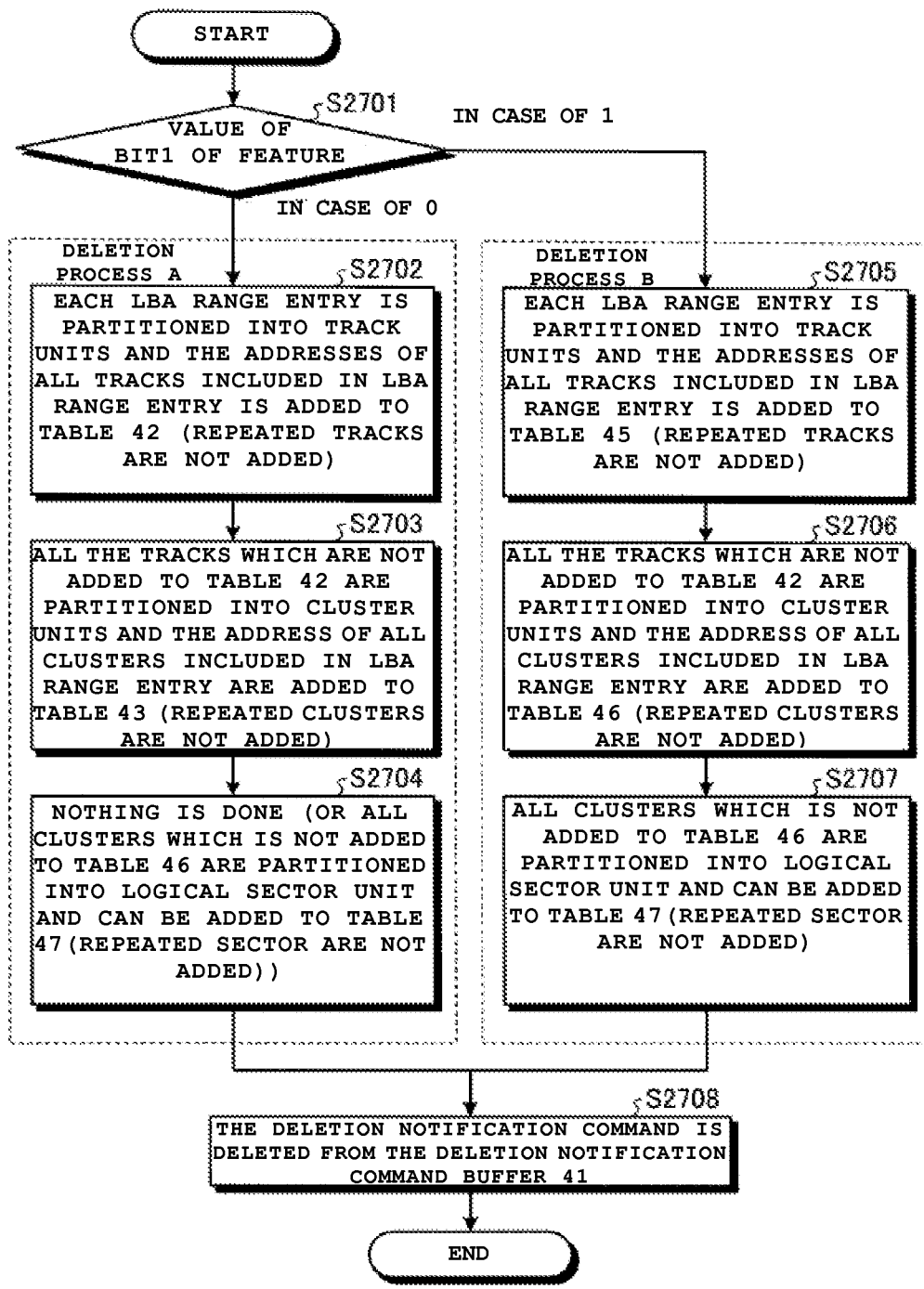
FIG. 32 is a flow chart that shows additional steps of the SSD carried out when a notice of deletion is received.

Just after receiving the deletion notification command,
When the deletion notification command buffer 41 is full or when the usage capacity of the deletion notification command buffer 41 is above a specified value,
When more than or equal to a certain period of time has passed since receiving the last command from the host 3,
When the command for shifting to a stand-by state or an idle state is received from the host 3
When the command for processing the deletion notification command buffer is received from the host 3, FIG. 32 indicates the procedure to process the command queue stored in the deletion notification command buffer 41. SSDC 26 determines bit 1 of the deletion notification command buffered in the deletion notification command buffer 41; when the bit 1 is 0, it shifts to the deletion process A, while when the bit 1 is 1; it shifts to the deletion process B (Step S2701).

In case of the deletion process A, the SSDC 26 divides all LBA Range Entries of the queue into the track unit and adds the track address of the track units (not a fraction of track unit) which includes full track sizes present in LBA Range Entry to the track control table 42 for data invalidation. Note that, the duplicate tracks are not added to the table 42 (Step S2702). Then, the SSDC 26 divides all the track fractions (fraction indicated in FIG. 18) which are not added to the table 42 into the cluster unit and adds the cluster address of the cluster units which includes all cluster sizes present in the LBA Range Entry to the cluster control table 43 for data invalidation. Note that, the duplicate clusters are not added to the table 43 (Step S2703). All the cluster fractions which are not added to the table 43 is preferably ignored in deletion process A wherein the processing speed is more important than secure data deletion. On the other hand, the cluster fractions may also be divided into the logical sector unit and may be added to the sector control table 44 for data invalidation. Note that, the duplicate sectors are not added to the table 44 (Step S2704). In the present embodiment, the sector control table 44 for data invalidation is not included in the deletion notification buffer 41 and the Step S2704 is not executed.

In case of the deletion process B, the SSDC 26 divides all LBA Range Entries of the queue into the track unit and adds the track address of the track units which includes full track sizes present in LBA Range Entry to the track control table 45 for secure data deletion. Note that, the duplicate tracks are not added to the table 45 (Step S2705). Then, the SSDC 26 divides all the track fractions (fraction indicated in FIG. 18)

which are not added to the table 45 into the cluster unit and adds the cluster address of the cluster units which includes all cluster sizes present in the LBA Range Entry are added to the cluster control table 46 for erasing. Note that, the duplicate clusters are not added to the table 46 (Step S2706). Note that, all the cluster fractions which are not added to the table 46 are divided into the logical sector unit and added to the sector control table 47 for secure deletion. Note that, the duplicate sectors are not added to the table 47 (Step S2707). The relationship between the security of the deletion process and the processing speed is a tradeoff. If the processing speed of the deletion process B is prioritized, the deletion process B may not be executed for the sector unit less than the cluster unit to suppress the additional erase processing of NAND memory 24. In that case, the security of the deletion process is deteriorated and it is preferable to notify the weakness of the security of the deletion process B for the data deletion of unit less than the cluster via command protocols such as ECh IDENTIFY DEVICE COMMAND of ATA command set.

Finally, the SSDC 26 deletes the command queue of deletion notification which has been processed from the deletion notification command buffer 41 (Step S2708).

Figure 33:
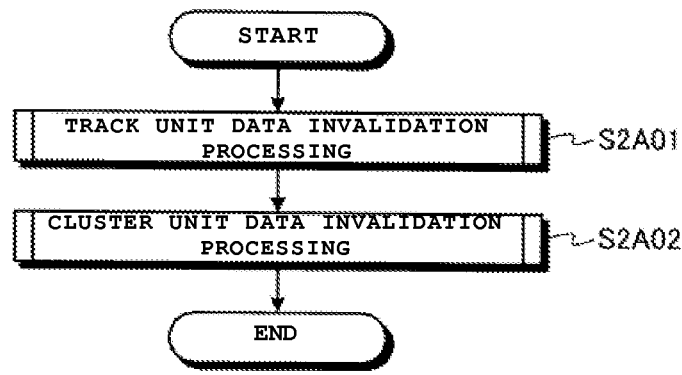
FIG. 33 is a flow chart that shows the operation of the SSD when carrying out a first deletion process.

The SSDC 26 monitors the track control table 42 for data invalidation and the cluster control table 43 for data invalidation (and the sector control table 44 for data invalidation) and when certain conditions are fulfilled, processes the track control table 42 for data invalidation and the cluster control table 43 for data invalidation (and the sector control table 44 for data invalidation) shown in FIG. 33. In other words, it executes the process of the deletion process A including the track unit data, invalidation process (Step S2A01) and the cluster unit data invalidation process (Step S2A02).

Figure 34:
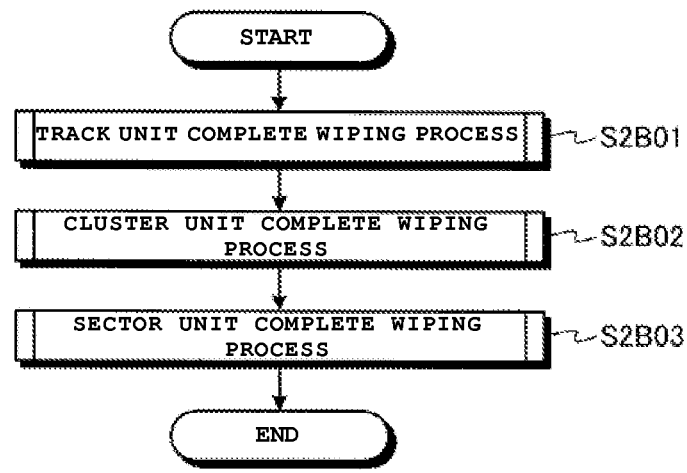
FIG. 34 is a flow chart that shows the operation of the SSD when carrying out a second deletion process.

The SSDC 26 monitors the track control table 45, the cluster control table 46, and the sector control table 47 for secure data deletion. When certain conditions are fulfilled, SSDC 26 processes the track control table 45, the cluster control table 46 and the sector control table 47 for erasing as shown in FIG. 34. In other words, it executes a substantial portion of the process of the deletion process B including the track unit erase process (Step S2B01) and the cluster unit erase process (Step S2B02) and the sector unit erase process (Step S2B03).

The conditions are as follows.

When tables 42 to 47 are full or their usage capacity is above the specified value, When more than or equal to a certain period of time has passed since accepting the last command from the host 3, When the command for shifting to the stand-by state or ideal state is received from the host 3, When the command for organizing the Tables 42 to 44 is received from the host 3, When the command for organizing the Tables 45 to 47 is received from the host 3 (this case will be described later).

[Trunk Unit Data Invalidation Process (Deletion Process A)]

Figure 35:
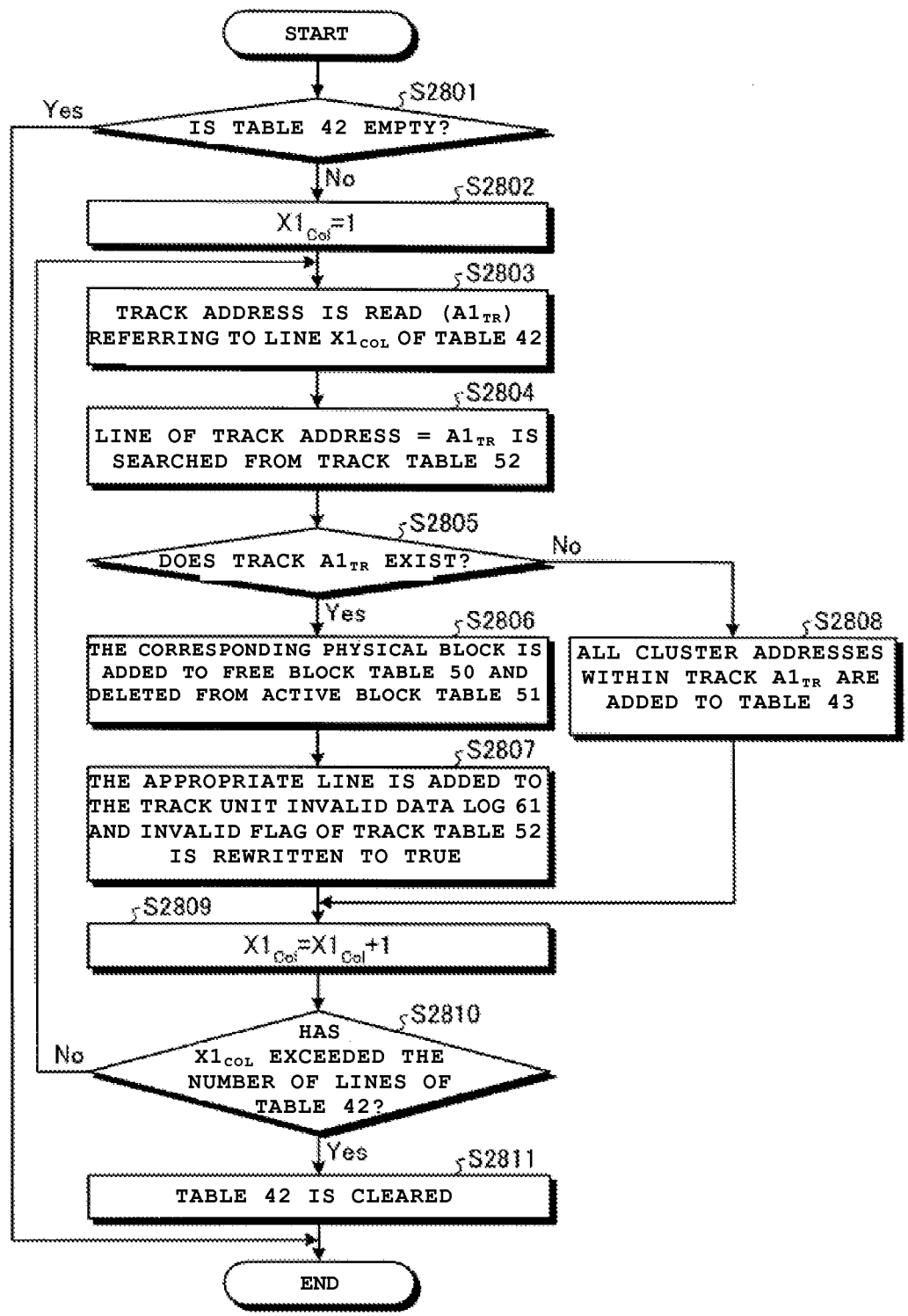
FIG. 35 is a flow chart that shows an invalidation process for track unit data.

FIG. 35 indicates the procedure of the track control table 42 for data invalidation (procedure for the track unit data invalidation process) in the deletion process A. The SSDC 26 finishes the process when the table 42 is empty. The SSDC 26 sets 1 to X1Col which is the variable to control the current row (entry) of the table 42 (Step S2802). The SSDC 26 invalidates the tracks corresponding to all rows in the table 42 as shown below while incrementing (Step S2809) the variable X1Col till it crosses the number of rows of the table 42 (Step S2810).

The SSDC 26 reads the track address from the current row of the table 42 and substitutes the track address for the variable $A1_{TR}$ (Step S2803). The SSDC 26 searches the track address $A1_{TR}$ in the track table 52 (Step S2804). If $A1_{TR}$ exists in the track table 52, the SSDC 26 adds the physical block ID corresponding to the track $A1_{TR}$ to the free block table 50, deletes the same from the active table 51 (Step S2806), adds the block ID and the track address to the track unit invalid data log 61 and rewrites the invalid flag of the corresponding row to the track address in the track table 52 to true (Step S2807). If the track address $A1_{TR}$ does not exist in the track table 52, the SSDC 26 adds all clusters in the corresponding track $A1_{TR}$ to the cluster control table 43 for data invalidation (Step S2808). After processing all rows (Step S2810), the process is terminated after emptying the table 42 (Step S2811). The SSDC 26 can get new free blocks also by using the data invalidation process as well as NAND GC.

[Cluster Unit Data Invalidation Process (Deletion Process A)]

Figure 36:
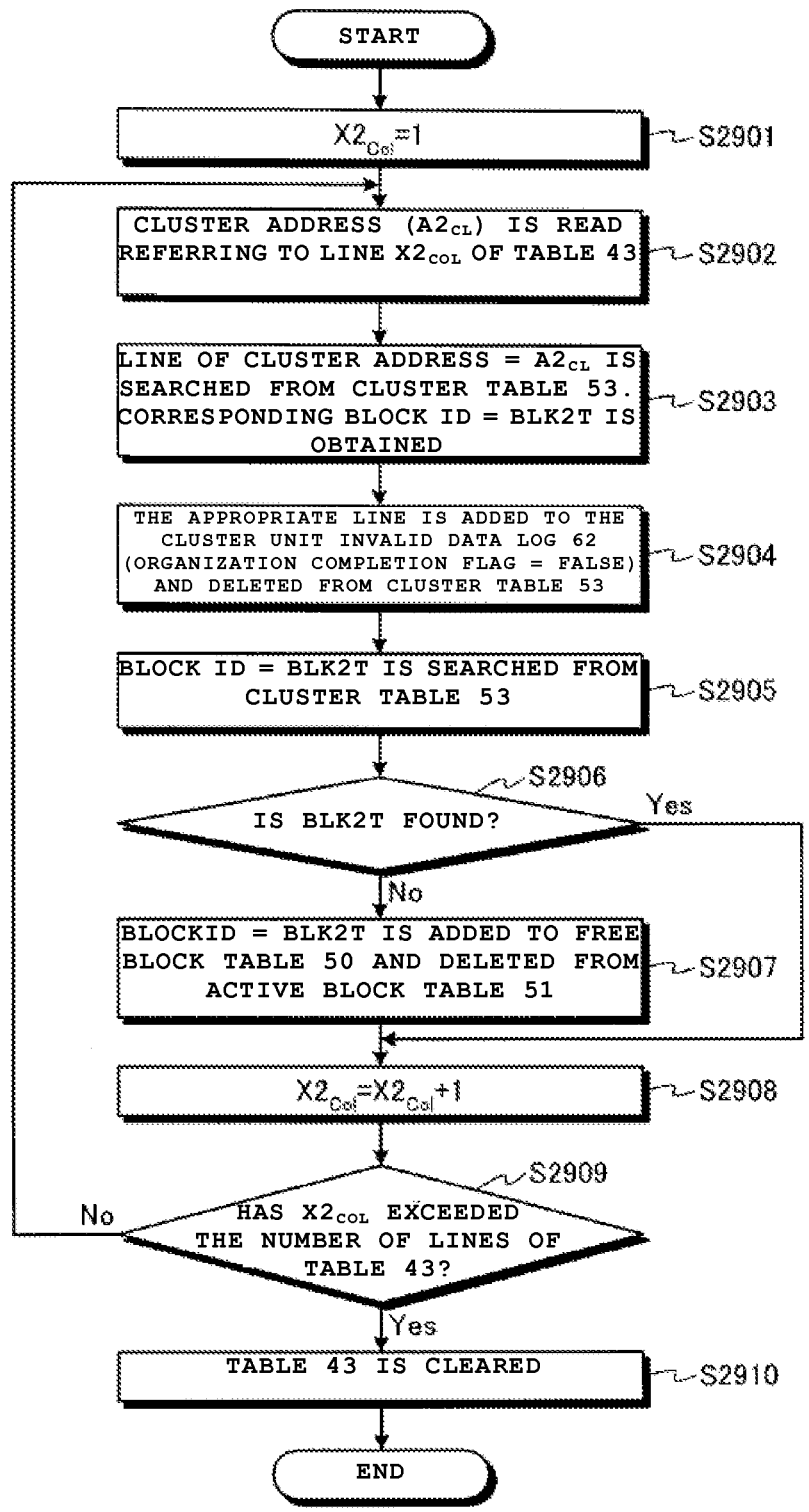
FIG. 36 is a flow chart that shows an invalidation process for cluster unit data.

FIG. 36 indicates the procedure of the cluster control table 43 for data invalidation (procedure for the cluster unit data invalidation process). The SSDC 26 finishes the process when the table 43 is empty. The SSDC 26 sets 1 to the variable X2Col which is the current row (entry) of the table 43 (Step S2901). The SSDC 26 invalidates the cluster corresponding to all rows in the table 43 as shown below while incrementing (Step S2908) the variable X2Col until it exceeds the number of rows of the table 43 (Step S2909).

The SSDC 26 reads the cluster address by referring to the current row of the table 43 and substitutes it to the variable A2CL (Step S2902). The SSDC 26 obtains the block ID of corresponding row by retrieving the cluster address=A2CL from the cluster table 53 and substitutes the obtained block ID to the variable BLK2T (Step S2903). The SSDC 26 adds the block ID, address offset in the block, the cluster address and invalidation flag=false) to the cluster unit invalid data log 62 and deletes the corresponding rows from the cluster table 53 (Step S2904).

The SSDC 26 searches the block ID (BLK2T) in the cluster table 53 (Step S2905) and determines that the blocks which are not found do not have the valid data at all (Step S2906) and therefore adds the block ID=BLK2T to the free block table 50 and deletes the same from the active block table 51 (Step S2907). After processing all rows (Step S2909), the SSDC 26 clears the table 43 and finishes the process (Step S2910). The SSDC 26 can get new free blocks by using the data invalidation process as well as NAND GC.

[Track Unit Secure Deletion Process (Deletion Process B)]

Figure 37:
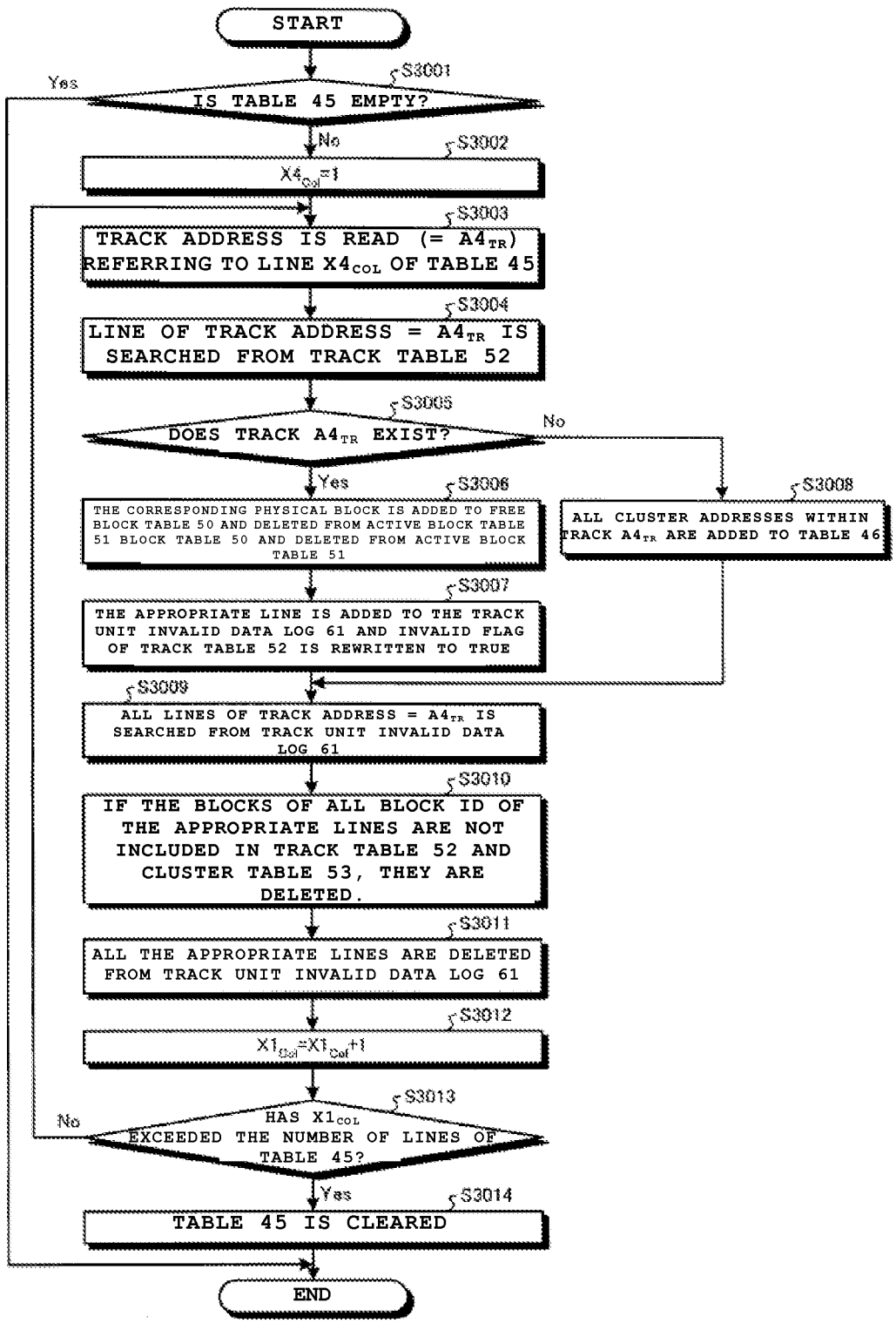
FIG. 37 is a flow chart that shows a complete erase process for a track unit data.

FIG. 37 indicates the procedure related to the track control table 45 for secure deletion (procedure for the trunk unit deletion process B). The SSDC 26 finishes the process when the table 45 is empty. The SSDC 26 sets 1 to X4Col which is the variable to control the current row (entry) of the table (Step S3002). The SSDC 26 invalidates the tracks corresponding to all rows in the table 45 as shown below while incrementing (Step S3012) the variable X4Col until it exceeds the number of rows of the table 45 (Step S3013).

The SSDC 26 reads the track address from the current row of the table 45 and substitutes it to the variable $A4_{TR}$ (Step S3003). The SSDC 26 searches the track address $A4_{TR}$ in the track table 52 (Step S3004). If $A4_{TR}$ exists in the track table 52 (Step S3005: Yes), the SSDC 26 adds the physical block ID corresponding to the track $A4_{TR}$ to the free block table 50 and deletes the same from the active table 51 (Step S3006). In addition, SSDC 26, adds the track address and the block ID to the track table 52 to the track unit invalid data log 61 and rewrites the invalidation flag of the corresponding row of the track table 52 to true (Step S3007). If the track address $A4_{TR}$ does not exist in the track table 52 (Step S3005: No), the SSDC 26 adds all cluster addresses in the corresponding track to the cluster control table 46 for secure deletion (Step S3008).

At the present stage, since the data targeted for secure deletion is not erased, the erase operation is carried out as follows. The SSDC 26 extracts all rows wherein track address=$A4_{TR}$ from the track unit invalid data log 61 (Step S3009). The SSDC 26 determines whether all block IDs registered in extracted rows are registered in the track table 52. If a block is registered in the track table 52, the SSDC 26 do not erase the block because all areas of the block has valid data after invalidated data is securely erased. If a block is not registered in the track table 52, the SSDC 26 searches all corresponding block IDs from the cluster table 53. When a block is not found in the track table 52 and if found in the cluster table 53, the SSDC 26 then copies the data of all the corresponding clusters to the RAM 25, allocates a free block, and erases the corresponding block after writing the data in the RAM 25 into the free block. The process then updates the control tables such as the free block table 50 and the active block table 51 (Step S3010).

On the other hand, when the SSDC 26 could not find the block ID associated with the track address=$A4_{TR}$ in the track table 52 as well as the cluster table 53, it erases the corresponding block with the block ID (Step S3010). The procedure similar to the procedure of the Step S3010 of erasing the corresponding block after taking backup of the valid data is indicated in details in Steps S3111-1, S3111-2, S3113 and S3118 to S3123 shown in FIG. 38B and FIG. 38C.

By performing the process of Step S3010, it is possible to delete not only the latest invalid data but also the prior invalid data written earlier corresponding to the logical address targeted for secure deletion while preserving the current valid data. The method described above for deleting invalid data securely and preserving valid data is one of the embodiments and there are various other methods for the secure deletion process. The present disclosure is not limited to the present embodiment.

The SSDC 26 deletes the processed rows from the track unit invalid data log 61 (Step S3011). After processing all rows (Step S3013), the SSDC 26 finishes the process by emptying the table 42 (Step S3014). The SSDC 26 can get free blocks also by using the secure deletion process as well as the data invalidation process and NAND GC.

Note that, when the block is erased in the track unit deletion process, the item 'erased flag' is set in the free block table 50 to avoid erasing of block again in the writing process (FIG. 17, FIG. 20, FIG. 22A, FIG. 22B, FIG. 24A, FIG. 24B, FIG. 26A, and FIG. 26B) and NAND GC process (FIG. 27A, FIG. 27B and FIG. 27C) and true is rewritten to the 'erased flag' after erasing the block and then the free blocks with 'erased flag' set to true are not erased. When the free block becomes an active block, the 'erased flag' is reset to False. This is also same for the further processes of cluster unit deletion process and sector unit deletion process.

[Cluster Unit Secure Deletion Process (Deletion Process B)]

Figure 38A:
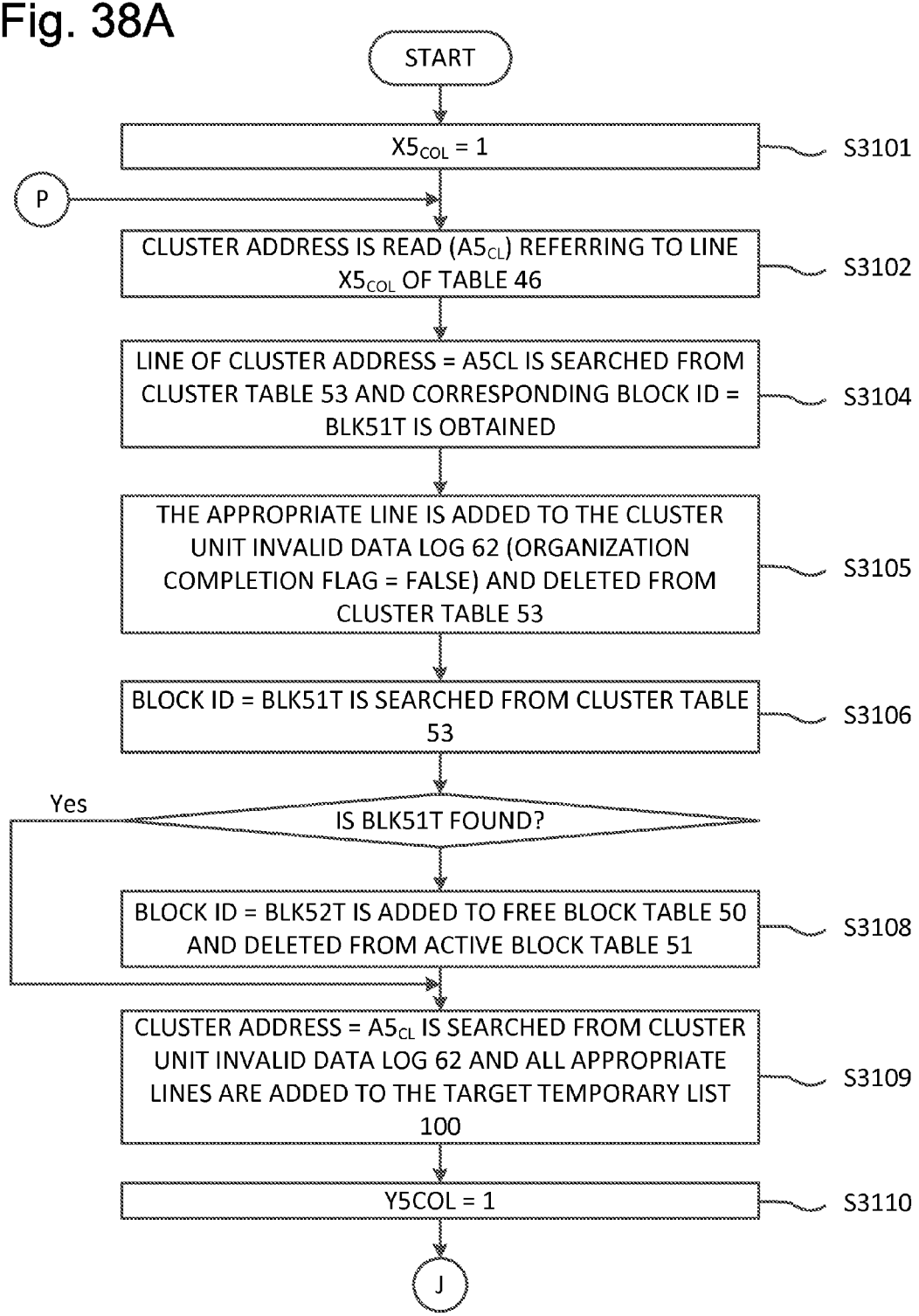
FIG. 38A, FIG. 38B and FIG. 38C are flow charts that show a complete erase process for a cluster unit data.
Figure 38B:
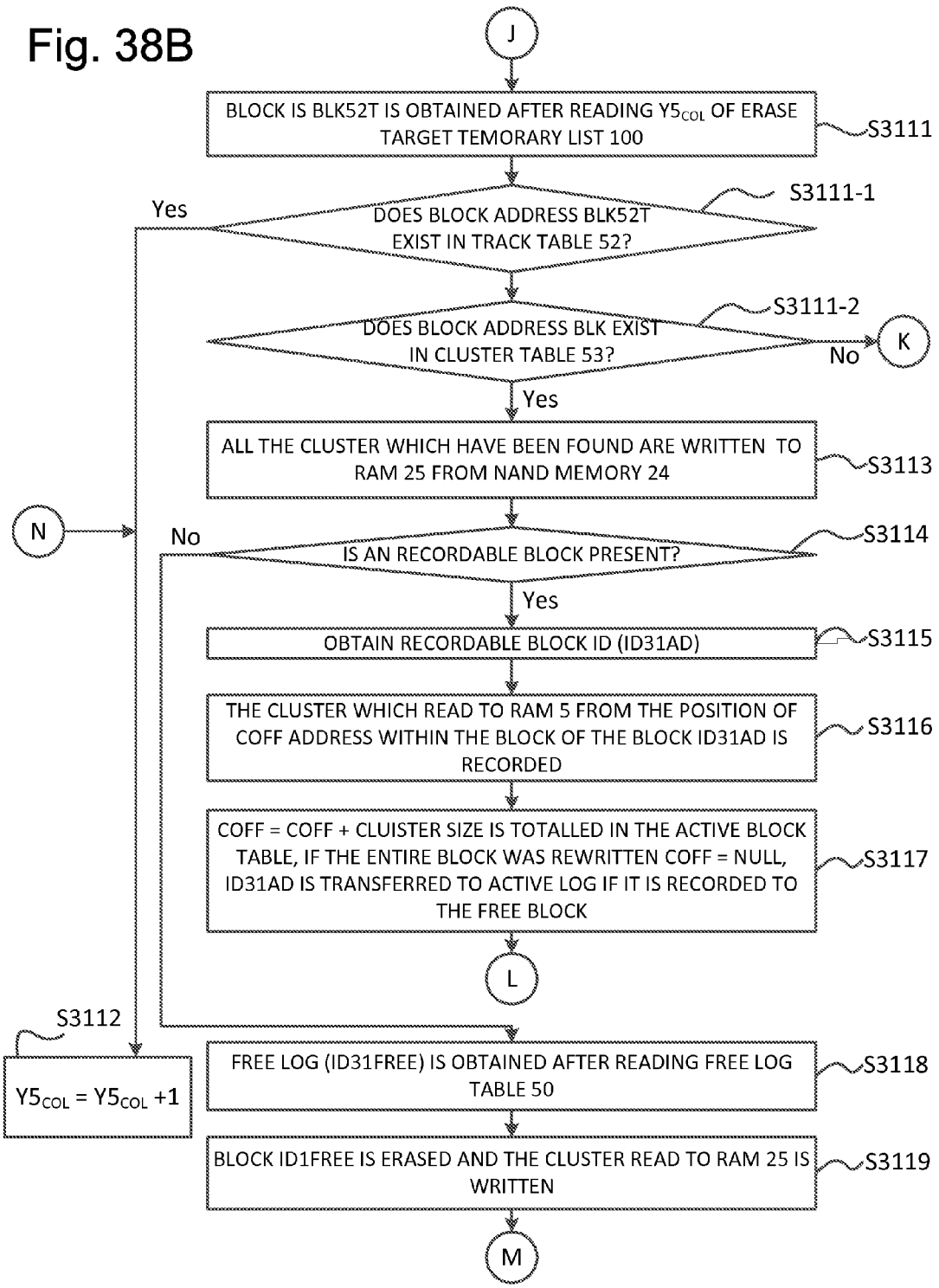
Figure 38C:
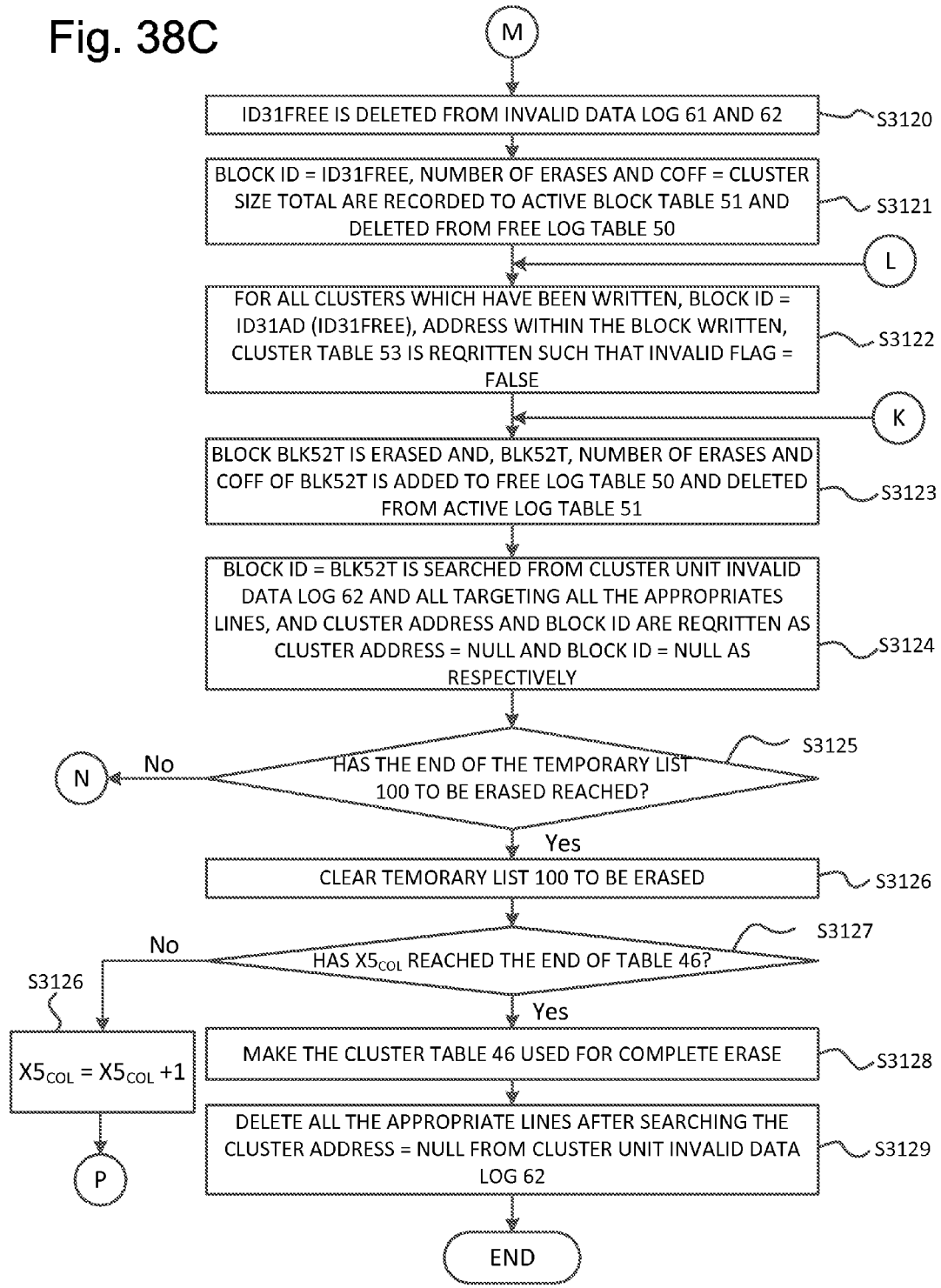

FIG. 38A, FIG. 38B and FIG. 38C indicate the procedure related to the cluster control table 46 for deletion (procedure of cluster unit delete process). The SSDC 26 sets 1 to $X5_{Col}$ which is the variable to control the current row (entry) of the table 46 (Step S3101). The SSDC 26 invalidates the clusters corresponding to all rows in the table 46 as shown below while incrementing (Step S3103) the variable $X5_{col}$ until it reaches up to the end (Step S3127).

The SSDC 26 reads the cluster address by referring to the current row of the table 46 and substitutes it to the variable $A5_{CL}$ (Step S3102). The SSDC 26 obtains the block ID of corresponding row by retrieving the cluster address=$A5_{CL}$ from the cluster table 53 and substitutes the obtained block ID to the variable BLK51T (Step S3104). The SSDC 26 adds the block ID, the block ID, the cluster address, and the organized flag=false of the cluster table 53 to the cluster unit invalid data log 62 and deletes the corresponding rows from the cluster table 53 (Step S3105).

The SSDC 26 retrieves the block ID=BLK51T from the cluster table 53 (Step S3106) and determines that the blocks with block ID=BLK51T which are not found in the cluster table 53 do not have the valid data at all and therefore adds the block with block ID=BLK51T to the free block table 50 and deletes the same from the active block table 51 (Step S3108). Then, the SSDC 26 searches the cluster address=A5CL in the cluster unit invalid data log 62 and add all information of corresponding rows to the temporary list 100 targeted for secure deletion shown in FIG. 39 (Step S3109). In addition, when the block ID=BLK51T is found from the cluster table 53 (Step S3107: Yes), it executes the process of Step S3109. The temporary list 100 is the list temporarily used to manage the cluster addresses targeted for secure deletion. The block ID, address in the block and cluster address $A5_{CL}$ are stored in it.

The SSDC 26 sets 1 to $Y5_{Col}$ which is the variable to control the current row (entry) of the temporary list 100 (Step S3110). The SSDC 26 invalidates the corresponding cluster of all rows in the temporary list 100 as shown below while incrementing (Step S3112) the variable $Y5_{Col}$ till it reaches up to the end of the temporary list 100 (Step S3125).

The SSDC 26 reads $Y5_{Col}$ of the temporary list 100 and obtains the block ID=BLK52T attributed to the corresponding cluster (Step S3111) and erases the invalid data (Step S3123) included in the block BLK52T by erasing the block with block ID=BLK52T after taking a backup (Steps S3111-1 to 3122) of the valid data other than the invalid data included in the block BLK52T as follows.

In other words, the SSDC 26 searches the block ID=BLK52T in the track table and if finds the entries with valid value of the track address wherein, the block is with block ID=BLK52T and invalid flag=false, the block BLK52T is considered to be having the valid data and therefore, skips the following step and preserves the track data as it is (Step S3111-1: Yes). Note that, the track may be read from the RAM 25 and written to the different block of NAND memory 24. However, it is not preferable due to the additional writing to NAND memory 24.

If the block with block ID=BLK52T is not found in the track table 52 (Step S3111-1: No), the SSDC 26 searches the block with block ID=BLK52T from the cluster table 53 (Step S3111-2). In other words, it searches the entries with valid value of cluster address in the cluster table wherein, the block is with block ID=BLK52T and invalid flag=false. If the block with block ID=BLK52T is not found in the cluster table 53 (Step S3111-2: No), as it is not necessary to preserve the data of the block with block ID=BLK52T, it moves to the Step S3123 and erases the block BLK52T.

If the block with block ID=BLK52T is found in the cluster table 53 (Step S3111-2: Yes), the SSDC 26 reads the data of all valid clusters included in the block with block ID=BLK52T from NAND memory 24 to RAM 25 (Step S3113) and writes the read cluster data to the partially written block of NAND memory 24 (Steps S3114 to S3117) or writes the read cluster data to the erased block of NAND memory 24 (Steps S3118 to S3121).

Specifically, the SSDC 26 determines whether the recordable block exists by referring to the address COFF recorded in the block of the free block table 50 and the active block table 51 (Step S3114) and if does not exist, moves to the procedure S3118. If recordable block exist (if partially written block exists), the SSDC 26 obtains the block ID (ID31ad) of the recordable block (Step S3115) and writes the read cluster data in RAM 25 to the address COFF of the block (Step S3116). The SSDC 26 updates the row of block ID (=ID31ad) in the active block table 51 so that the address COFF in the block=COFF+total cluster size. In addition, when the free block is used as the recordable block, it deletes the entry (row) of the block ID (ID31ad) from the free block table 50 and the row of the block ID (ID31ad) from the active block table 51 (Step S3117). Then, the procedure moves to the Step S3122.

According to the Step S3118, the SSDC 26 obtains the block ID (ID31free) of the free block from the free block table 50 and after erasing the acquired free block, writes the cluster data in the free block read from the RAM 25 (Step S3119). The SSDC 26 retrieves the block ID (ID31free) from the track unit invalid data log 61 and the cluster unit invalid data log 62 and deletes all entries of block ID (ID31free) (Step S3120). The SSDC 26 registers the block ID=ID31free, an erase count and address COFF recorded in the block=information containing the total cluster size to the active block table 51 and deletes the entry of block ID (ID31free) from the free block table 50 (Step S3121). Then, the procedure moves to the Step S3122.

According to the Step S3122, the SSDC 22 updates the control information 31 for all clusters written in the recordable block or new free block. Specifically, the SSDC 26 updates the cluster table 53 in such a way that the block ID (ID31free or ID31ad) and address in the block and invalid flag=false.

According to the Step S3123, the SSDC 26 erases the block with block ID=BLK52T. In addition, it adds the block ID=BLK52T, an erase count, address COFF recorded in the block=initial value (no write state) to the free block table 50 and deletes the entry of the block ID (=BLK52T) from the active block table 51. In this way, the block is erased by moving the currently valid data to the different block. Due to this, it is possible to erase the invalid data while preserving the currently valid data. According to the present embodiment, the method for moving the valid data is one of the embodiments and there are various other methods for moving the valid data. The present disclosure is not limited to the present embodiment.

Next, the SSDC 26 retrieves the block ID=BLK52T from the cluster unit invalid data log 62 and rewrites the cluster address=NULL and block ID=NULL for all corresponding rows and thereby prevents an erased block from being erased redundantly (Step S3124). The SSDC 26 process all rows of the temporary list 100 (Step S3125) and then clears the same (Step S3126). The SSDC 26 processes all rows of the cluster control table 46 for deletion (Step S3127) and then clears the same (Step S3128). The SSDC 26 retrieves cluster addresses=NULL from the cluster unit invalid data log 62 and deletes all corresponding rows (Step S3128). The SSDC 26 can get new free blocks by using the secure deletion process as well as the data invalidation process and NAND GC.

[Sector Unit Secure Deletion Process (Deletion Process B)]

Figure 40:
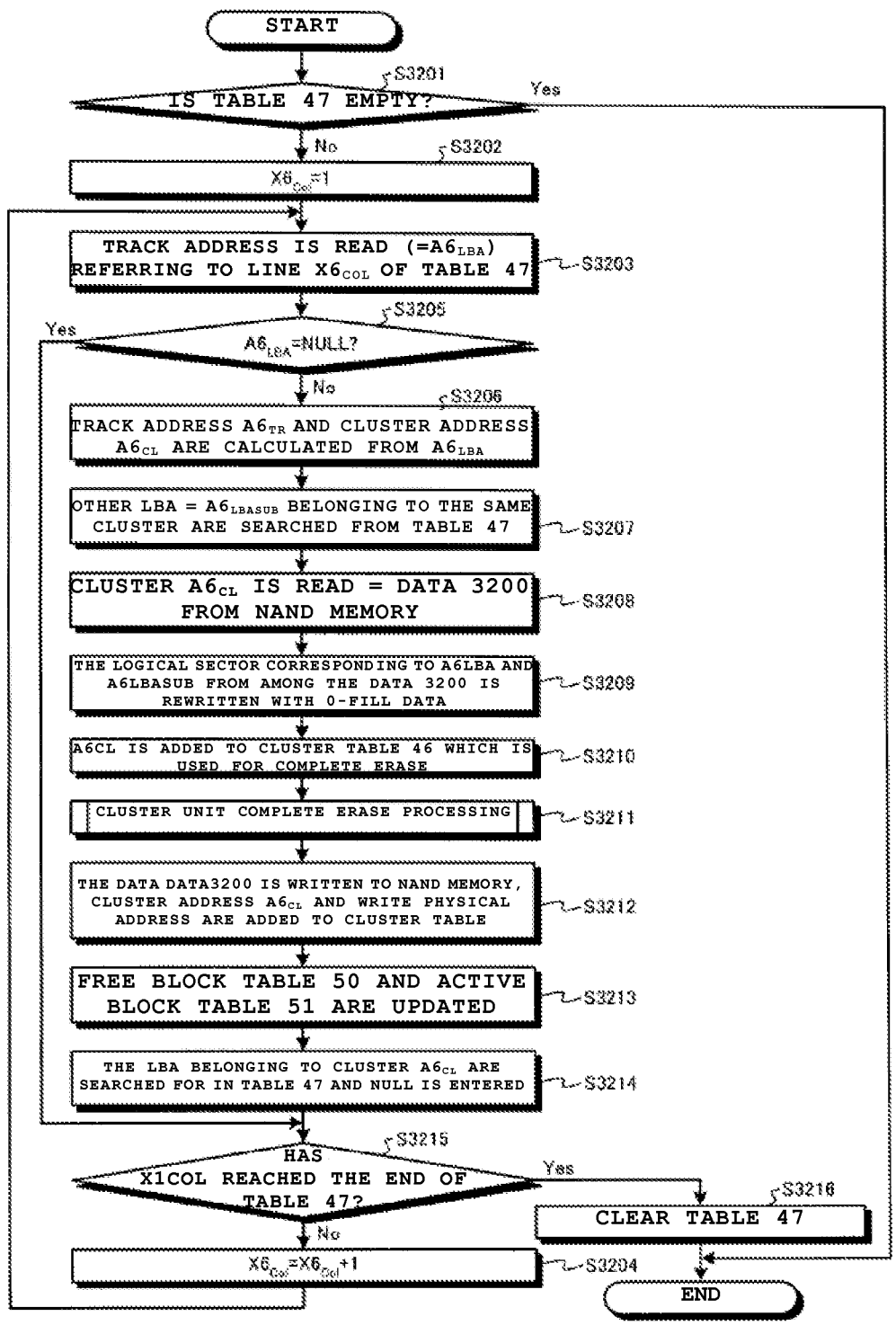
FIG. 40 is a flow chart that shows a complete erase process for a sector unit data.

FIG. 40 indicates the procedure related to the sector control table 47 for secure deletion (procedure for the sector unit deletion process B). The SSDC 26 finishes the process when the table 47 is empty (Step S3201: Yes). The SSDC 26 sets 1 to $X6_{Col}$ which is the variable to control the current row of the table 47 (Step S3202). The SSDC 26 securely deletes the data of the corresponding sector of all rows in the table 47 as shown below while incrementing (Step S3204) the variable $X6_{Col}$ until it reaches the end (Step S3215).

The SSDC 26 gets an LBA from the current row of the table 47 and substitutes it to the variable $A6_{LAB}$ (Step S3203). When the value of $A6_{LBA}$ is valid (Step S3205: No), the SSDC 26 calculates the cluster address $A6_{CL}$ from $A6_{LBA}$ to $A6_{LBA}$ (Step S3206) and further retrieves other sectors (LBA=$A6_{LBAsub}$) attributed to the same cluster $A6_{CL}$ from the table 47 (Step S3207). Next, the SSDC 26 reads the data of cluster $A6_{CL}$ to which $A6_{LBA}$ is attributed to, from NAND memory 24 to RAM 25 (this data is called as $DATA_{3200}$; Step S3208) and fills only the sector ($A6_{LBA}$ and $A6_{LBAsub}$) attributed to the sector control table 47 for secure deletion in $DATA_{3200}$ with 0's-fill data (Step S3209). Due to this, only invalid sector data is replaced from the $DATA_{3200}$. Note that, the sector ($A6_{LBA}$ and $A6_{LBAsub}$) attributed to the sector control table 47 for deletion can be filled with any data other than the 0-fill data.

The SSDC 26 adds the cluster address $A6_{cl}$ to the cluster control table 46 for secure deletion (Step S3210) and securely erases the data of cluster $A6_{CL}$ including deleted sector $A6_{LBA}$ and $A6_{LBAsub}$ by performing the cluster unit deletion process (Step S3211). The SSDC 26 writes the $DATA_{3200}$ recorded in RAM 25 to NAND memory 24 and updates the control table (Steps S3211 to S3213). Due to this, the valid data in the cluster $A6_{CL}$ is preserved. Specifically, it adds the physical address of the cluster address $A6_{cl}$ and $DATA_{3200}$ to be written to the cluster table 53 (Step S3212) and after registering the block including the physical address to be written in the active block table 51, deletes the same from the free block table 50 (Step S3213).

The SSDC 26 searches LBA attributed to the cluster $A6_{CL}$ from the table 47, and substitutes NULL to all corresponding rows (Step S3214). This prevents redundant erase operations of the same cluster. The SSDC 26 processes all rows of the cluster control table 47 for secure deletion (Step S3215) and then clears the same (Step S3216). The SSDC 26 can preserve the free blocks by using the deletion process as well as the data invalidation process and NAND GC.

Figure 41:
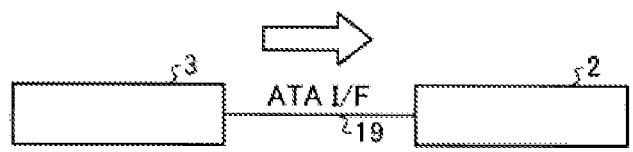
FIG. 41 shows other examples of a command from a host to select a deletion process.

As described earlier, the process of deletion process A (FIG. 33) and process of deletion process B (FIG. 34) are executed according to the various conditions. The process of deletion process B can be executed in the background. However, from the point of view of security of deleted user data, it is preferable to force the deletion process B immediately when the deletion process B is requested by the host 3. For example, as shown in FIG. 41, when SSD 2 receives the command (deletion process B execution command) wherein, bit 0 of input Feature register is 0 and bit 1 of the same is 1 (bit 1: 0=2) from the host 3 in the Data Set Management Command of ACS-2, the SSDC 26 may start the process of deletion process B immediately and may transmit a reception response notifying of reception of the command to the host 3 after completing the deletion process B.

Or it may start the background process of the deletion process B when it receives the deletion process B execution command and may transmit a reception response notifying of reception of the command to the host 3 before the background process ends (off line process). In that case, it is preferable that the host 3 can monitor the progress status of the process of the deletion process B. For example, the host 3 may receives the data containing the progress status (completion level (%)) of the process of deletion process B from SSDC 26 by sending the commands of ACS-2 such as 25h READ LOG DMA EXT, B0h/D0h SMART READ DATA, B0h/D5h SMART READ LOG to SSD 2. The start command of process B may be also allocated by other parameters and other commands such as vendor unique commands may also be allocated.

Figure 42:
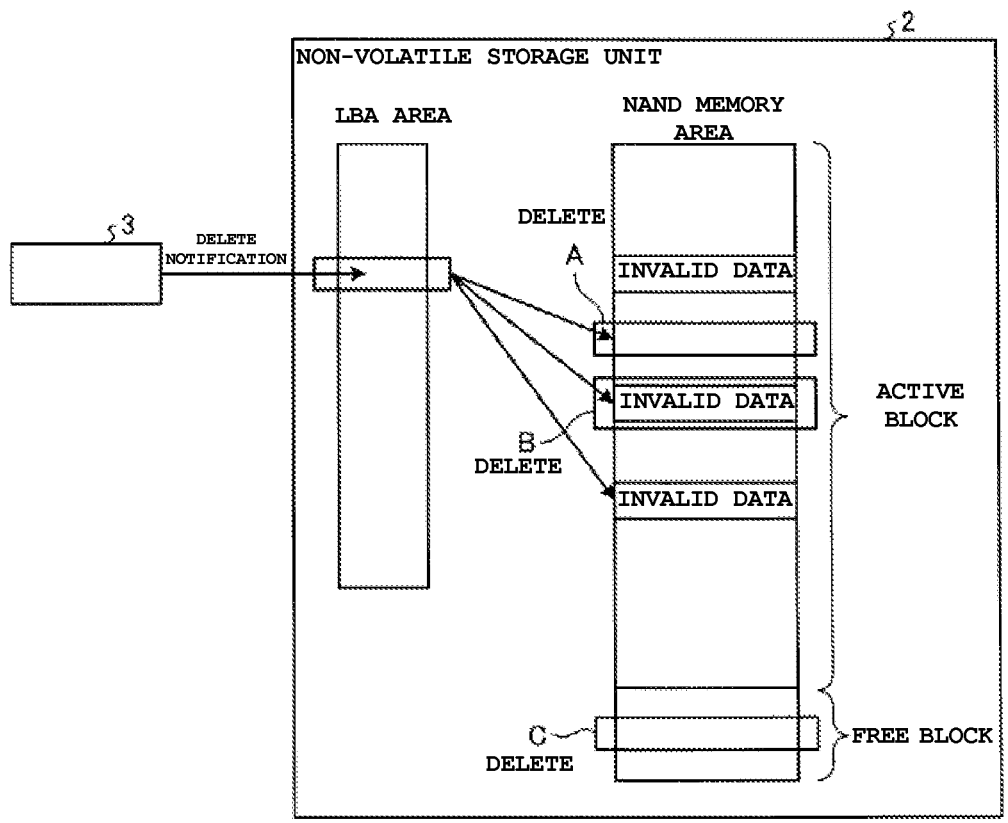
FIG. 42 shows the deletion process conceptually.

Due to this, as shown in FIG. 42, data of LBA region which is the target of the deletion process B is erased securely by using the deletion process B. The target for deletion process B is not only the latest valid data (A of FIG. 42) whose logical address is registered in the logical-to-physical conversion table but also prior invalid data (B of FIG. 42) in an active block, wherein the invalid data, whose logical address was registered previously in the logical-to-physical conversion table is still stored in the active block. The target for deletion process B may also be prior invalid data (C of FIG. 42) in a free block, wherein the invalid data, whose logical address was registered previously in the logical-to-physical conversion table is stored in the active block. The valid data which does is not targeted for deletion process B is preserved by copying it to other block.

Figure 43:
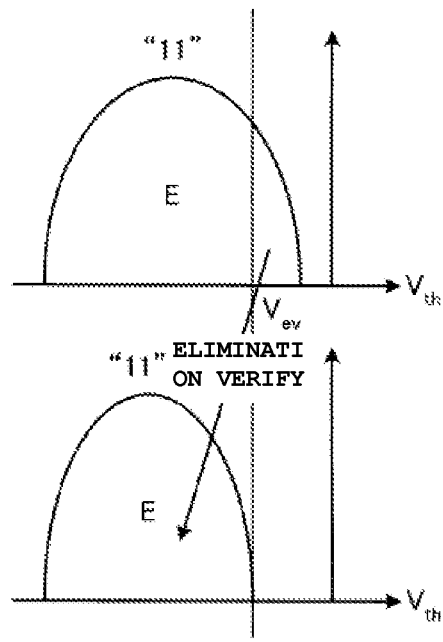
FIG. 43 shows the voltage threshold distribution during an erase verify operation.
Figure 44:
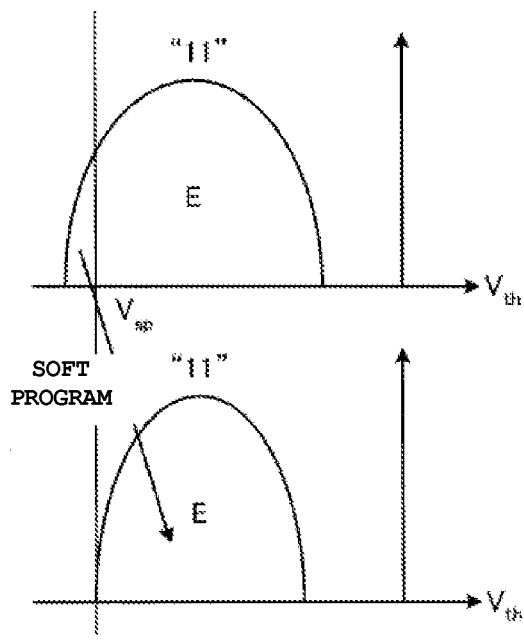
FIG. 44 shows the voltage threshold distribution during a soft program operation for erasing a block.

Even after the data targeted for deletion process B is erased, the data may possibly be guessed by analyzing the threshold distribution form of E level shown in FIG. 9. It is further more secure to narrow the threshold distribution of E level by executing the erase verify operation (FIG. 43) and a soft program operation (FIG. 44) when processing deletion process B. The soft program operation is an operation to prevent E level distribution from widening towards a lower level by performing program operation a little bit when a threshold level of a cell is smaller than a criteria Vsp.

Figure 45:
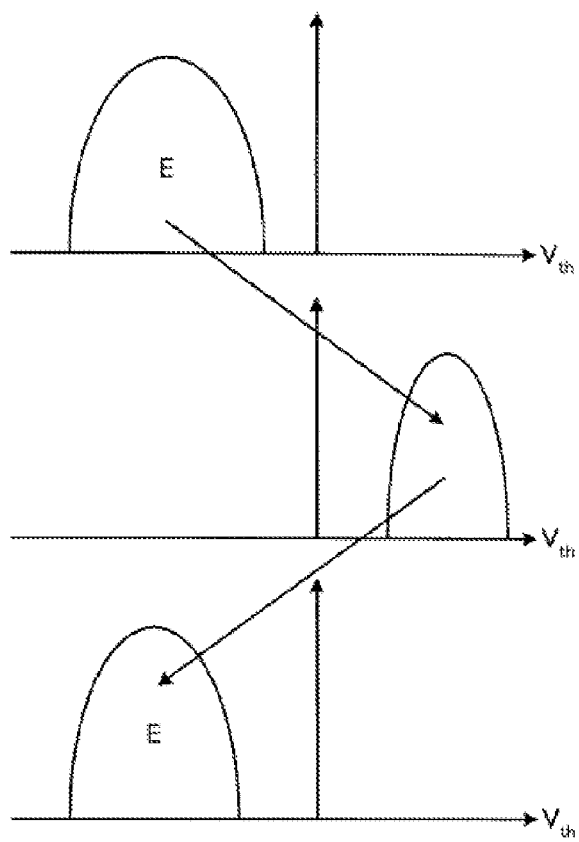
FIG. 45 shows the voltage threshold distribution during an erase operation for a secure data deletion.

To enhance further the security level of the secure deletion, as shown in FIG. 45, SSDC 26 may program the memory cell with the verify level larger than E level (overwrite) after performing an erase operation and then performing the erase operation once again during the deletion process B. Furthermore, this process may be repeated several times during the deletion process B. As a result, the security level of the deletion process B is more enhanced though the processing performance is deteriorated. The relationship between the security level and the processing performance of the deletion process B is a trade-off.

Figure 46:
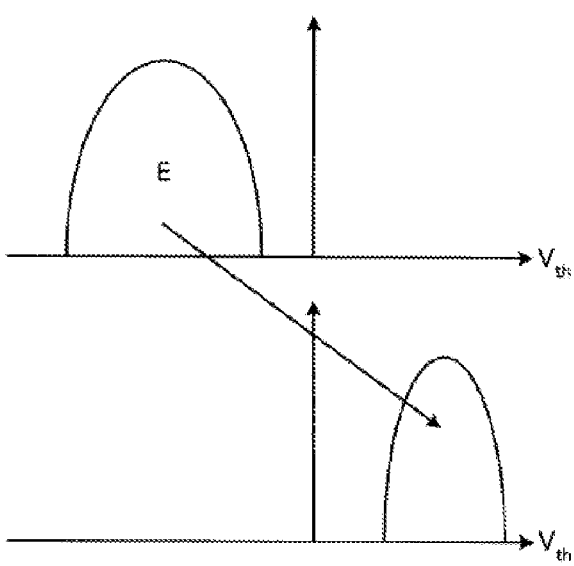
FIG. 46 shows the voltage threshold distribution during other examples of an erase operation for a secure data deletion.

As shown in FIG. 46, SSDC 26 may program the memory cell with the verify level larger than E level after performing an erase operation without performing the same operation once again.

To allow the host 3 to customize the security level and the processing performance of the deletion process B, these settings may be specified in the command protocol of the deletion notification. Then, the host 3 can request the deletion process B to do the overwrite operation, to do the erase operation, to do both of the overwrite and the erase operations, to do the erase verify operation or to do the soft program operation. The host 3 can also specify the number of overwrites, number of erases, and number of repetitions for overwrite and erases. For example, an input LBA register may be allocated for these settings in the Data Set Management Command of ACS-2.

In this way, according to a first embodiment, the data whose LBA is targeted by the deletion process B is deleted securely because the SSDC 26 stores the invalid data log which manages the prior logical-to-physical conversion information of invalid data which is stored in NAND memory without being erased. When the host transmits the deletion notification for the deletion process B to the SSD 2, the data which is specified by the notification is erased securely and the valid data which is not specified by the notification is not erased and is preserved. The security level of the deleted data is enhanced, and it becomes difficult for malicious users to steal the data. The valid data which is not targeted by the deletion process B is not erased, deletion process B is much more efficient than erasing all blocks by using the Security Erase Unit command specified in ACS-2. Because erase operation is selectively processed just to targeted blocks, the deletion process B reduces the block erase count further than erasing all blocks by using the Security Erase Unit command specified in ACS-2. Therefore, SSD 2 can avoid reliability deterioration and performance deterioration by the secure data deletion.

Second Embodiment

Figure 47:
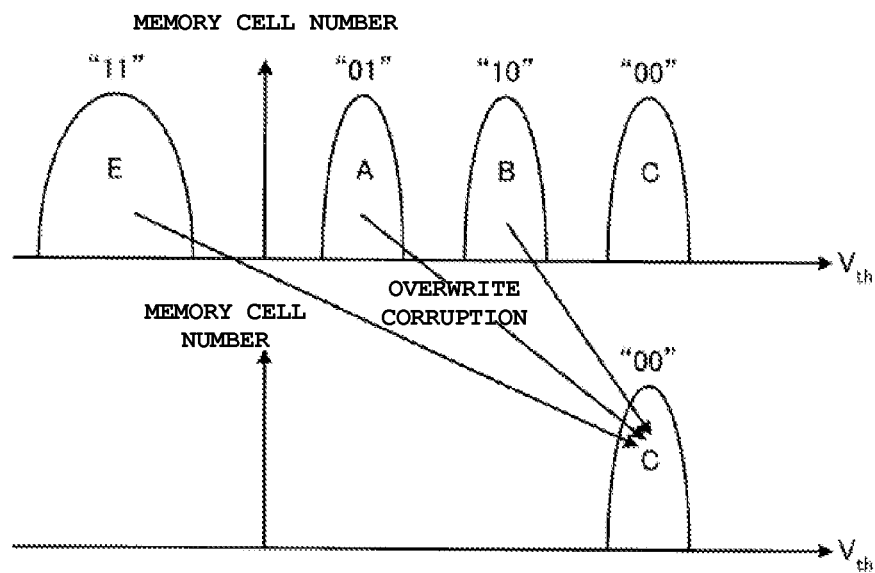
FIG. 47 shows the voltage threshold distribution during an example of an overwrite operation for a secure data deletion.

According to a second embodiment, the SSDC 26 programs targeted memory cells further with the verify level higher than the threshold voltage distribution E (erase state) as shown in FIG. 7 (overwrite) without erasing the block at the time of executing the deletion process B. The targeted memory cells are programmed to a higher level than the prior level of the prior data, and the prior data is destroyed. To enhance the security level further, the SSDC 26 may preferably use the verify level VCV or the verify level higher than level VCV so that all the prior threshold voltage distribution of the prior data is destroyed at the time of the deletion process B as shown in FIG. 47.

Figure 48:
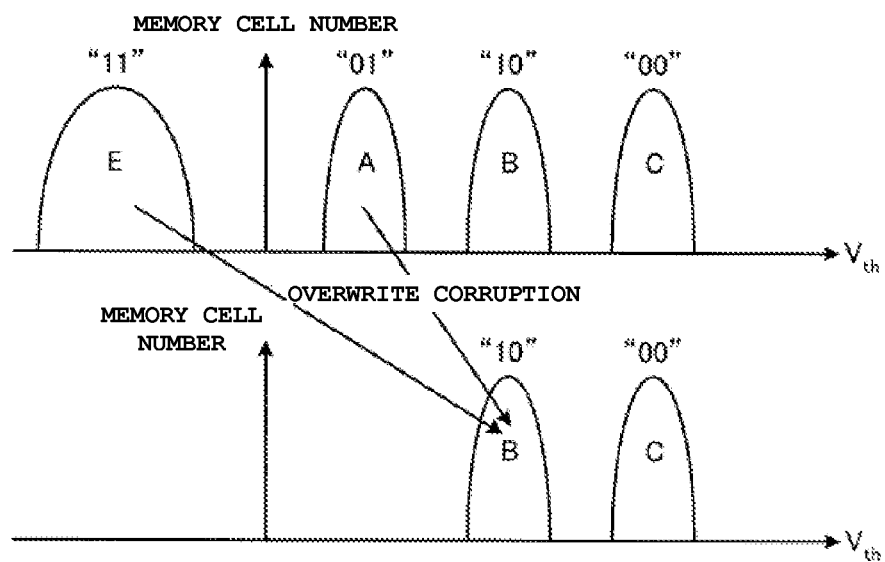
FIG. 48 shows the voltage threshold distribution during other examples of the overwrite operation for a secure data deletion.

In addition, the overwrite operation may be executed only for the pages containing the target data of deletion process B without deleting the entire block. In addition, the SSDC 26 may select the verify level smaller than the verify level VCV for the overwrite operation, though the security level of the deletion process B becomes smaller. For example, the SSDC may over-program the cells having level E or level A data to level B and may do nothing to the cells having level B or level C data as shown in FIG. 48.

According to the second embodiment, the deletion process B is executed by overwriting pages without erasing the block. This decreases the block erase count and thereby contributes to the long term reliability of the SSD.

Third Embodiment

According to a third embodiment, OS file system manages an attribute called "Secured Data" as an option in the property field of each file in OS 16. If the file in which the attribute value is equal to True is deleted, the OS 16 transmits the trim command for the deletion process B to the SSD 2. If the file in which the attribute value is equal to False is deleted, the OS 16 transmits the trim command for the deletion process A to the SSD 2. The deletion process B is selectively executed for the files with high security level (the high security file) and the deletion process A is selectively executed for the files with normal security level (the normal security file). As a result, the overall processing performance of OS 16 is enhanced because the deletion process B is limited to the files with a high security level. An example of a high security file is a confidential business document which cannot be exposed to third party. An example of a low security file is a system file of OS 16 which is used commonly. In addition, OS 16 may use a menu "Safe Delete" in addition to a menu "Delete", wherein, the deletion process A is processed when "Delete" is selected and the deletion process B is processed when "Safe delete" is selected.

Fourth Embodiment

According to a fourth embodiment, when the SSDC 26 cannot process the deletion process B completely, SSD 2 notifies the OS 16 of a list of the LBA ranges whose data were not deleted securely. For example, when the host 3 sends 2Fh READ LOG EXT command, 47h READ LOG DMA EXT command, B0h/D0h SMART READ DATA command, B0h/

D5h SMART READ LOG command, the host 3 receives the list of LBA ranges whose data was not deleted securely.

According to the fourth embodiment, the host 3 can be notified of the security level of the deleted data. For example, when the host 3 is notified that the data of the high security file has not been deleted securely, the host 3 can send a deletion notification for the deletion process B again and the security level of the OS file system of OS 16 can be secured thereby.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device for a host device, comprising:
   a non-volatile semiconductor memory;
   a mapping table having a first mapping of a first logical address, wherein the first mapping of the first logical address is to a first physical address of the nonvolatile semiconductor memory;
   an invalid data table having second and third mappings of the first logical address, wherein the second mapping of the first logical address is to a second physical address of the nonvolatile semiconductor memory and the third mapping of the first logical address is to a third physical address of the nonvolatile semiconductor memory;
   a control section configured to execute a delete process in response to a request to delete data stored at the first logical address from the host device, the delete process including
   determining from the mapping table the first physical address to which the first logical address is mapped and from the invalid data table, the second and third physical addresses to which the first logical address is mapped, and
   electrically erasing or electrically overwriting data stored in the non-volatile semiconductor memory at the first, second, and third physical addresses.

2. The storage device according to claim 1, wherein the control section is configured to maintain the mapping table and, in response to the request to delete data stored at the first logical address, marks the first mapping of the first logical address as invalid in the mapping table.

3. The storage device according to claim 2, wherein the control section is configured to update the mapping table to change a mapping of a logical address to a new physical address and to store the prior mapping of the logical address to the old physical address in the invalid data table, each time the logical address is mapped to the new physical address.

4. The storage device according to claim 3, wherein the control section, in response to the request to delete data stored at the first logical address, reads from the invalid data table all of the mappings of the first logical address to physical addresses of the nonvolatile semiconductor memory and electrically erases or electrically overwrites data stored in all of the physical addresses to which the first logical address is mapped.

5. The storage device according to claim 4, wherein the controller is configured to receive a read request having a second logical address,
   select from the mapping table, a fourth physical address to which the second logical address is mapped,
   read data stored in the non-volatile semiconductor memory at the fourth physical address, and
   send the read data to the host device.

6. The storage device according to claim 1, wherein the non-volatile semiconductor memory includes a plurality of memory cells that are partitioned into a plurality of blocks each containing a plurality of pages, and an erase process is carried out in units of blocks and a read/write process is carried out in units of pages.

7. The storage device according to claim 6, wherein the data stored in the non-volatile semiconductor memory at the first, second, and third physical addresses are erased by erasing one or more entire blocks in which the data are stored after copying valid data from the blocks to one or more new blocks.

8. The storage device according to claim 6, wherein the controller is configured to execute the delete process on less than one page of data.

9. A method of deleting data in a storage device for a host device having a non-volatile semiconductor memory, the method comprising:
   maintaining a mapping table having a first mapping of a first logical address, wherein the first mapping of the first logical address is to a first physical address of the non-volatile semiconductor memory;
   maintaining an invalid data table having second and third mappings of the first logical address, wherein the second mapping of the first logical address is to a second physical address of the nonvolatile semiconductor memory and the third mapping of the first logical address is to a third physical address of the nonvolatile semiconductor memory;
   receiving a request to delete data stored at the first logical address;
   determining from the mapping table the first physical address to which the first logical address is mapped and from the invalid data table, the second and third physical addresses to which the first logical address is mapped; and
   electrically erasing or electrically overwriting data stored in the non-volatile semiconductor memory at the first, second, and third physical addresses.

10. The method according to claim 9, further comprising:
    after said electrically erasing or electrically overwriting, marking the first mapping of the first logical address as invalid in the mapping table.

11. The method according to claim 10, further comprising:
    each time a logical address is mapped to a new physical address, updating the mapping table to change a mapping of the logical address to the new physical address and storing the prior mapping of the logical address to the old physical address in the invalid data table.

12. The method according to claim 11, wherein during said electrically erasing or electrically overwriting,
    reading from the invalid data table all of the mappings of the first logical address to physical addresses of the nonvolatile semiconductor memory, and
    electrically erasing or electrically overwriting the data stored in all of the physical addresses to which the first logical address is mapped.

13. The method according to claim 12, further comprising:
    receiving a read request having a second logical address,
    selecting from the mapping table, a fourth physical address to which the second logical address is mapped, reading data stored in the non-volatile semiconductor memory at the fourth physical address, and sending the read data to the host device.

14. The method according to claim 9, wherein the non-volatile semiconductor memory includes a plurality of memory cells that are partitioned into a plurality of blocks each containing a plurality of pages, and an erase process is carried out in units of blocks and a read/write process is carried out in units of pages.

15. The method according to claim 14, wherein the data stored in the non-volatile semiconductor memory at the first, second, and third physical addresses are erased by erasing one or more entire blocks in which the data are stored after copying valid data from the blocks to one or more new blocks.

16. The method according to claim 14, wherein the said electrically erasing or electrically overwriting is executed on less than one page of data.

* * * * *